US012507293B2

(12) United States Patent
Selvanesan et al.

(10) Patent No.: US 12,507,293 B2
(45) Date of Patent: Dec. 23, 2025

(54) FEEDBACK AND TRAFFIC DIFFERENTIATION IN SIDELINK RELAYS

(71) Applicant: Fraunhofer-Gesellschaft zur Förderung der angewandten Forschung e.V., Munich (DE)

(72) Inventors: Sarun Selvanesan, Berlin (DE); Baris Göktepe, Berlin (DE); Roya Ebrahim Rezagah, Berlin (DE); Nithin Srinivasan, Berlin (DE); Thomas Fehrenbach, Berlin (DE); Thomas Wirth, Berlin (DE); Thomas Schierl, Berlin (DE); Cornelius Hellge, Berlin (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 346 days.

(21) Appl. No.: 18/080,802

(22) Filed: Dec. 14, 2022

(65) Prior Publication Data
US 2023/0171826 A1 Jun. 1, 2023

Related U.S. Application Data

(63) Continuation of application No. PCT/EP2021/066476, filed on Jun. 17, 2021.

(30) Foreign Application Priority Data

Jun. 19, 2020 (EP) .................................. 20181205

(51) Int. Cl.
*H04W 76/14* (2018.01)
*H04W 88/04* (2009.01)

(52) U.S. Cl.
CPC ............ *H04W 76/14* (2018.02); *H04W 88/04* (2013.01)

(58) Field of Classification Search
None
See application file for complete search history.

(56) References Cited

U.S. PATENT DOCUMENTS 11,589,257 B2 * 2/2023 Lee ........................ H04W 72/02
11,626,920 B2 * 4/2023 Lee ........................ H04W 76/19
370/329

(Continued)

FOREIGN PATENT DOCUMENTS

CN 101366203 A 2/2009
CN 107534831 A 1/2018
(Continued)

OTHER PUBLICATIONS

ZTE, "Resource scheme of FeD2D Relay", 3GPP Draft; R1-1712918-5.2.9.2.3.2 Resource scheme of FeD2D Relay, Aug. 20, 2017 3rd Generation Partnership Project (3GPP), Mobile Competence Centre ; 650, route des Lucioles ; F-06921 Sophia-Antipolis Cedex ; France, vol. RAN WG1,Nr, Aug. 21-25, 2017, Prague, Czech Republic.

(Continued)

*Primary Examiner* — Melvin H Pollack
(74) *Attorney, Agent, or Firm* — Bridgeway IP Law Group, PLLC; Jihun Kim

(57) ABSTRACT

A user device, UE, for a wireless communication network, acta as a relay UE so as to provide functionality to support connectivity between a transmitting entity and one or more receiving entities of the wireless communication network. The UE differentiates a transmission, which is received from the transmitting entity, between a first transmission to be relayed to a receiving entity and a second transmission that is intended for the UE. The UE differentiates the received (Continued)

transmission by control information associated with the transmission and/or resources on which the transmission and/or the associated control information is received.

18 Claims, 24 Drawing Sheets

(56) References Cited

U.S. PATENT DOCUMENTS

| | | | | |
|---|---|---|---|---|
| 11,632,740 | B2* | 4/2023 | Yerramalli | H04W 72/121 370/330 |
| 11,641,644 | B2* | 5/2023 | Badic | G05D 1/606 370/329 |
| 11,659,447 | B2* | 5/2023 | Teyeb | H04W 28/0278 370/329 |
| 11,689,957 | B2* | 6/2023 | Paladugu | H04W 76/27 370/229 |
| 11,838,936 | B2* | 12/2023 | Kung | H04W 72/54 |
| 11,871,461 | B2* | 1/2024 | Liao | H04W 60/00 |
| 11,889,514 | B2* | 1/2024 | Adjakple | H04W 72/21 |
| 11,910,407 | B2* | 2/2024 | Belleschi | H04W 72/0453 |
| 11,924,736 | B2* | 3/2024 | Sato | H04W 16/26 |
| 11,950,131 | B2* | 4/2024 | Lee | H04W 24/08 |
| 11,950,231 | B2* | 4/2024 | Wang | H04W 76/22 |
| 11,978,344 | B2* | 5/2024 | Kwak | G08G 1/163 |
| 12,022,512 | B2* | 6/2024 | Kwak | H04W 74/0866 |
| 12,069,754 | B2* | 8/2024 | Bangolae | H04W 76/14 |
| 12,082,201 | B2* | 9/2024 | Yi | H04W 72/23 |
| 12,108,494 | B2* | 10/2024 | Paladugu | H04W 4/14 |
| 12,137,490 | B2* | 11/2024 | Adjakple | H04W 4/40 |
| 12,156,272 | B2* | 11/2024 | Zhu | H04L 1/1864 |
| 12,177,028 | B2* | 12/2024 | Li | H04L 1/1861 |
| 12,219,480 | B2* | 2/2025 | Kwak | H04W 4/40 |
| 12,256,296 | B2* | 3/2025 | Ali | H04W 80/04 |
| 2007/0153698 | A1 | 7/2007 | Lee et al. | |
| 2016/0323777 | A1 | 11/2016 | Pan et al. | |
| 2016/0337936 | A1 | 11/2016 | Li et al. | |
| 2018/0124633 | A1 | 5/2018 | Hwang et al. | |
| 2018/0352411 | A1 | 12/2018 | Ryu et al. | |
| 2020/0154520 | A1 | 5/2020 | Huang et al. | |
| 2023/0053351 | A1* | 2/2023 | Cheng | H04W 40/12 |
| 2023/0107283 | A1* | 4/2023 | Park | H01Q 15/148 370/329 |
| 2023/0113249 | A1* | 4/2023 | Hu | H04W 76/14 370/328 |
| 2023/0156854 | A1* | 5/2023 | Cheng | H04W 24/10 370/329 |
| 2023/0328840 | A1* | 10/2023 | Cheng | H04W 8/005 370/329 |

FOREIGN PATENT DOCUMENTS

| | | | | |
|---|---|---|---|---|
| CN | 109257705 | A | 1/2019 | |
| EP | 3635917 | B1* | 1/2025 | H04B 7/15528 |
| JP | 6733746 | B2* | 8/2020 | H04W 36/0033 |
| WO | 2020/030688 | A1 | 2/2020 | |
| WO | 2020-072652 | A1 | 4/2020 | |

OTHER PUBLICATIONS

3GPP, ETSI TS 136 300 V13.2.0 (Jan. 2016), LTE; Evolved Universal Terrestrial Radio Access (E-UTRA) and Evolved Universal Terrestrial Radio Access Network (E-UTRAN); Overall description; Stage 2 (3GPP TS 36.300 version 13.2.0 Release 13), Jan. 2016.

3GPP, ETSI TS 138 300 V15.2.0 (Sep. 2018), 5G; NR; Overall description; Stage-2 (3GPP TS 38.300 version 15.2.0 Release 15), Sep. 2018.

3GPP TR 38.889 V16.0.0 (Dec. 2018); 3rd Generation Partnership Project; Technical Specification Group Radio Access Network; Study on NR-based access to unlicensed spectrum (Release 16), Dec. 2018.

3GPP, ETSI TS 136 216 V14.0.0 (Apr. 2017), Universal Mobile Telecommunications System (UMTS); LTE; Evolved Universal Terrestrial Radio Access (E-UTRA); Physical layer for relaying operation (3GPP TS 36.216 version 14.0.0 Release 14), Apr. 2017.

3GPP TR 36.746 V15.1.1 (Apr. 2018), Technical Specification Group Radio Access Network; Study on further enhancements to LTE Device to Device (D2D), User Equipment (UE) to network relays for Internet of Things (IoT) and wearables; (Release 15), Apr. 2018.

3GPP TR 36.785 V14.0.0 (Oct. 2016), Technical Specification Group Radio Access Network; Vehicle to Vehicle (V2V) services based on LTE sidelink; User Equipment (UE) radio transmission and reception (Release 14), Oct. 2016.

3GPP, ETSI TS 136 300 V15.14.0 (Jan. 2023), LTE; Evolved Universal Terrestrial Radio Access (E-UTRA) and Evolved Universal Terrestrial Radio Access Network (E-UTRAN); Overall description; Stage 2 (3GPP TS 36.300 version 15.14.0 Release 15), Jan. 2023.

3GPP TS 38.885 V16.0.0 (Mar. 2019), Technical Specification Group Radio Access Network; NR; Study on NR Vehicle-to-Everything (V2X), (Release 16), Mar. 2019.

3GPP TR 21.917 V17.0.1 (Jan. 2023), Technical Specification Group Services and System Aspects; Release 17 Description; Summary of Rel-17 Work Items (Release 17), Jan. 2023.

3GPP ETSI TS 138 300 V16.11.0 (Jan. 2023), 5G; NR; NR and NG-RAN Overall description; Stage-2 (3GPP TS 38.300 version 16.11.0 Release 16), Jan. 2023.

Author, "Latency Reduction in L2 Relay Architecture," 3GPP TSG-RAN WG2#98 Meeting, R2-1705124, May 15-19, 2017, Agenda item 9.1.2.1, Sequans Communications, China.

Examiner, "Office Action for KR Application No. 10-2023-7002230", Sep. 26, 2025, KIPO, Republic of Korea.

* cited by examiner

SL-BWP-PoolConfig information element

```
SL-BWP-PoolConfig-r16 ::=        SEQUENCE {
    sl-RxPool-r16                      SEQUENCE (SIZE (1..maxNrofRXPool-r16)) OF SL-
ResourcePool-r16              OPTIONAL,    -- Cond HO
    sl-TxPoolSelectedNormal-r16        SL-TxPoolDedicated-r16
OPTIONAL,    -- Need M
    sl-TxPoolScheduling-r16            SL-TxPoolDedicated-r16
OPTIONAL,    -- Need N
    sl-TxPoolExceptional-r16           SL-ResourcePoolConfig-r16
    OPTIONAL,    -- Need M
    sl-TxPoolRelays-r17                SL-ResourcePoolConfigRelays-r17
    OPTIONAL,    -- Need M
}
```

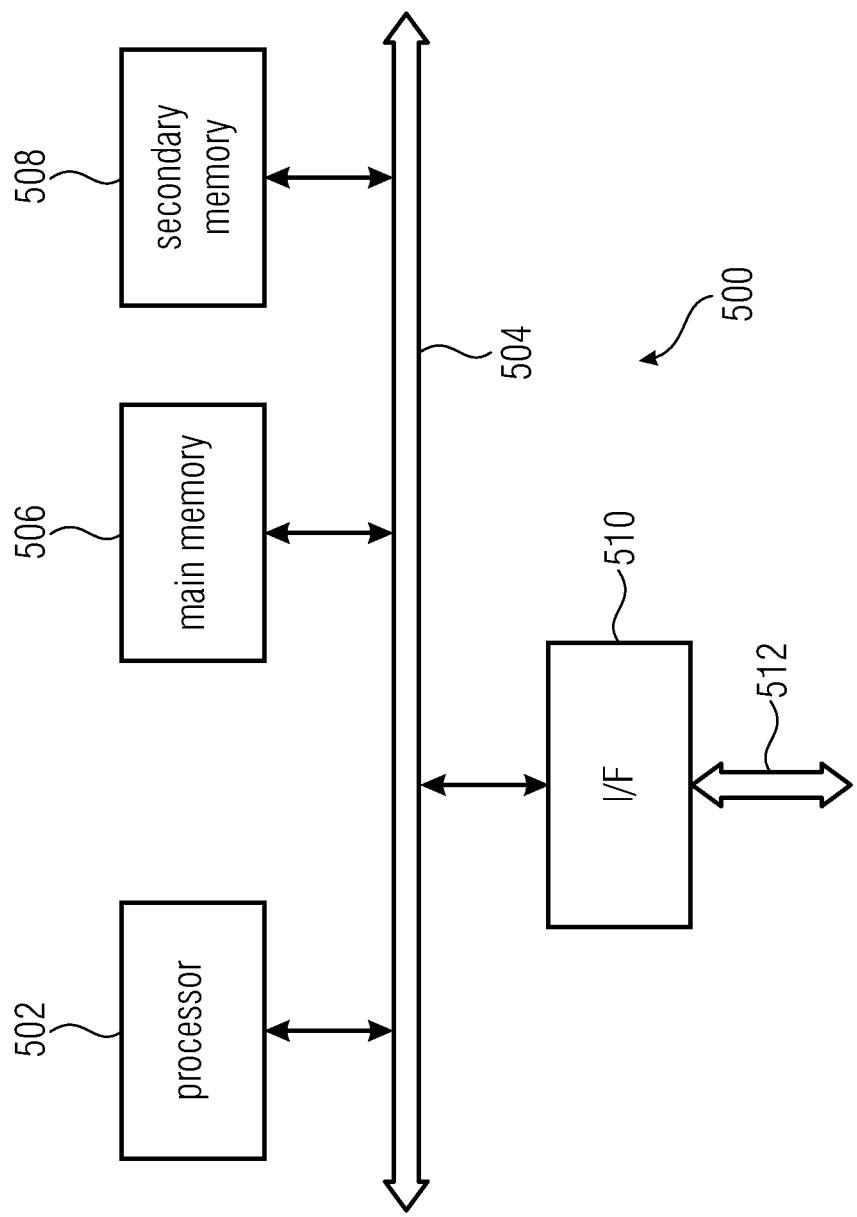

FEEDBACK AND TRAFFIC DIFFERENTIATION IN SIDELINK RELAYS

CROSS-REFERENCE TO RELATED APPLICATIONS

This application is a continuation of copending International Application No. PCT/EP2021/066476, filed Jun. 17, 2021, which is incorporated herein by reference in its entirety, and additionally claims priority from European Application No. 20181205.4, filed Jun. 19, 2020, which is also incorporated herein by reference in its entirety.

The present invention relates to the field of wireless communication systems or networks, more specifically to the field of relay devices, especially sidelink relay devices, used to provide functionality to support connectivity between a transmitting entity and a remote user device, UE, of the wireless communication system or network. Embodiments of a first aspect of the present invention relate to a feedback, like a NR hybrid automatic retransmission request, HARQ, feedback for sidelink relays, and embodiments of a second aspect of the present invention concern the traffic differentiation by relay devices, like NR sidelink relays.

BACKGROUND OF THE INVENTION

FIG. 1 is a schematic representation of an example of a terrestrial wireless network 100 including, as is shown in FIG. 1A, the core network 102 and one or more radio access networks $RAN_1$, $RAN_2$, ... $RAN_N$. FIG. 1B is a schematic representation of an example of a radio access network $RAN_D$ that may include one or more base stations $gNB_1$ to $gNB_5$, each serving a specific area surrounding the base station schematically represented by respective cells $106_1$ to $106_5$. The base stations are provided to serve users within a cell. The one or more base stations may serve users in licensed and/or unlicensed bands. The term base station, BS, refers to a gNB in 5G networks, an eNB in UMTS/LTE/LTE-A/LTE-A Pro, or just a BS in other mobile communication standards. A user may be a stationary device or a mobile device. The wireless communication system may also be accessed by mobile or stationary IoT devices which connect to a base station or to a user. The mobile devices or the IoT devices may include physical devices, ground based vehicles, such as robots or cars, aerial vehicles, such as manned or unmanned aerial vehicles, UAVs, the latter also referred to as drones, buildings and other items or devices having embedded therein electronics, software, sensors, actuators, or the like as well as network connectivity that enables these devices to collect and exchange data across an existing network infrastructure. FIG. 1B shows an exemplary view of five cells, however, the $RAN_n$ may include more or less such cells, and $RAN_n$ may also include only one base station. FIG. 1B shows two users $UE_1$ and $UE_2$, also referred to as user equipment, UE, that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. This may be realized on licensed bands or on unlicensed bands. Further, FIG. 1B shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user $UE_3$ as is schematically represented by arrow $112_2$. The respective base station $gNB_1$ to $gNB_5$ may be connected to the core network 102, e.g. via the S1 interface, via respective backhaul links $114_1$ to $114_5$, which are schematically represented in FIG. 1B by the arrows pointing to "core". The core network 102 may be connected to one or more external networks. The external network may be the Internet, or a private network, such as an Intranet or any other type of campus networks, e.g. a private WiFi or 4G or 5G mobile communication system. Further, some or all of the respective base station $gNB_1$ to $gNB_5$ may be connected, e.g. via the S1 or X2 interface or the XN interface in NR, with each other via respective backhaul links $116_1$ to $116_5$, which are schematically represented in FIG. 1B by the arrows pointing to "gNBs". A sidelink channel allows direct communication between UEs, also referred to as device-to-device, D2D, communication. The sidelink interface in 3GPP is named PC5.

For data transmission a physical resource grid may be used. The physical resource grid may comprise a set of resource elements to which various physical channels and physical signals are mapped. For example, the physical channels may include the physical downlink, uplink and sidelink shared channels, PDSCH, PUSCH, PSSCH, carrying user specific data, also referred to as downlink, uplink and sidelink payload data, the physical broadcast channel, PBCH, carrying for example a master information block, MIB, and one or more of a system information block, SIB, one or more sidelink information blocks, SLIBs, if supported, the physical downlink, uplink and sidelink control channels, PDCCH, PUCCH, PSSCH, carrying for example the downlink control information, DCI, the uplink control information, UCI, and the sidelink control information, SCI, and physical sidelink feedback channels, PSFCH, carrying PC5 feedback responses. Note, the sidelink interface may a support 2-stage SCI. This refers to a first control region containing some parts of the SCI, and optionally, a second control region, which contains a second part of control information.

For the uplink, the physical channels may further include the physical random-access channel, PRACH or RACH, used by UEs for accessing the network once a UE synchronized and obtained the MIB and SIB. The physical signals may comprise reference signals or symbols, RS, synchronization signals and the like. The resource grid may comprise a frame or radio frame having a certain duration in the time domain and having a given bandwidth in the frequency domain. The frame may have a certain number of subframes of a predefined length, e.g. 1 ms. Each subframe may include one or more slots of 12 or 14 OFDM symbols depending on the cyclic prefix, CP, length. A frame may also consist of a smaller number of OFDM symbols, e.g. when utilizing shortened transmission time intervals, sTTI, or a mini-slot/non-slot-based frame structure comprising just a few OFDM symbols.

The wireless communication system may be any single-tone or multicarrier system using frequency-division multiplexing, like the orthogonal frequency-division multiplexing, OFDM, system, the orthogonal frequency-division multiple access, OFDMA, system, or any other IFFT-based signal with or without CP, e.g. DFT-s-OFDM. Other waveforms, like non-orthogonal waveforms for multiple access, e.g. filter-bank multicarrier, FBMC, generalized frequency division multiplexing, GFDM, or universal filtered multi carrier, UFMC, may be used. The wireless communication system may operate, e.g., in accordance with the LTE-Advanced pro standard, or the 5G or NR, New Radio, standard, or the NR-U, New Radio Unlicensed, standard.

The wireless network or communication system depicted in FIG. 1 may be a heterogeneous network having distinct overlaid networks, e.g., a network of macro cells with each macro cell including a macro base station, like base station $gNB_1$ to $gNB_5$, and a network of small cell base stations, not shown in FIG. 1, like femto or pico base stations. In addition to the above described terrestrial wireless network also non-terrestrial wireless communication networks, NTN, exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-Advanced Pro standard or the 5G or NR, new radio, standard.

In mobile communication networks, for example in a network like that described above with reference to FIG. 1, like a LTE or 5G/NR network, there may be UEs that communicate directly with each other over one or more sidelink, SL, channels, e.g., using the PC5/PC3 interface or WiFi direct. UEs that communicate directly with each other over the sidelink may include vehicles communicating directly with other vehicles, V2V communication, vehicles communicating with other entities of the wireless communication network, V2X communication, for example roadside units, RSUs, roadside entities, like traffic lights, traffic signs, or pedestrians. RSUs may have functionalities of BS or of UEs, depending on the specific network configuration. Other UEs may not be vehicular related UEs and may comprise any of the above-mentioned devices. Such devices may also communicate directly with each other, D2D communication, using the SL channels.

When considering two UEs directly communicating with each other over the sidelink, both UEs may be served by the same base station so that the base station may provide sidelink resource allocation configuration or assistance for the UEs. For example, both UEs may be within the coverage area of a base station, like one of the base stations depicted in FIG. 1. This is referred to as an "in-coverage" scenario. Another scenario is referred to as an "out-of-coverage" scenario. It is noted that "out-of-coverage" does not mean that the two UEs are not within one of the cells depicted in FIG. 1, rather, it means that these UEs

- may not be connected to a base station, for example, they are not in an RRC connected state, so that the UEs do not receive from the base station any sidelink resource allocation configuration or assistance, and/or
- may be connected to the base station, but, for one or more reasons, the base station may not provide sidelink resource allocation configuration or assistance for the UEs, and/or
- may be connected to the base station that may not support NR V2X services, e.g., GSM, UMTS, LTE base stations.

When considering two UEs directly communicating with each other over the sidelink, e.g., using the PC5/PC3 interface, one of the UEs may also be connected with a BS, and may relay information from the BS to the other UE via the sidelink interface and vice-versa. The relaying may be performed in the same frequency band, in-band-relay, or another frequency band, out-of-band relay, may be used. In the first case, communication on the Uu and on the sidelink may be decoupled using different time slots as in time division duplex, TDD, systems.

FIG. 2A is a schematic representation of an in-coverage scenario in which two UEs directly communicating with each other are both connected to a base station. The base station gNB has a coverage area that is schematically represented by the circle 150 which, basically, corresponds to the cell schematically represented in FIG. 1. The UEs directly communicating with each other include a first vehicle 152 and a second vehicle 154 both in the coverage area 150 of the base station gNB. Both vehicles 152, 154 are connected to the base station gNB and, in addition, they are connected directly with each other over the PC5 interface. The scheduling and/or interference management of the V2V traffic is assisted by the gNB via control signaling over the Uu interface, which is the radio interface between the base station and the UEs. In other words, the gNB provides SL resource allocation configuration or assistance for the UEs, and the gNB assigns the resources to be used for the V2V communication over the sidelink. This configuration is also referred to as a mode 1 configuration in NR V2X or as a mode 3 configuration in LTE V2X.

FIG. 2B is a schematic representation of an out-of-coverage scenario in which the UEs directly communicating with each other are either not connected to a base station, although they may be physically within a cell of a wireless communication network, or some or all of the UEs directly communicating with each other are to a base station but the base station does not provide for the SL resource allocation configuration or assistance. Three vehicles 156, 158 and 160 are shown directly communicating with each other over a sidelink, e.g., using the PC5 interface. The scheduling and/or interference management of the V2V traffic is based on algorithms implemented between the vehicles. This configuration is also referred to as a mode 2 configuration in NR V2X or as a mode 4 configuration in LTE V2X. As mentioned above, the scenario in FIG. 2B which is the out-of-coverage scenario does not necessarily mean that the respective mode 2 UEs in NR or mode 4 UEs in LTE are outside of the coverage 150 of a base station, rather, it means that the respective mode 2 UEs in NR or mode 4 UEs in LTE are not served by a base station, are not connected to the base station of the coverage area, or are connected to the base station but receive no SL resource allocation configuration or assistance from the base station. Thus, there may be situations in which, within the coverage area 150 shown in FIG. 2A, in addition to the NR mode 1 or LTE mode 3 UEs 152, 154 also NR mode 2 or LTE mode 4 UEs 156, 158, 160 are present. In addition, FIG. 2B, schematically illustrates an out of coverage UE using a relay to communicate with the network. For example, the UE 160 may communicate over the sidelink with $UE_1$ which, in turn, may be connected to the gNB via the Uu interface. Thus, $UE_1$ may relay information between the gNB and the UE 160

Although FIG. 2A and FIG. 2B illustrate vehicular UEs, it is noted that the described in-coverage and out-of-coverage scenarios also apply for non-vehicular UEs. In other words, any UE, like a hand-held device, communicating directly with another UE using SL channels may be in-coverage and out-of-coverage.

In a wireless communication system or network, like the one described above with reference to FIG. 1, relay devices or relay nodes may be employed to solve performance issues, like a reduced data rate, a weaker signal and higher interference as it may be encountered on the radio coverage edges of a cell of a base station. The relay node may extract data from a received signal, apply noise correction and retransmit a new signal on its own. Rather than only repeating the signal, the relay node also increases the signal quality. In the 3GPP specifications for 4G, a UE-to-Network relay has been specified.

It is noted that the information in the above section is only for enhancing the understanding of the background of the invention and, therefore, it may contain information that does not form conventional technology that is already known to a person of ordinary skill in the art.

SUMMARY

An embodiment may have a user device, UE, for a wireless communication network, wherein the UE is to act as a relay UE so as to provide functionality to support connectivity between a transmitting entity and one or more receiving entities of the wireless communication network, wherein the UE is to differentiate a transmission, which is received from the transmitting entity, between a first transmission to be relayed to a receiving entity and a second transmission that is intended for the UE, and wherein the UE is to differentiate the received transmission by one or more of the following: control information associated with the transmission, resources on which the transmission and/or the associated control information is received.

Another embodiment may have a transmitting entity for a wireless communication network, wherein the transmitting entity is connectable to a relay UE so as to provide functionality to support connectivity between the transmitting entity and one or more receiving entities of the wireless communication network, and wherein the transmitting entity is to indicate a transmission to a relay UE as a first transmission, which is to be relayed to the receiving entity, by on one or more of the following: associating the transmission with specific control information, sending the transmission and/or the associated control information on specific resources.

According to another embodiment, a wireless communication network may have: one or more transmitting entities, one or more receiving entities, and one or more relay user devices, relay UE, the relay UE to provide functionality to support connectivity between the transmitting entity and the receiving entity, wherein the transmitting entity includes one or more inventive transmitting entities, and/or the relay UE includes one or more inventive user devices, UE.

According to another embodiment, a method for operating a user device, UE, for a wireless communication network, wherein the UE is to act as a relay UE so as to provide functionality to support connectivity between a transmitting entity and one or more receiving entities of the wireless communication network, may have the steps of: differentiating, by the UE, a transmission, which is received from the transmitting entity, between a first transmission to be relayed to a receiving entity and a second transmission that is intended for the UE, wherein the received transmission is differentiated by one or more of the following: control information associated with the transmission, resources on which the transmission and/or the associated control information is received.

According to another embodiment, a method for operating a transmitting entity for a wireless communication network, the transmitting entity being connected to a relay UE so as to provide functionality to support connectivity between the transmitting entity and one or more receiving entities of the wireless communication network, may have the steps of: indicating, by the transmitting entity, a transmission to a relay UE as a first transmission, which is to be relayed to the receiving entity, by on one or more of the following: associating the transmission with specific control information, sending the transmission and/or the associated control information on specific resources.

Another embodiment may have a non-transitory digital storage medium having a computer program stored thereon to perform any of the inventive methods when said computer program is run by a computer.

BRIEF DESCRIPTION OF THE DRAWINGS

Embodiments of the present invention will be detailed subsequently referring to the appended drawings, in which:

FIGS. 1A-1B are a schematic representation of an example of a terrestrial wireless network, wherein FIG. 1A illustrates a core network and one or more radio access networks, and FIG. 1B is a schematic representation of an example of a radio access network RAN;

FIGS. 2A-2B schematic represent in-coverage and out-of-coverage scenarios, wherein FIG. 2A is a schematic representation of an in-coverage scenario in which two UEs directly communicating with each other are both connected to a base station, and FIG. 2B is a schematic representation of an out-of-coverage scenario in which the UEs directly communicating with each other, FIGS. 3A-3C schematically illustrate several relaying scenarios, wherein

FIG. 9B illustrates an end-to-end feedback;

FIG. 25 illustrates a SL-BWP-pool config information element defining an additional relay resource pool in accordance with embodiments of the second aspect of the present invention;

FIG. 28 illustrates an example of a computer system on which units or modules as well as the steps of the methods described in accordance with the inventive approach may execute.

DETAILED DESCRIPTION OF THE INVENTION

Embodiments of the present invention are now described in more detail with reference to the accompanying drawings, in which the same or similar elements have the same reference signs assigned.

Figure 3A:
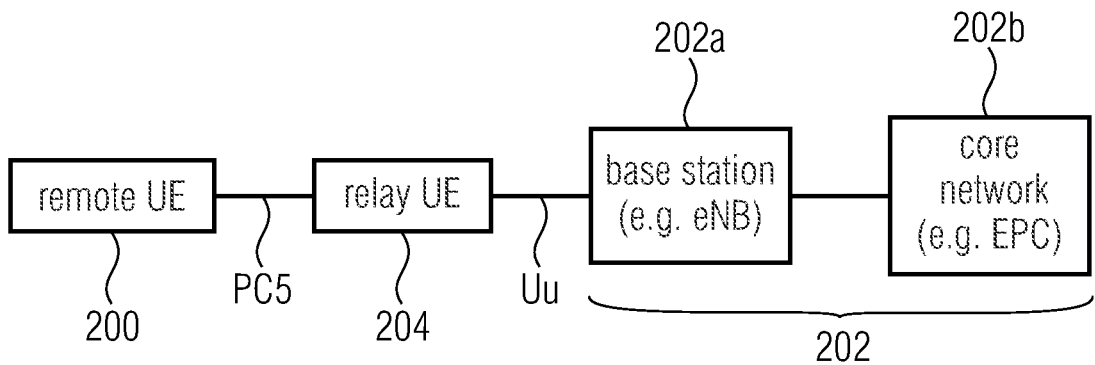
FIG. 3A illustrates a scenario where a relay UE operates as a UE-to-Network relay.

In a wireless communication system or network, like the one described above with reference to FIG. 1, relay devices or relay nodes may be employed to extend the coverage of wireless networks or to solve performance issues, like a reduced data rate, a weaker signal and higher interference as it may be encountered on the radio coverage edges of a cell of a base station. The relay node may simply repeat and forward a received signal or transmission. In other examples, the relay node may extract data from a received signal or transmission, apply noise correction and send a new signal or a new transmission on its own. Rather than only repeating the signal, the relay node may also increases the signal quality. FIG. 3A illustrates a scenario where a relay UE operates as a UE-to-Network relay. The relay device or relay node mentioned above may be a user equipment, UE, and, in the following, is referred to a relay UE. FIG. 3A illustrates a UE 200 that is to connect to a destination 202, e.g., to an entity of the access network 202*a*, like a gNB, of to an entity of the core network 202*a*. The end-to-end communication between the UE 200, that is also referred to as the remote UE, and the destination uses a relay UE 2040 that provides functionality to support connectivity to the destination in the core network 202 for the remote UE 200. The remote UE 200 and the relay UE may communicate using the PC5 interface, and the relay UE and the access network may communicate using the Uu interface.

Figure 3B:
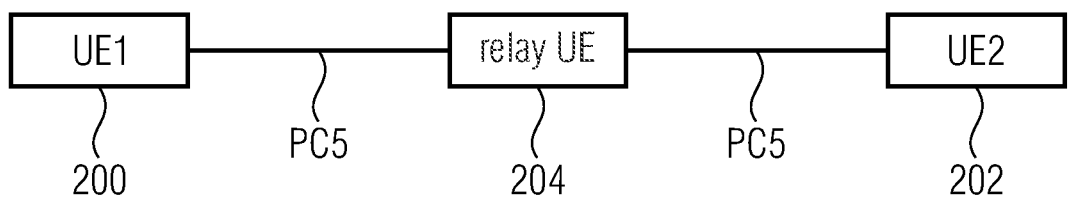
FIG. 3B illustrates a scenario where the relay is a UE-to-UE relay, and FIG. 3C schematically illustrates the operation of a LTE relay system including a transmitting entity, a receiving entity and a relaying entity.

In NR or 5G, in addition to the UE-to-Network relay, also a UE-to-UE relay is supported. In such a scenario, the destination 202 is another UE. FIG. 3B illustrates a scenario where the relay is a UE-to-UE relay 204. The remote UE 200 is to connect to the other UE 202, and the relay UE 204 provides functionality to support connectivity to the destination UE 208, for the remote UE 200. The remote UE 200 and the relay UE may communicate using the PC5 interface, and the relay UE and the other UE 202 may communicate using also the PC5 interface.

Although FIG. 3A and FIG. 3B illustrate the relay to be a UE, it is noted that the relay may be any entity having network connectivity and enabling that the remote UE 200 is connected to the destination 202, like the core network or another UE. For example, the relay entity may be a group leader UE, a roadside unit, RSU, or any mobile or stationary device. Such a relay entity may be a relay node having some base station functionality, such as scheduling of resources, etc. Furthermore, a relay may also be a relay node in the classical sense, e.g. a base station infrastructure device, providing relaying functionality as in an amplify and forward (AF) relay, or a decode-and-forward relay (DF), e.g. operating on layer-2 (L2), or even a layer-3 (L3), which forwards data on Internet Protocol (IP)-level.

In the above-described scenarios of vehicular user devices, UEs, a plurality of such user devices may form a user device group, also referred to simply as group, and the communication within the group or among the group members may be performed via the sidelink interfaces between the user devices, like the PC5 interface. For example, the above-described scenarios using vehicular user devices may be employed in the field of the transport industry in which a plurality of vehicles being equipped with vehicular user devices may be grouped together, for example, by a remote driving application. Other use cases in which a plurality of user devices may be grouped together for a sidelink communication among each other include, for example, factory automation and electrical power distribution. In the case of factory automation, a plurality of mobile or stationary machines within a factory may be equipped with user devices and grouped together for a sidelink communication, for example for controlling the operation of the machine, like a motion control of a robot. In the case of electrical power distribution, entities within the power distribution grid may be equipped with respective user devices which, within a certain area of the system may be grouped together so as to communicate via a sidelink communication with each other so as to allow for monitoring the system and for dealing with power distribution grid failures and outages.

Naturally, in the above-mentioned use cases sidelink communication is not limited to a communication within a group. Rather, the sidelink communication may be among any of UEs, like any pair of UEs.

In the 3GPP specifications for 4G, a UE-to-Network relay has been specified. In LTE, relays are featured as a stand-alone concept with an expansion for device-to-device, D2D, relaying. In LTE, relay nodes work like a UE when communicating with the base station, BS, and like a BS when communicating with a UE. Transmissions between the base station and the relay node, RN, so-called BS-to-RN transmissions, take place in the downlink, DL, subframes, while RN-to-BS transmissions take place in the uplink, UL, subframes. For frequency division duplex, FDD, systems, the BS-to-RN and the RN-to-UE transmissions occur in the DL frequency band, while the RN-to-BS and the UE-to-RN transmissions occurs in the UL frequency band. For time division duplex, TDD, systems, the DL BS-to-RN transmissions are carried out in the D subframes, and the UL RN-to-BS transmissions are carried in the U subframes, wherein the D and the U subframes are defined as per subframe configuration for LTE. In case relay nodes are supported by the system or network, there is a specific subframe which is used for the BS-to-RN communication. For FDD systems the RN-to-BS communication occurs four subframes later than the BS-to-RN communication, and for TDD systems the RN-to-BS communication occurs with a predefined offset from the BS-to-RN communication. Control information from the BS to the RN are transmitted using a separate control channel, referred to as the R-PDCCH or relay PDCCH. The R-PDCCH is used for the transmission of control information, like the DCI, from the BS to the RN, and the regular PDCCH is used for the transmission of control information from the RN to the UE.

Figure 3C:
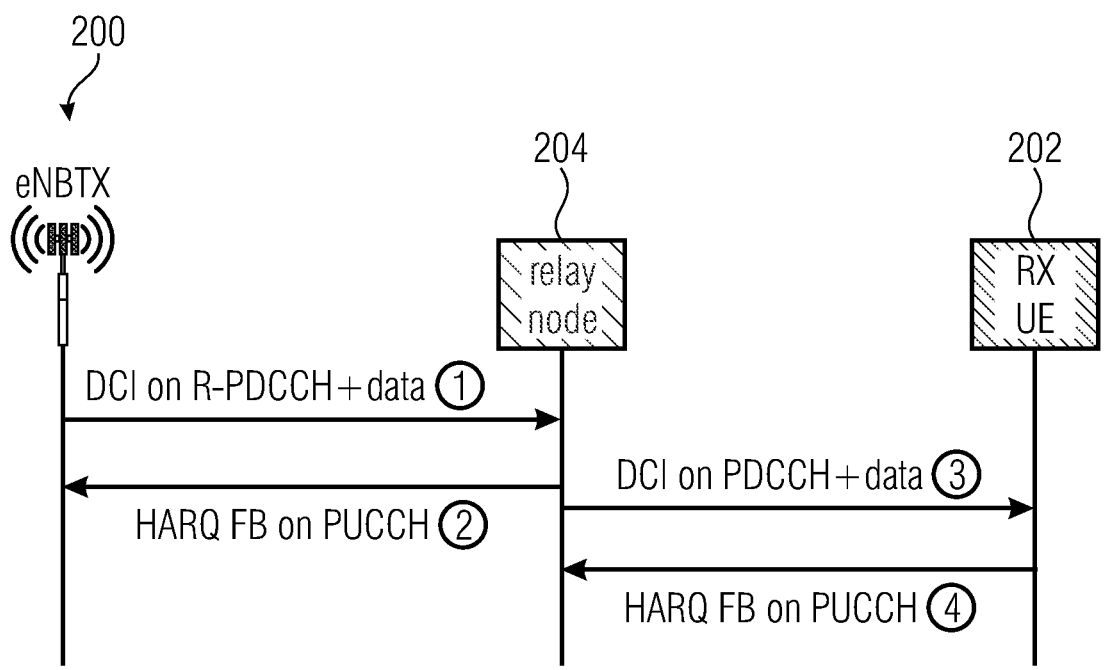

FIG. 3C schematically illustrates the operation of a LTE relay system including a transmitting entity 200, a receiving entity 202 and a relaying entity 204, also referred to as relay UE or relay node, RN. In the example depicted in FIG. 3C, the transmitting entity 200 is a base station or a eNB acting as a transmitter, TX, and the receiving entity 202 is a receiving, RX, UE, also referred to as a remote UE. The relaying entity 204 is an infrastructure device, providing relaying functionality. FIG. 3C illustrates the situation in which the eNB 200 transmits data to the receiving entity 202 via the relaying entity 204. The eNB 200 transmits ① on a downlink channel between the eNB 200 and the relaying entity 204, which includes the control information, like the DCI on the R-PDCCH, and the associated data of the transmission on the PDSCH. The DCI and the data is received at the relaying entity 204. For enhancing reliability for a downlink transmission, the relaying entity 204 provides a feedback ②, for example a HARQ feedback, on the uplink control channel, like the PUCCH, regarding the status of a transmission from the eNB 200 to the relaying entity 204. Responsive to a successful receipt of the data from the eNB 200, the relaying entity 204 transmits ③ the data to the receiving entity 202 on the downlink channel between the relaying entity 204 and the receiving entity 202, more specifically the control information in the control channel, like the DCI on the PDCCH, and the data in the data channel, like the PDSCH. The receiving entity 202 provides a feedback ④, like a HARQ feedback on the uplink control channel between the receiving entity 202 and the relaying entity 204, like the PUCCH, regarding the status of the transmission from the relaying entity 204 to the receiving entity 202. In NR or 5G, in addition to the UE-to-Network relay, also a UE-to-UE relay is supported. In such a scenario, the destination 202 is another UE.

Further to the above-mentioned relays working between a eNB and a receiving entity, also D2D relay nodes or relaying entities are specified in 3GPP, however, only UE-to-network relays are specified. The base station is responsible for broadcasting the configuration for a transmit resource pool to be used for relay discovery, along with a reference signal received quality, RSRQ, threshold for the quality of the Uu link between the base station and the receiving entity. The configuration is broadcasted using the system information blocks, SIBs, 18/19 and the RSRQ threshold is used by the receiving entity to the determine whether to maintain a direct link with a base station or whether to switch to a connection via the relay node, in case the RSRQ goes below a predefined threshold. The receiving entity is to select possible relaying entities and informs the base station of this selection, provided the receiving entity is in coverage of the base station. The base station then schedules or decides the resource allocation for the relay based communication between the relay node and the receiving entity, i.e., the base station determines the resources to be used for the transmission between the receiving entity to the relaying entity.

D2D-communications also include vehicular applications, and an initial vehicle-to-everything, V2X, specification is included in Release 14 of the 3GPP standard. The scheduling and assignment of resources was modified according to the V2X requirements, while the original D2D communication standard is used as a basis for the design. Release 15 of the LTE V2X standard, also known as enhanced V2X or eV2X, and Release 16 of the 5G NR V2X standard introduce a resource pool design including a dedicate feedback channel, along with a control channel and a data channel. Release 17 focuses on sidelink enhancements and sidelink relays, with an emphasis on power saving, enhanced reliability and reduced latency, to cater to not only vehicular communications, but any kind of D2D communications, like public safety and commercial use cases, and it also focuses on using relays to provide UE-to-network and UE-to-UE coverage extensions.

However, as described above, when it comes to feedback in a relay transmission, there is only a feedback about the transmission from the transmitting entity to the relaying entity and from the remote entity to the relaying entity, however, there is no overall feedback where the base station or transmitting entity is made aware that its transmission is successful or unsuccessful with respect to the receiving entity. For example, in LTE, there was no support for physical layer HARQ feedback between the base station and the relaying entity on the physical hybrid ARQ indicator channel, PHICH, for a data transmission from the relaying entity to the base station. Rather the feedback is delivered to higher layers for each transport block, TB, transmitted on the respective uplink data channels, like the PUSCH.

While some kind of feedback between the respective entities when transmitting from a base station to a receiving entity via a relaying entity is given, D2D relays do not support any kind of feedback, let alone an overall feedback from a transmitting UE to the receiving entity via the relaying entity so that the transmitting UE is not aware whether its transmission is successful or unsuccessful at the receiving entity.

Further, in conventional relaying systems, the relay node, like the D2D node, only supports UE-to-network relaying so that the relay node does not need to differentiate the control and data in terms of whether it is intended for the relaying entity or whether it is intended for the receiving entity. LTE relays, for example, achieve this by maintaining a separate control channel, however, with the introduction of relays and since the relays are essentially UEs, there is a need to differentiate the traffic that a UE, acting as a relaying entity, receives. The relaying entity may receive transmissions or packets that are intended for the UE itself, as well as transmissions or packets that are to be relayed to a receiving entity, like a destination UE or receiving entity.

Figure 1A:
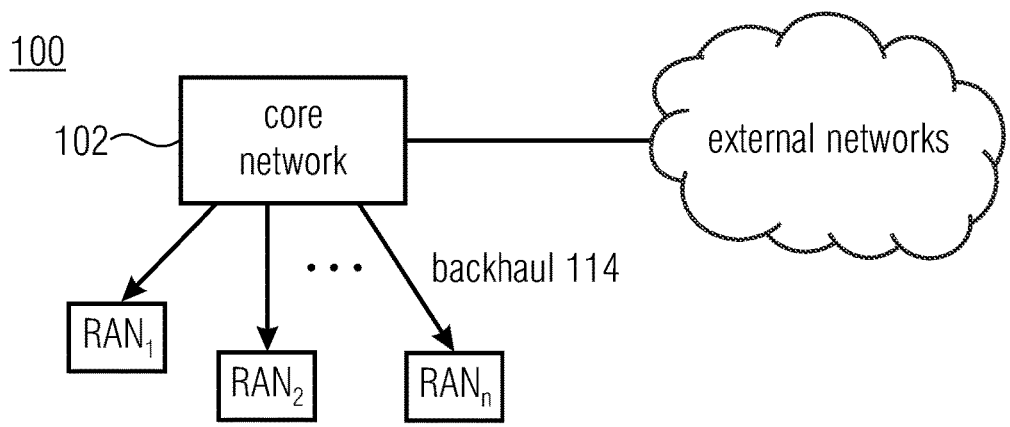
Figure 1B:
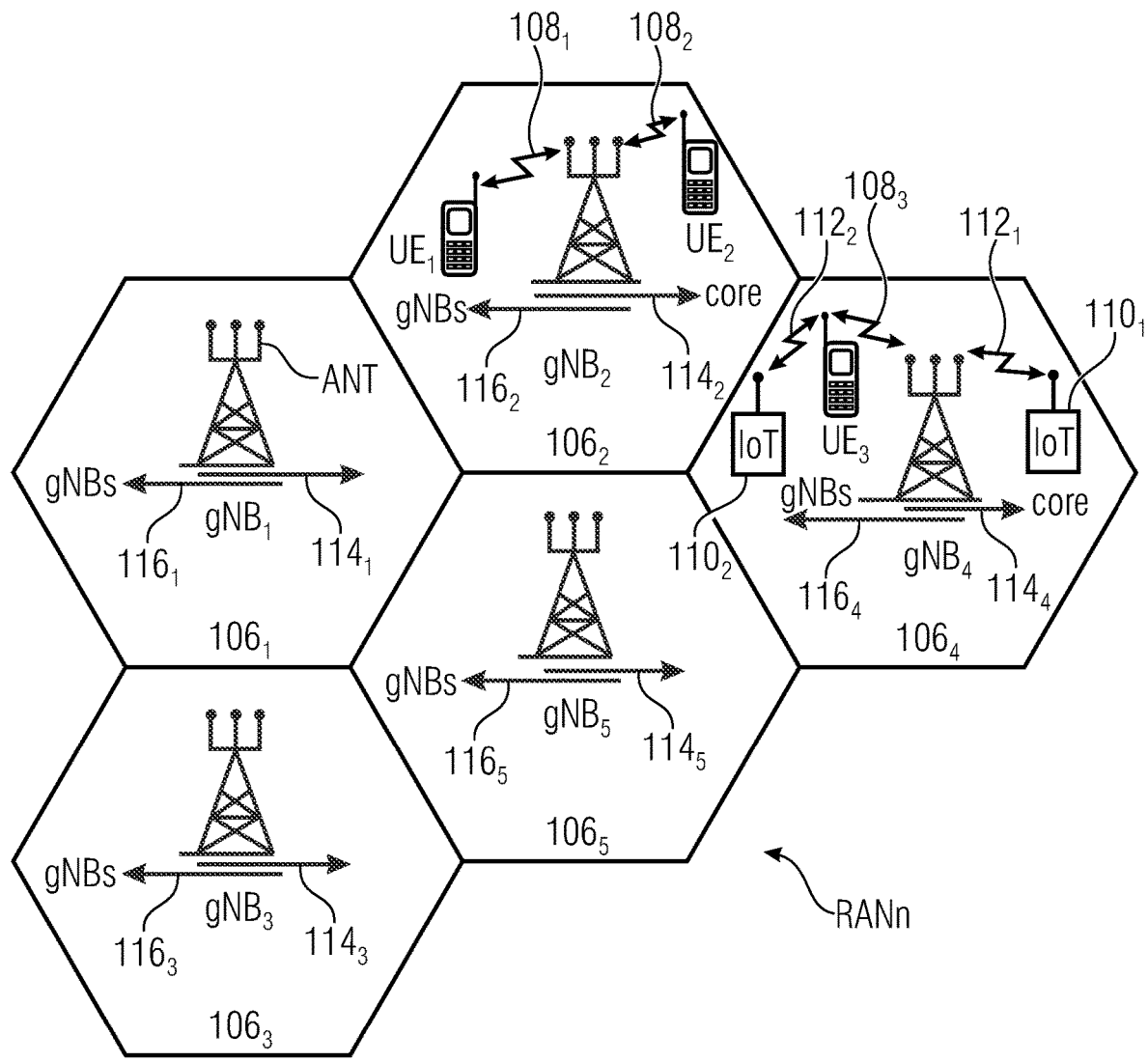
Figure 2A:
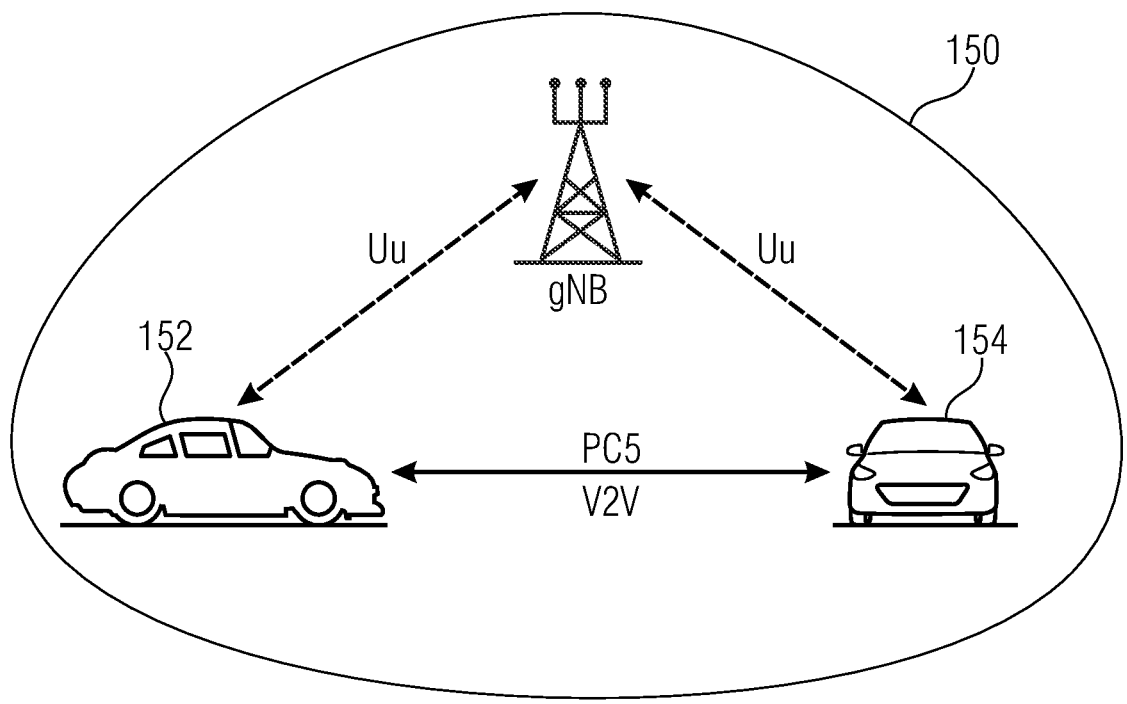
Figure 2B:
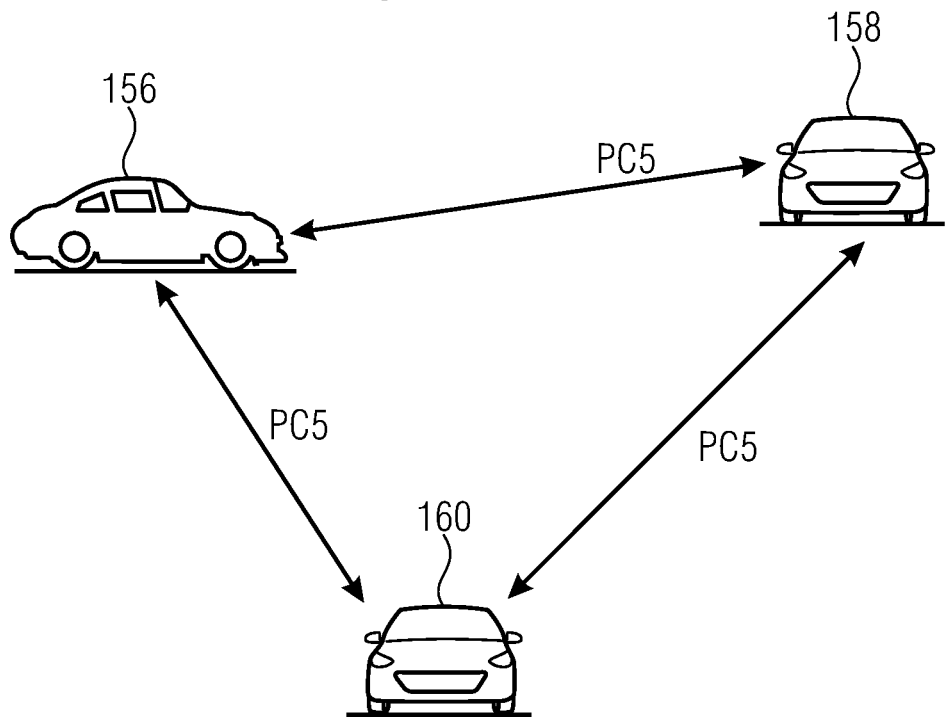
Figure 4:
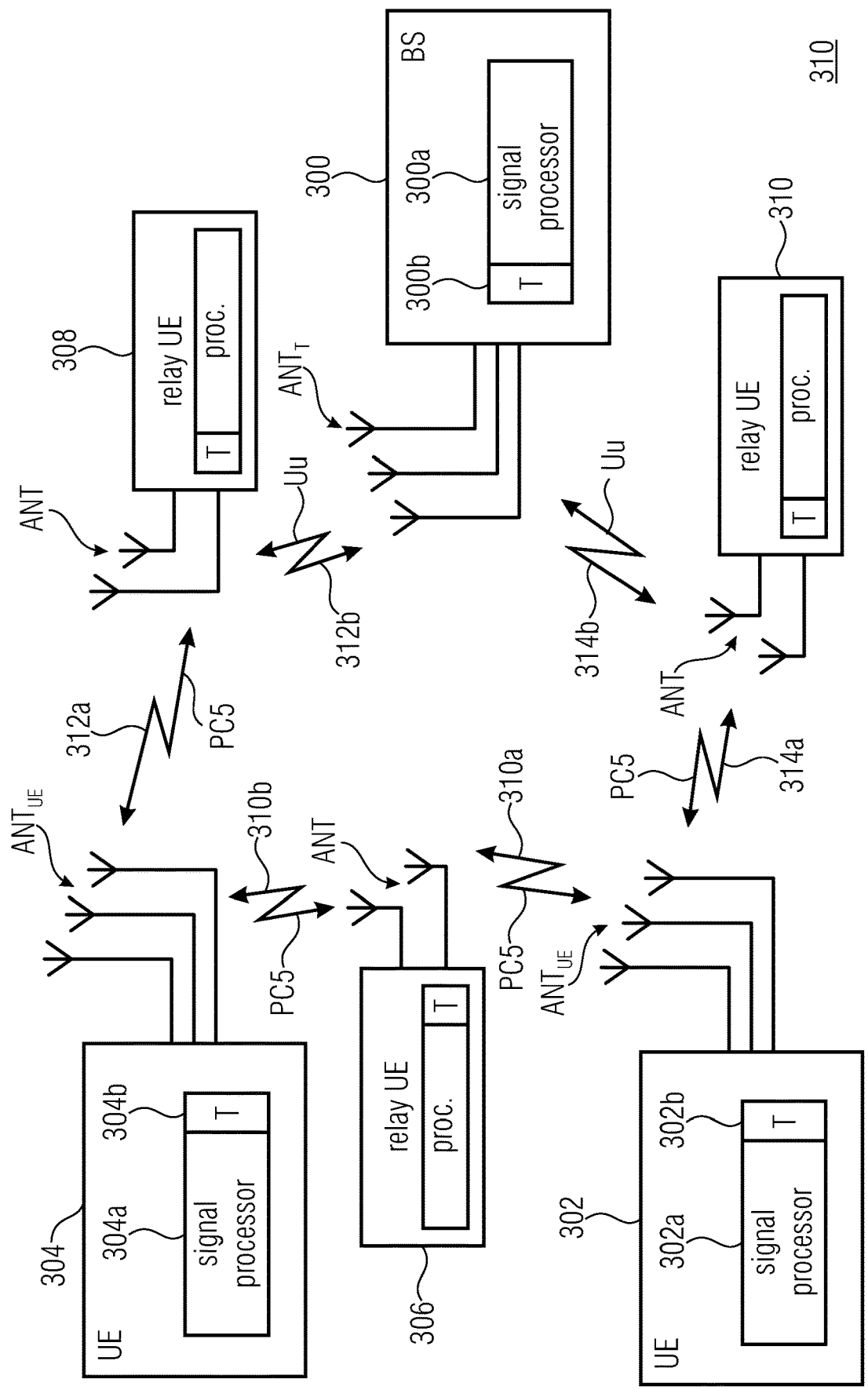
FIG. 4 is a schematic representation of a wireless communication system including a transmitter, like a base station, one or more receivers, like user devices, UEs, and one or more relay UEs for implementing embodiments of the present invention.

The present invention addresses the above issues. Embodiments of the first aspect of the present invention provide approaches for informing the transmitting entity of the final status of the transmission relayed to a receiving entity. Embodiments of a second aspect of the present invention provide approaches for differentiating a transmission, like control and data messages, at the relay node, RN, into transmissions to be relayed, first transmissions, and into transmissions intended for the relay node, second transmissions. Thus, the present invention addresses the above issues and provides improvements and enhancements concerning a feedback over and/or a traffic differentiation by a sidelink relay, like a NR sidelink relay. Embodiments of the present invention may be implemented in a wireless communication system as depicted in FIG. 1 including base stations and users, like mobile terminals or IoT devices. FIG. 4 is a schematic representation of a wireless communication system including a transmitter 300, like a base station or gNB, one or more user devices, UEs, 302, 304 and one or more relaying entities 306, 308 and 310, like relay UEs, for implementing embodiments of the present invention. The transmitter 300 and the receivers 302, 304 may communicate via the respective relaying entities 306, 308, 310 using respective wireless communication links or channels 310a, 310b, 312a, 312b and 314a, 314b, like respective radio links. The transmitter 300 may include one or more antennas $ANT_T$ or an antenna array having a plurality of antenna elements, a signal processor 300a and a transceiver 300b, coupled with each other. The receivers 302, 304 include one or more antennas $ANT_uE$ or an antenna array having a plurality of antennas, a signal processor 302a, 304a, and a transceiver 302b, 304b coupled with each other. Each of the relaying entities 306, 308, 310 includes one or more antennas ANT or an antenna array having a plurality of antennas, a signal processor, and a transceiver T coupled with each other. The base station 300 and the UE 302 may communicate via the relaying entity 310 using the wireless communication link 314b, like a radio link using the Uu interface or another 3GPP or non-3GPP interface, between the base station 300 and the relaying entity 310, and using the wireless communication link 314a, like a radio link using the PC5/sidelink, SL, interface, between the UE 302 and the relaying entity 310. Likewise, the base station 300 and the UE 304 may communicate via the relaying entity 308 using the wireless communication link 312b, like a radio link using the Uu interface, between the base station 300 and the relaying entity 308, and using the wireless communication link 312a, like a radio link using the SL interface, between the UE 304 and the relaying entity 308. The UEs 302, 304 may communicate with each other via the relaying entity 306 using the wireless communication link 310a, like a radio link using the SL interface, between the UE 302 and the relaying entity 306, and using the wireless communication link 310b, like a radio link using the SL interface, between the UE 304 and the relaying entity 310. Any one of the system or network, the one or more UEs 302, 304, the one or more relaying entities 306-310 and/or the base station 300, as illustrated in FIG. 4, may operate in accordance with the inventive teachings described herein. In the following description, the relaying entity is referred to as relay UE.

First Aspect

A first aspect of the present invention addresses the issue that there is no current method in a relaying transmission system where the actual transmitting entity, like the base station or the UE, is made aware of the status of the transmission at the receiving entity, like a UE or a base station, when transmitting through a relay node or relay UE.

Relay UE

According to a first aspect, the present invention provides a user device, UE, for a wireless communication network,
    wherein the UE is to act as a relaying entity so as to provide functionality to support connectivity between a transmitting entity and one or more receiving entities of the wireless communication network, and
    wherein, responsive to receiving a transmission from the transmitting entity and to relaying the transmission towards the receiving entity, the UE is to transmit a feedback to the transmitting entity, the feedback indicating a successful and/or non-successful receipt of the transmission at the receiving entity.

In accordance with embodiments,
in case the UE receives a feedback from the receiving entity indicating a successful and/or non-successful receipt of the transmission at the receiving entity, like a HARQ-ACK or a HARQ-NACK, the UE is to transmit to the transmitting entity the feedback received from the receiving entity, and
in case the UE receives no feedback from the receiving entity, the UE is signal to the transmitting entity a non-successful receipt of the transmission at the receiving entity, like a HARQ-NACK.

In accordance with embodiments, in case the UE receives a feedback from the receiving entity indicating a successful receipt of the transmission at the receiving entity, like a HARQ-ACK, the UE is to transmit to the transmitting entity the feedback received from the receiving entity within a configured or pre-configured time window following the receipt of the feedback, e.g., at an earliest possible opportunity.

In accordance with embodiments, in case the UE receives a feedback from the receiving entity indicating a non-successful receipt of the transmission at the receiving entity, like a HARQ-NACK, the UE is to
transmit to the transmitting entity the feedback received from the receiving entity within a configured or pre-configured time window following the receipt of the feedback, e.g., at an earliest possible opportunity, and not retransmit the transmission to the receiving entity, or
retransmit the transmission to the receiving entity, and continue to retransmit the transmission with the same or with different transmission parameters, e.g., MCS or coding rate, until a feedback indicating a successful receipt of the transmission is received from the receiving entity, and transmit to the transmitting entity the successful feedback received from the receiving entity, or until one or more of predefined events occur.

In accordance with embodiments, the one or more of the following events include:
a configured or pre-configured timer, during which the UE carries out the retransmissions, elapses, or
a configured or pre-configured maximum number of relay retransmissions which the UE carries out is reached.

In accordance with embodiments, responsive to the one or more events, the UE is to transmit to the transmitting entity a feedback indicating a non-successful receipt of the transmission at the receiving entity, like a HARQ-NACK, within a configured or pre-configured time window following the receipt of the feedback, e.g., at an earliest possible opportunity.

In accordance with embodiments, the UE is to receive the transmission from the transmitting entity over a direct interface, like a sidelink, or over an access network interface, like a 3GPP or non-3GPP interface.

In accordance with embodiments,
the transmitting entity comprises a user device, UE, or a relaying entity, and the receiving entity comprises a user device, UE, or a relaying entity, or
the transmitting entity comprises a user device, UE, or a relaying entity and the receiving entity comprises a network entity, like a radio access network, RAN, entity, or
the transmitting entity comprises a network entity, like a RAN entity, and the receiving entity comprises a user device, UE, or a relaying entity.

In accordance with embodiments, the feedback received from the receiving entity includes, in addition to indicating a successful and/or non-successful receipt of the transmission at the receiving entity, additional information, like one or more of:
a link quality between the UE and the receiving entity,
a distance measure or a zone ID, indicating the distance between the UE and the receiving entity,
additional data assisting the transmitting entity to ensure that the receiving entity successfully receives the transmissions,
an indication that the receiving entity intends to transmit data to the transmitting entity (e.g. scheduling request SR or buffer status report BSR),
a signal from the receiving entity indicating to stop the HARQ/transmission process,
a beam index, of the best beam or top-m beams received at the receiving UE and transmitted from the UE.

In accordance with embodiments, the feedback received from the receiving entity is an aggregated feedback indicating a successful and/or non-successful receipt of two or more transmissions at the receiving entity.

In accordance with embodiments, the aggregated feedback may include one or more of:
an indication that within a predefined time window, some or all transmissions, like packets, are received successfully or non-successfully,
an indication that a predefined number of transmissions, like packets, are received successfully or non-successfully,
which of the transmissions, like packets, are received successfully and/or which of the transmissions, like packets, are received non-successfully or failed,
which of the successfully received transmissions, like packets, are received with an exceeded delay budget,
an indication of a deteriorating link quality between the UE and the receiving entity, e.g., that the link quality is approaching or is below a configured or preconfigured threshold,
an update indicating a new maximum possible QoS over the relay link between the UE and the remote UE.

In accordance with embodiments, the UE is to transmit the feedback received from the receiving entity in the physical, PHY, layer, e.g. using the PSFCH in case the transmitting entity is a UE or a relaying entity, or the PUCCH or PUSCH in the case the transmitting entity is a network entity.

In accordance with embodiments,
responsive to receiving the transmission from the transmitting entity, the UE is to transmit a further feedback to the transmitting entity using a first feedback link between the transmitting entity and the UE, the further feedback indicating a successful and/or non-successful receipt of the transmission at the UE, like a HARQ-ACK or a HARQ-NACK, and
the UE is to transmit the feedback associated with the receiving entity using a second feedback link between the transmitting entity and the UE, the first and second feedback links using different resources in an existing PHY channel, e.g. using the PSFCH in case the transmitting entity is a UE or a relaying entity, or the PUCCH or PUSCH in the case the transmitting entity is a network entity.

In accordance with embodiments, in case the transmitting entity is another UE or a relaying entity, the UE is to transmit the feedback received from the receiving entity using the PSFCH, the resources for transmitting the feedback received from the receiving entity being mapped
- implicitly by a relationship between the mapping on the PSFCH resources for a feedback transmission from the receiving entity to the UE and a feedback transmission from the UE to the transmitting entity, or
- explicitly by the transmitting entity indicating to the UE which resources on the PSFCH are to be used for the reporting of feedback associated with the receiving entity.

In accordance with embodiments, in case the transmitting entity is a network entity, the UE is to transmit the feedback received from the receiving entity using the PUCCH or PUSCH resources.

In accordance with embodiments, the UE is to receive from the network entity the resources to be used for reporting the feedback received from the receiving entity and the further feedback, e.g., in a DCI.

In accordance with embodiments,
- a connection between the transmitting entity and the UE comprises a feedback link in an existing PHY channel, e.g. using the PSFCH in case the transmitting entity is a UE or a relaying entity, or the PUCCH or PUSCH in the case the transmitting entity is a network entity, for indicating a successful and/or non-successful receipt of the transmission at the UE, and
- the UE is to transmit on the feedback link the feedback received from the receiving entity instead of a feedback indicating a successful and/or non-successful receipt of the transmission at the UE.

In accordance with embodiments, in case the transmitting entity is another UE or a relaying entity, the UE is to transmit the feedback received from the receiving entity using the PSFCH resources scheduled by the transmitting entity for the feedback indicating a successful and/or non-successful receipt of the transmission at the UE.

In accordance with embodiments, in case the transmitting entity is a network entity, the UE is to transmit the feedback received from the receiving entity using the PUCCH or PUSCH resources scheduled by the transmitting entity for the feedback indicating a successful and/or non-successful receipt of the transmission at the UE.

In accordance with embodiments, if the feedback received from the receiving entity indicates an unsuccessful transmission, the feedback also contains information about the particular connection that resulted in the unsuccessful transmission.

In accordance with embodiments, the indication for the faulty connection to the transmitter entity includes a single bit indicator and/or a two bit indicator to indicate whether the unsuccessful transmission occurred on the connection between the transmitter entity and the UE, and/or the connection between the UE and the receiving entity.

In accordance with embodiments, the UE is to transmit the feedback received from the receiving entity in the medium access control, MAC, layer.

In accordance with embodiments, the UE is to transmit the feedback received from the receiving entity using a MAC control element, MAC CE.

In accordance with embodiments, responsive to receiving the transmission from the transmitting entity, the UE is to transmit a further feedback to the transmitting entity using a feedback channel in the PHY layer between the transmitting entity and the UE, the further feedback indicating a successful and/or non-successful receipt of the transmission at the UE, like a HARQ-ACK or a HARQ-NACK.

In accordance with embodiments, the UE is to transmit the feedback received from the receiving entity in the radio link control, RLC, layer.

In accordance with embodiments,
- the transmitting entity is operating in acknowledge mode, AM, and the feedback received from the receiving entity is an RLC ACK, and
- the UE is to receive the RLC ACK from the receiving entity and to forward the RLC ACK from the receiving entity to the transmitting entity so as to provide an end-to-end feedback replacing an RLC ACK from UE to the transmitting entity.

In accordance with embodiments,
- the transmitting entity is operating in acknowledge mode, AM, and
- the UE is to transmit a first RLC ACK responsive to successfully receiving the transmission from the transmitting entity, and a second RLC ACK as the feedback received from the receiving entity responsive to receiving a confirmation that the transmission is successfully received at the receiving entity.

In accordance with embodiments, the user device comprises one or more of the following: a mobile terminal, or a stationary terminal, or a cellular IoT-UE, or a vehicular UE, or a group leader (GL) UE, or an IoT or narrowband IoT, NB-IoT, device, or wearable device, like a smartwatch, or a fitness tracker, or smart glasses, or a ground based vehicle, or an aerial vehicle, or a drone, or a moving base station, or road side unit (RSU), or a building, or any other item or device provided with network connectivity enabling the item/device to communicate using the wireless communication network, e.g., a sensor or actuator, or any other item or device provided with network connectivity enabling the item/device to communicate using a sidelink the wireless communication network, e.g., a sensor or actuator, or any sidelink capable network entity.

Transmitting Entity

According to the first aspect, the present invention provides a transmitting entity for a wireless communication network,
- wherein the transmitting entity is connectable to a relaying entity so as to provide functionality to support connectivity between the transmitting entity and one or more receiving entities of the wireless communication network, and
- wherein, responsive to sending a transmission to the relaying entity for relaying to the receiving entity, the transmitting entity is to receive from the relaying entity a feedback, the feedback indicating a successful and/or non-successful receipt of the transmission at the receiving entity, like a HARQ-ACK or a HARQ-NACK.

In accordance with embodiments,
- in case the relaying entity receives feedback from the receiving entity indicating a successful and/or non-successful receipt of the transmission at the receiving entity, like a HARQ-ACK or a HARQ-NACK, the transmitting entity is to receive from the relaying entity a feedback received from the receiving entity, and
- in case the relaying entity receives no feedback from the receiving entity, the transmitting entity is to receive from the relaying entity a signaling of a non-successful receipt of the transmission at the receiving entity, like a HARQ-NACK.

In accordance with embodiments, responsive to the feedback from the relaying entity indicating a non-successful receipt of the transmission at the receiving entity, or no feedback from the relaying entity within a configured or pre-configured time period, the transmitting entity to initiate a retransmission with modified transmission parameters, e.g. MCS or coding rate, or try another route using another relay UE.

In accordance with embodiments, the transmitting entity is to send the transmission over a direct interface, like a sidelink, or over a network interface, like a 3GPP or non-3GPP interface to the relaying entity.

In accordance with embodiments,
the transmitting entity comprises a user device, UE, or a relaying entity, and the receiving entity comprises a user device, UE, or a relaying entity, or
the transmitting entity comprises a user device, UE, or a relaying entity, and the receiving entity comprises a network entity, like a radio access network, RAN, entity, or
the transmitting entity comprises a network entity, like a RAN entity, and the receiving entity comprises a user device, UE, or a relaying entity.

In accordance with embodiments, the transmitting entity is to receive the feedback received from the receiving entity in one of the physical, PHY, layer, the medium access control, MAC, layer or the radio link control, RLC, layer.

In accordance with embodiments, the transmitting entity comprises a timer indicating a time period starting at the sending of the transmission and within which the transmitting entity is to expect to receive the feedback received from the receiving entity from the relaying entity.

In accordance with embodiments, responsive to a lapse of the time, the transmitting entity is to assume that the receiving entity was unsuccessful in receiving the transmission, and trigger a retransmission of the transmission, e.g., in accordance with a configured or preconfigured retransmission scheme.

In accordance with embodiments, responsive to a certain event, the transmitting entity is to trigger to relay reselection process.

In accordance with embodiments, the certain event includes one or more of:
a number, a ratio or a percentage of feedbacks indicting a non-successful reception of the transmission at the receiving entity, like a HARQ failure or HARQ-NACK, approaching or exceeding a configured or preconfigured threshold, wherein the threshold may be less than a configured or preconfigured maximum number of retransmissions for the transmission,
a degradation of the link quality of the relay link between the relaying entity and the receiving entity,
a change of a beam index,
a communication distance is approaching or exceeding the minimum communication range requirement between either the UE and the receiving entity, or the UE and the transmitting entity,
change of location e.g. indicated by a change of Zone ID,
a battery level of the relaying entity is approaching or exceeding a configured or preconfigured threshold.

In accordance with embodiments, responsive to the feedback received from the receiving entity indicating a non-successful reception of the transmission at the receiving entity, the transmitting entity is to maintain the transmission, e.g., in the MAC layer, for the transmission of the transmission via a different relaying entity.

In accordance with embodiments, in case the feedback received from the receiving entity is received in the MAC layer, the transmitting entity is to receive from the relaying entity a further feedback using a feedback link in PHY channel between the transmitting entity and the relaying entity, the further feedback indicating a successful and/or non-successful receipt of the transmission at the relaying entity, like a HARQ-ACK or a HARQ-NACK.

In accordance with embodiments, the transmitting entity comprises one or more of the following: a macro cell base station, or a small cell base station, or a central unit of a base station, or an IAB node, or a distributed unit of a base station, or a road side unit (RSU), or a UE, or a group leader (GL), or a relay or a remote radio head, or an AMF, or an MME, or an SMF, or a core network entity, or mobile edge computing (MEC) entity, or a network slice as in the NR or 5G core context, or any transmission/reception point, TRP, enabling an item or a device to communicate using the wireless communication network, the item or device being provided with network connectivity to communicate using the wireless communication network.

Network

According to the first aspect, the present invention provides a wireless communication network, comprising
a transmitting entity according to the present invention,
one or more remote user devices, receiving entity, and
one or more user devices, relaying entity, according to the present invention providing functionality to support connectivity between the transmitting entity and the one or more receiving entities.

In accordance with embodiments, the wireless communication network comprises
a base station,
wherein the transmitting entity is another UE or a relaying entity, and wherein the relaying entity and the transmitting entity operate in Mode 1 so that the base station indicates the resources to be used by the transmitting entity and the relaying entity.

In accordance with embodiments,
(1) the transmitting entity is to send a Buffer Status Report, BSR, to the base station requesting resources for a transmission of data to the relaying entity,
(2) the base station is to send a control message, like a Downlink Control Information, DCI, to the transmitting entity including resources for the transmission to the relaying entity,
(3) the transmitting entity is to send a sidelink control message, like Sidelink Control Information, SCI, and the data to the relaying entity using resources indicated in the control message received in (2),
(4) the relaying entity is to send a HARQ feedback to the transmitting entity,
(5) the transmitting entity is to report the HARQ feedback from the relaying entity to the base station,
(6) the relaying entity, if it received the data successfully, is to send a scheduling request, SR, to the base station requesting for resources for relaying the transmission received from the transmitting entity,
(7) the base station is to send a control message, like a Downlink Control Information, DCI, to the relaying entity including resources for the transmission to the receiving entity,
(8) the relaying entity is to send a sidelink control message, like Sidelink Control Information, SCI, and the data to the receiving entity using resources indicated in the control message received in (7),
(9) the receiving entity is to send a HARQ feedback to the relaying entity, and
(10) the relaying entity is to report the HARQ feedback of the receiving entity to the transmitting entity.

In accordance with embodiments,
(1) the transmitting entity is to send a Buffer Status Report, BSR, to the base station requesting for resources for a transmission of data to the relaying entity, and to indicate to the base station that the transmission is to be relayed to the receiving entity,
(2) the base station is to send a control message, like a Downlink Control Information, DCI, to the transmitting entity including resources for the transmission to the relaying entity,
(3) the transmitting entity is to send a sidelink control message, like Sidelink Control Information, SCI, and the data to the relaying entity using resources indicated in the control message received in (2),
(4) the relaying entity is to send a HARQ feedback to the transmitting entity,
(5) the transmitting entity is to report the HARQ feedback from the relaying entity to the base station,
(6) the relaying entity is to send a sidelink control message, like Sidelink Control Information, SCI, and the data to the receiving entity using resources with which the relaying entity is configured or preconfigured,
(7) the receiving entity is to send a HARQ feedback to the relaying entity, and
(8) the relaying entity is to report the HARQ feedback of the receiving entity to the transmitting entity.

In accordance with embodiments,
the relaying entity is configured or preconfigured with resources via configured grants for the transmission of the data to the receiving entity, and
in case the base station determines that the resources in the configured grants are not sufficient for the transmission of the data from the relaying entity to the receiving entity, the base station is to provide to the relaying entity a control message, like a Downlink Control Information, DCI, indicating additional resources for the transmission to the relaying entity.

In accordance with embodiments, the wireless communication network comprises
a base station,
wherein the transmitting entity is another UE or a relaying entity, operating in Mode 1 so that the base station indicates the resources to be used by the transmitting entity, and
wherein the relaying entity operates in Mode 2 so that the base station does not provide assistance for the resource allocation at the relaying entity, but the relaying entity autonomously carries out resource selection and allocation.

In accordance with embodiments,
(1) the transmitting entity is to send a Buffer Status Report, BSR, to the base station requesting for resources for a transmission of data to the to the relaying entity,
(2) the base station is to send a control message, like a Downlink Control Information, DCI, to the transmitting entity including resources for the transmission to the relaying entity,
(3) the transmitting entity is to send a sidelink control message, like Sidelink Control Information, SCI, and the data to the relaying entity using resources indicated in the control message received in (2),
(4) the relaying entity is to send a HARQ feedback to the transmitting entity,
(5) the transmitting entity is to report the HARQ feedback of the relaying entity to base station,
(6) the relaying entity is to identify and select resources determined by sensing and to send a sidelink control message, like Sidelink Control Information, SCI, and the data to the receiving entity using the identified and selected resources,
(7) the receiving entity is to send a HARQ feedback to the relaying entity, and
(8) the relaying entity is to report the HARQ feedback of the receiving entity to the transmitting entity.

In accordance with embodiments, operations (5) and (6) are performed at least partially or fully in parallel.

In accordance with embodiments, the wireless communication network comprises
a base station,
wherein the transmitting entity is another UE or a relaying entity, operating in Mode 2 so that the base station does not provide assistance for the resource allocation at the transmitting entity, but the transmitting entity autonomously carries out resource selection and allocation, and
wherein the relaying entity operates in Mode 1 so that the base station indicates the resources to be used by the relaying entity.

In accordance with embodiments,
(1) the transmitting entity is to identify and select resources determined by sensing for a transmission of data to the relaying entity by sensing,
(2) the transmitting entity is to send a sidelink control message, like Sidelink Control Information, SCI, and the data to the relaying entity using the identified and selected resources,
(3) the relaying entity is to send a HARQ feedback to the transmitting entity,
(4) the relaying entity is to send a scheduling request, SR, to the base station requesting for resources for relaying the transmission received from the transmitting entity,
(5) the base station is to send a control message, like a Downlink Control Information, DCI, to the relaying entity including resources for the transmission to the receiving entity,
(6) the relaying entity is to send a sidelink control message, like Sidelink Control Information, SCI, and the data to the receiving entity using resources indicated in the control message received in (5),
(7) the receiving entity is to send a HARQ feedback to the relaying entity, and
(8) the relaying entity is to report the HARQ feedback of the receiving entity to the transmitting entity.

In accordance with embodiments,
(1) the transmitting entity is to request the relaying entity for resources to be assigned by the base station,
(2) the relaying entity is to send a scheduling request, SR, to the base station requesting for resources for the transmitting entity for a transmission of data to the relaying entity and for the relaying entity for relaying the transmission received from the transmitting entity to the receiving entity,
(3) the base station is to send one or more control messages, like a Downlink Control Information, DCI, to the relaying entity including the resources for the transmission by the transmitting entity and the resources for the transmission which the relaying entity is to use to relay the transmission to the receiving entity
(4) the relaying entity is to send to the transmitting entity a message, like an Assistance Information Message, AIM, including the resources to be used by the transmitting entity, (5) the transmitting entity is to send a sidelink control message, like Sidelink Control Information, SCI, and the data to the relaying entity using the resources received by the message or by a combination of the message and sensing results,
(6) the relaying entity is to send a HARQ feedback to the transmitting entity,
(7) the relaying entity is to send a sidelink control message, like Sidelink Control Information, SCI, and the data to the receiving entity using resources indicated in the control message received in (3),
(8) the receiving entity is to send a HARQ feedback to the relaying entity, and
(9) the relaying entity is to report the HARQ feedback of the receiving entity to the transmitting entity.

In accordance with embodiments,
the transmitting entity is a base station of the wireless communication network, and
the relaying entity operates in Mode 1 so that the base station indicates the resources to be used by the relaying entity.

In accordance with embodiments,
(1) the base station is to transmit a control message, like a Downlink Control Information, DCI, and the data to the relaying entity,
(2) the relaying entity is to send a HARQ feedback, e.g., on the PUCCH, to the base station,
(3) the relaying entity is to send a scheduling request, SR, to the base station requesting for resources for relaying the transmission to the receiving entity,
(4) the base station is to send a control message, like a Downlink Control Information, DCI, to the relaying entity including resources for the transmission to the receiving entity,
(5) the relaying entity is to send a sidelink control message, like Sidelink Control Information, SCI, and the data to the receiving entity using resources indicated in the control message received in (4),
(6) the receiving entity is to send a HARQ feedback to the relaying entity, and
(7) the relaying entity is to report the HARQ feedback of the receiving entity to the base station.

In accordance with embodiments,
(1) the base station is to transmit one or more control messages, like a Downlink Control Information, DCI, and the data to the relaying entity, one or more the control messages including resources to be used by the relaying entity to transmit the data to the receiving entity,
(2) the relaying entity is to send a HARQ feedback, e.g., on the PUCCH, to the base station,
(3) the relaying entity is to send a sidelink control message, like Sidelink Control Information, SCI, and the data to the receiving entity using resources indicated in the control message received in (1),
(4) the receiving entity is to send a HARQ feedback to the relaying entity, and
(5) the relaying entity is to report the HARQ feedback of the receiving entity to the base station.

In accordance with embodiments,
the transmitting entity is a base station of the wireless communication network, and
the relaying entity operates in Mode 2 so that the base station does not provide assistance for the resource allocation at the relaying entity, but the relaying entity autonomously carries out resource selection and allocation.

In accordance with embodiments,
(1) the base station is to transmit a control message, like a Downlink Control Information, DCI, and the data to the relaying entity,
(2) the relaying entity is to send a HARQ feedback, e.g., on the PUCCH, to the base station,
(3) the relaying entity is to identify and select resources determined by sensing to be used for transmitting the data to the receiving entity,
(4) the relaying entity is to send a sidelink control message, like Sidelink Control Information, SCI, and the data to the receiving entity using the identified and selected resources,
(5) the receiving entity is to send a HARQ feedback to the relaying entity, and
(6) the relaying entity is to report the HARQ feedback of the receiving entity to the base station.

In accordance with embodiments,
the receiving entity is a base station,
the transmitting entity is another UE or a relaying entity operating in Mode 2 so that the base station does not provide assistance for the resource allocation at the transmitting entity, but the transmitting entity autonomously carries out resource selection and allocation, and
the relaying entity operates in Mode 1 so that the base indicates the resources to be used by the relaying entity.

In accordance with embodiments,
(1) the transmitting entity is to identify and select resources determined by sensing for a transmission of data to the relaying entity,
(2) the transmitting entity is to send a sidelink control message, like Sidelink Control Information, SCI, and the data to the relaying entity using the identified and selected resources,
(3) the relaying entity is to send a HARQ feedback to the transmitting entity,
(4) the relay node is to send a scheduling request, SR, e.g., using Uplink Control Information, UCI, to the base station requesting for resources for the transmission of the data from the relaying entity to the base station,
(5) the base station is to send a control message, like a Downlink Control Information, DCI, to the relaying entity including resources for the transmission,
(6) the relaying entity is to send the data to the base station using resources indicated in the control message received in (5),
(7) the base station is to send a feedback to the relaying entity, and
(8) the relaying entity is to report the HARQ feedback of the base station to the transmitting entity.

In accordance with embodiments,
(1) the transmitting entity is to request the relaying entity for resources to be assigned by the base station,
(2) the relaying entity is to send a scheduling request, SR, e.g., using Uplink Control Information, UCI, to the base station requesting for resources to be used by the transmitting entity and by the relaying entity for the transmission of data from the transmitting entity to the base station
(3) the base station is to send one or more control messages, like a Downlink Control Information, DCI, to the relaying entity, the one or more control messages including resources for transmission to be used by the transmitting entity and by the relaying entity for the transmission, (4) the relaying entity is to send to the transmitting entity a message, like an Assistance Information Message, AIM, including the resources to be used by the transmitting entity, (5) the transmitting entity is to send a sidelink control message, like Sidelink Control Information, SCI, and the data to the relaying entity using the resources received by the message or by a combination of the message and sensing results, (6) the relaying entity is to send a HARQ feedback to the transmitting entity, (7) the relaying entity is to send the data to base station using the resources indicated in the control message using resources indicated in the control message received in (3), (8) the base station is to send a feedback to the relaying entity, and (9) the relaying entity is to report the HARQ feedback of the base station to the transmitting entity.

In accordance with embodiments, the feedback provided by the base station comprises an implicit feedback to the relaying entity, e.g., by using a combination of a HARQ process ID and an NDI to indicate whether a retransmission is needed, or a downlink feedback indicator, DFI.

In accordance with embodiments, the base station comprises one or more of the following: a macro cell base station, or a small cell base station, or a central unit of a base station, or an IAB node, or a distributed unit of a base station, or a road side unit (RSU), or a remote radio head, or an AMF, or an MME, or an SMF, or a core network entity, or mobile edge computing (MEC) entity, or a network slice as in the NR or 5G core context, or any transmission/reception point, TRP, enabling an item or a device to communicate using the wireless communication network, the item or device being provided with network connectivity to communicate using the wireless communication network.

Methods

According to the first aspect, the present invention provides a method for operating a user device, UE, for a wireless communication network, wherein the UE is to act as a relaying entity so as to provide functionality to support connectivity between a transmitting entity and one or more receiving entities of the wireless communication network, the method comprising:

responsive to receiving a transmission from the transmitting entity and to relaying the transmission towards the receiving entity, transmitting a feedback to the transmitting entity, the feedback indicating a successful and/or non-successful receipt of the transmission at the receiving entity.

According to the first aspect, the present invention provides a method for operating a transmitting entity for a wireless communication network, the transmitting entity being connected to a relaying entity so as to provide functionality to support connectivity between the transmitting entity and one or more receiving entities of the wireless communication network, the method comprising:

responsive to sending a transmission to the relaying entity for relaying to the receiving entity, receiving from the relaying entity a feedback, the feedback indicating a successful and/or non-successful receipt of the transmission at the receiving entity, like a HARQ-ACK or a HARQ-NACK.

Computer Program Product

Embodiments of the first aspect of the present invention provide a computer program product comprising instructions which, when the program is executed by a computer, causes the computer to carry out one or more methods in accordance with the present invention.

Embodiments of the first aspect of the present invention provide approaches for informing the transmitting entity of the final status of a transmission relayed towards a receiving entity, while further embodiments address the functionality of the relay UE when operating in Mode 1 or Mode 2 and how a relay UE may support a transmitting entity in the resource allocation. When operating in Mode 1, a base station indicates the resources to be used by an entity, like the transmitting entity and the relay UE or assists in the scheduling of resources at the entity. In other words, in Mode 1 the base station schedules the resources for the entity. The base station may provide resources over dynamic grants, or the base station may use configured grants to provide a grant of resources for the entity to choose from. When operating in Mode 2, a base station does not provide assistance for the resource allocation at an entity, like the transmitting entity and the relay UE, but the entity autonomously carries out resource selection and allocation. Thus, embodiments of the first aspect of the present invention provide approaches for transmitting and receiving feedback for a transmission or a packet transmitted from a transmitting entity towards a receiving entity via a relay UE, also referred to as a relay node, RN. A transmission from a transmitting entity towards a receiving entity via a relay UE may mean that the transmission is from relay UE to another relay UE, like a multi-hop relaying system where the relay chain or path may be as follows: transmitting entity→relay UE A→relay UE B→receiving entity, or that the transmission is directly from the relay UE to the receiving entity, like a single hop relaying system where the relay chain or path may be as follows: transmitting entity→relay UE→receiving entity.

Figure 5:
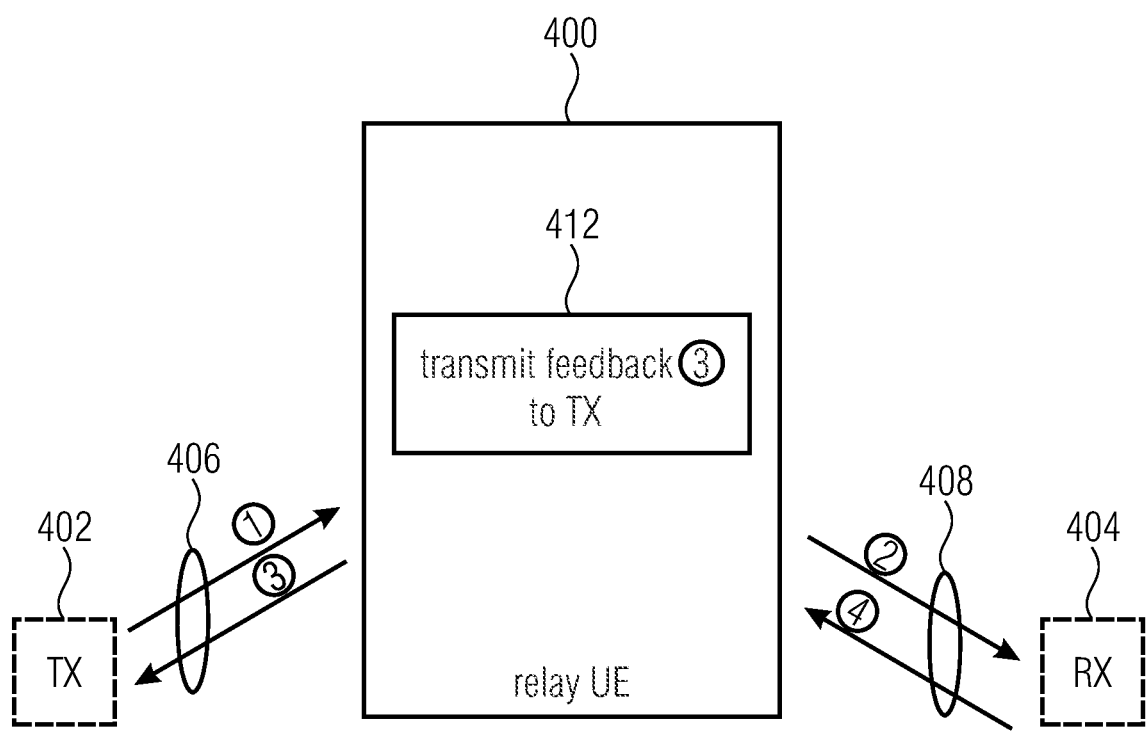
FIG. 5 illustrates an embodiment of a relay UE in accordance with the first aspect of the present invention.

FIG. 5 illustrates an embodiment of a UE 400 that acts a relay UE so as to provide functionality to support connectivity between a transmitting entity 402 and one or more receiving entities 404, like a UE or a network entity of a wireless communication system or network, like the system or network described above with reference to FIG. 1. In FIG. 5, the relay UE 400 is connected to the transmitting entity 402 via a first link or connection 406, and the relay UE 400 is connected to the receiving entity 404 via a second link or connection 408. When acting as a relay, relay UE 400 receives from the transmitting entity or TX UE 402 over the first connection 406 a transmission ①, like data or one or more data packets and the associated control data, if any. The relay UE 400 may or may not transmit a feedback to the transmitting entity 402 indicating a successful and/or unsuccessful receipt of the transmission at the relay UE 400. If it does transmit this feedback, it uses the same feedback channel (PSFCH) as indicated by ③, but over different resources. The relay UE 400 relays the transmission ② over the second sidelink connection towards the receiving entity or RX UE 404. In case the relayed transmission ② is received at the RX UE 404, it sends a feedback ④ over the second connection 408 to the relay UE which receives the feedback. The relay UE 400, as is indicated at 412, transmits the feedback ③ which is or includes the feedback ④ from the RX UE 404 over the first connection 406 to the TX UE 402. The feedback ④ indicates a status of the transmission at the RX UE 404, for example, a successful and/or non-successful receipt of the transmission of the data at the RX UE 404 may be indicated. The feedback may include a positive HARQ-acknowledgement, HARQ-ACK, or a negative HARQ-non-acknowledgement, HARQ-NACK. In case the relay UE 400 does not receive any feedback or no feedback within a configured or preconfigured time window from the RX UE 404, e.g., because the relayed transmission ② is not received or nor recognized at the RX UE 404, the relay UE 400 signals to the transmitting entity 402 the feedback ③ indicating a non-successful receipt of the transmission at the RX UE 404, like a HARQ-NACK.

Figure 6:
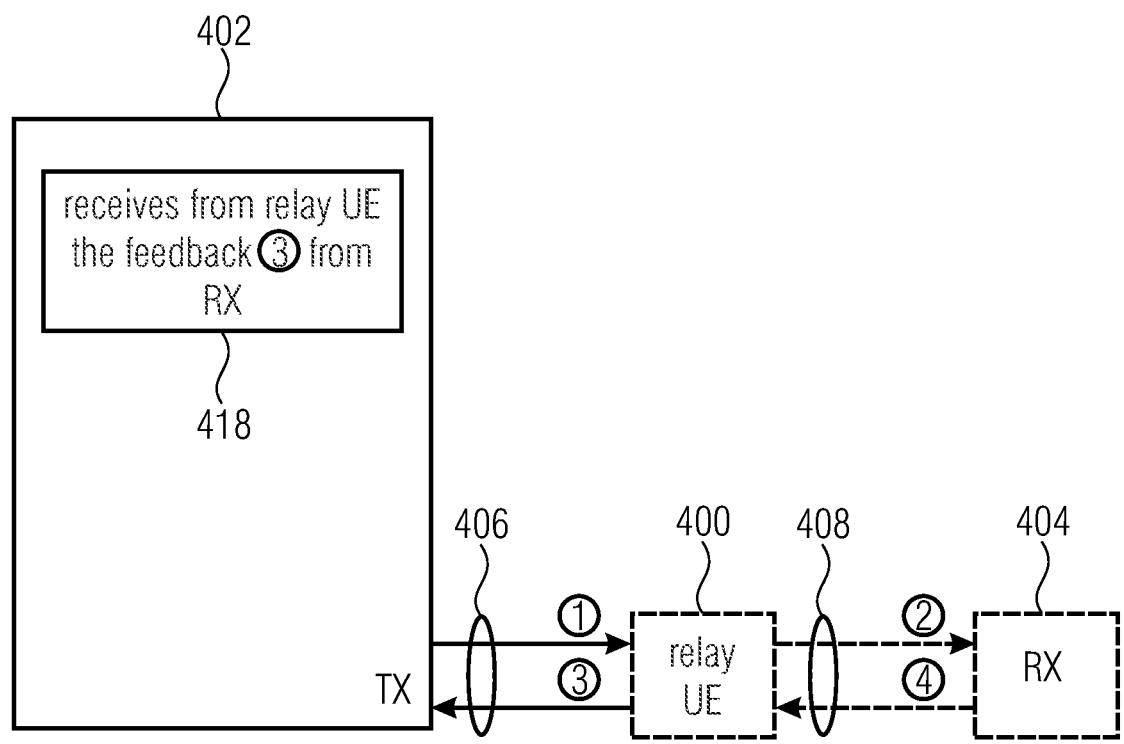
FIG. 6 illustrates an embodiment of a transmitting entity in accordance with the first aspect of the present invention.

Further embodiments of the first aspect of the present invention provide a transmitting entity for a wireless communication system. FIG. 6 illustrates an embodiment of such a transmitting entity 402, like a TX UE or a network entity, like a gNB. The transmitting entity 402 may be connected to a relay UE 400 over a first link 406 so that a transmission ① to a receiving entity 404 may be relayed by the relay UE 400 as a relay transmission ② over a second link 408 by which the relay UE 400 and the receiving entity 404 are connected with each other. In accordance with embodiments of the first aspect, responsive to transmitting a transmission ①, like data and the associated control information, to the relay UE 400 that is destined for the RX UE 404, the transmitting entity 402 receives from the relay UE 400 a feedback ③, as indicated at 418. As described above with reference to FIG. 5, the feedback ③ is or includes the feedback ④ from the RX UE 404, in case the relayed transmission ② is received at the RX UE 404, indicating a status of the transmission at the RX UE 404, for example, a successful and/or non-successful receipt of the transmission or data at the RX UE 404, like a HARQ-ACK or a HARK-NACK. In case the relay UE 400 does not receive any feedback from the RX UE 404, the feedback ③ indicates a non-successful receipt of the transmission at the RX UE 404, like a HARQ-NACK. Additionally, the transmitting entity 402 may or may not receive from the relay UE 400 a feedback indicating a successful and/or unsuccessful receipt of the transmission at the relay UE 400. If this feedback is received by the transmitting entity 402, the relay UE 400 uses the same feedback channel (PSFCH) as indicated by ③, but over different resources.

In accordance with embodiments, a feedback regarding the transmission to the receiving entity 404 may be handled as follows:

If the relay UE 400 receives an ACK from the receiving UE 404, it reports this to the TX entity 402 within a configured or pre-configured time window following the receipt of the feedback, e.g., at an earliest possible opportunity or as soon as possible.

If the relay UE 400 receives a NACK from the receiving UE 404, the relay UE 400 may report the NACK to the TX entity 402 within a configured or pre-configured time window following the receipt of the feedback, e.g., at an earliest possible opportunity or immediately, and wait for a retransmission from the TX entity 402, e.g., with a revised MCS or coding rate.

If the relay UE 400 receives a NACK from the receiving UE 404, the relay UE 400 may continue attempting retransmissions to the remote UE 404 for a configured or pre-configured time window with the same or with different transmission parameters, e.g., MCS or coding rate, and without reporting to the TX entity 402 immediately, while maintaining the transmission in its buffer. Once the relay UE 400 receives an ACK, it reports the feedback to the TX entity 402. If the relay UE 400 does not receive an ACK, it may continue attempting the retransmissions until one of the following events occur:

until a timer elapses, or until a pre-defined or pre-configured maximum number of relay retransmission attempts has been carried out.

When either of these events are triggered before the relay UE 400 receives an ACK, the relay UE 400 send a NACK back to the TX entity 402 declaring that the transmission failed. In such an event, the TX entity 402 may either retransmit the packet with a different transmission parameters, e.g., MCS or coding rate, or try another route using another relay UE.

In accordance with embodiments, the transmitting entity 402 is a user device, UE, or a further relay UE, and the receiving entity 404 is a UE or is a further a relay UE. In this case, the first and second connections 406, 408 are direct interfaces, like a sidelink or PC5 connection or interface.

In accordance with other embodiments, the transmitting entity 402 is a UE, or a further relay UE, and the receiving entity 404 is a network entity, e.g., a radio access network, RAN, entity, like a gNB. In this case, the first connection 406 is a direct interface, like a sidelink or PC5 connection, and the second connection 408 is an access network interface, like a 3GPP interface, a non-3GPP interface, a downlink, DL, interface, e.g. a Uu interface, or a WiFi interface.

In accordance with yet other embodiments, the transmitting entity 402 is a network entity, e.g., a radio access network, RAN, entity, like a gNB, and the receiving entity 404 is a UE or a further relay UE. In this case, the first connection 406 is an access network interface, like a 3GPP interface, a non-3GPP interface, a downlink, DL, interface, e.g. a Uu interface, or a WiFi interface, and the second connection 408 is a direct interface, like a sidelink or PC5 connection.

Figure 7:
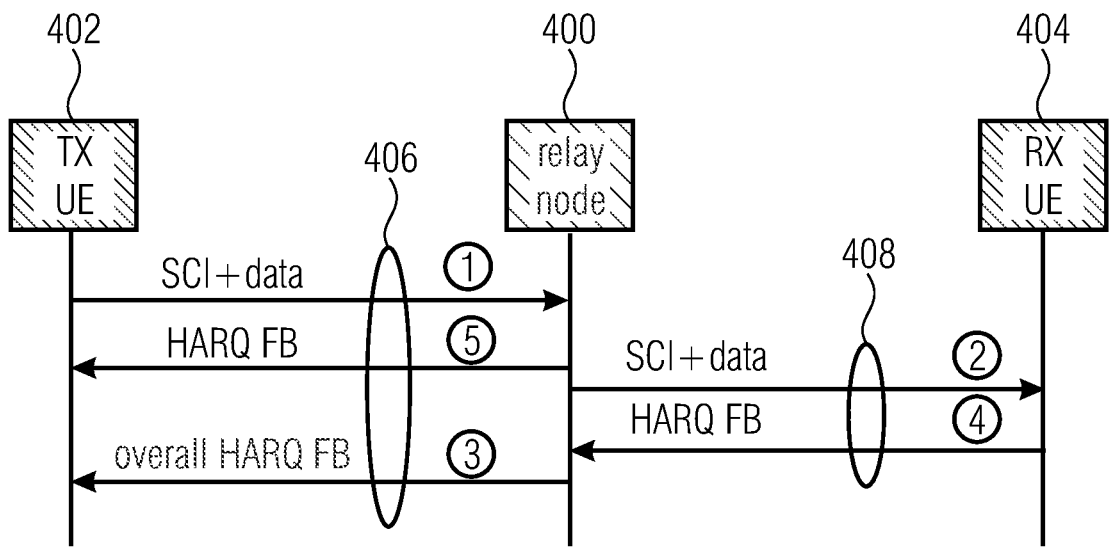
FIG. 7 illustrates an embodiment providing in accordance with the first aspect of the present invention an overall HARQ feedback for a transmission from a TX UE relayed via a relay node to a RX UE using an additional feedback link between the relay node and the TX UE.

The first aspect of the present invention provides embodiments for providing to the transmitting entity or TX entity 402, referred to in the following also as TX UE, the feedback ③, also referred to as overall HARQ feedback, for the transmission from the TX UE 402 to the RX UE 404. FIG. 7 illustrates an embodiment for providing an overall HARQ feedback for a transmission from the TX UE 402 relayed via the relay node 400 to the RX UE 404 using an additional feedback link between the relay node 400 and the TX UE 402. In the embodiment of FIG. 7, the relay UE 400, the TX UE 402 and the RX UE 404 are connected over a sidelink so that the first and second connections 406, 408 are sidelink connections. Initially, the TX UE 402 transmits over the first sidelink connection 406 the control and the data of the transmission ①, for example a SCI followed by the data of the transmission. The relay UE 400 then provides a feedback ⑤, like a HARQ feedback, over the first sidelink connection 406 to the TX UE indicating a successful and/or non-successful receipt of the initial transmission ① at the relay node 400. The relay node 400 relays the data over the second sidelink connection 408 to the RX UE 404 together with a SCI as indicated at ②. The RX UE 404 returns a HARQ feedback ④ over the second sidelink connection 408 to the relay node 400 indicating a successful and/or non-successful receipt of the data at the RX UE 404. The relay node 400 provides the overall feedback ③ including the feedback ④ from the RX UE 404, also referred to as the overall HARQ feedback ③, over the first sidelink connection 406 to the TX UE 402. Technically the feedback ⑤ may be the first feedback, and in FIG. 7 the order of events across time may be transmission ①, feedback ⑤, transmission ②, feedback ④ and overall feedback ③. Transmission ② and feedback ⑤ may happen simultaneously if the relay UE received transmission ① successfully, else it is feedback ⑤ only.

Figure 8:
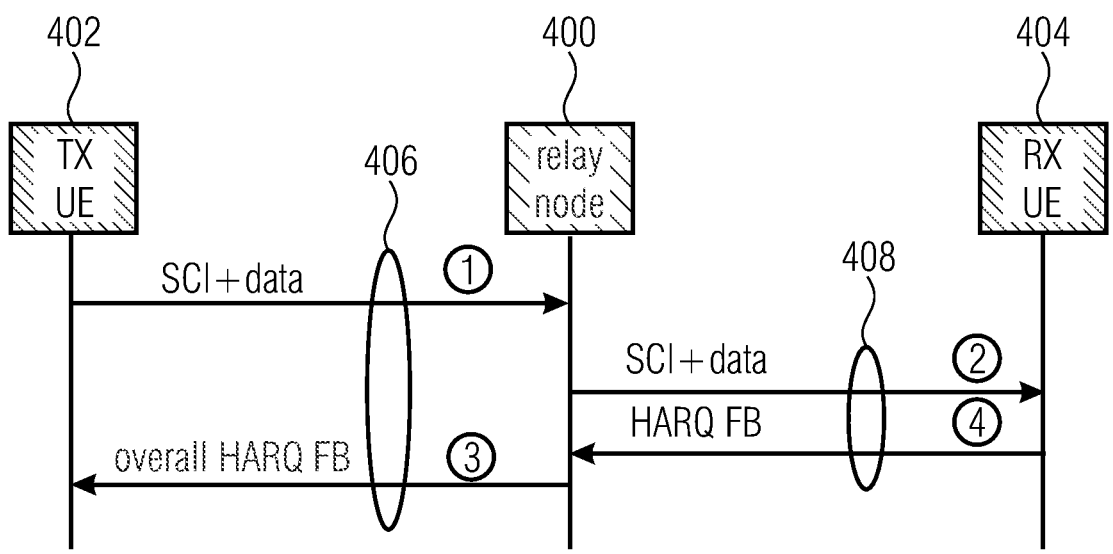
FIG. 8 illustrates an embodiment providing in accordance with the first aspect of the present invention an overall HARQ feedback for a transmission from a TX UE relayed via a relay node to a RX UE reusing an existing feedback link between the relay node and the TX UE.

FIG. 8 illustrates another embodiment of the first aspect of the present invention for providing an overall HARQ feedback for a transmission from the TX UE 402 to the RX UE 404 via the relay node 400. When compared to the embodiment of FIG. 7, rather than providing a new feedback link between the relay node 400 and the TX UE 402, in accordance with the embodiment of FIG. 8, the existing feedback link between the relay node 400 and the TX UE 402 is used to convey, instead of the feedback ⑤ (see FIG. 7), the overall HARQ feedback ③ including the HARQ feedback from the RX UE 404.

In the embodiments of FIG. 7 and FIG. 8, the feedback may be transmitted via the first sidelink connection 406 using the PSFCH. In accordance with other embodiments, the TX UE 402 may be a transmitting entity, which includes a base station. In this case, the transmitting entity and the relay UE may be connected over an access network interface, like the Uu interface, and the feedback may be transmitted via the first connection 406 in the PUCCH or PUSCH.

In accordance with embodiments, the feedback may include, in addition to indicating a successful and/or a non-successful receipt of the data at the RX UE 404 additional information. For example, a link quality between the relay UE and the receiving entity may be signaled, e.g., to make the transmitting entity aware of the receiving entity's ability to receive transmissions using the current or existing connections 406, 408. In case a packet transmission failed, i.e., the data was received non-successfully at the receiving entity 404, the link quality included in the overall feedback message received at the TX UE 402 between the relay UE and the RX UE may be used by the TX UE to start a relay reselection process in case the link quality is identified at the TX UE as being below a predefined threshold and causing the non-successful reception of the data or transmission at the receiving entity. For example, in LTE V2X, a UE may decide to switch to a relay UE if the link quality between the TX entity and the UE is below a pre-defined RSRP threshold. Layer 3 protocols are used for the actual selection of the relays.

Also a distance measure, indicating the distance between the relay UE and the receiving entity, or their zone IDs (both or only of the receiving entity) by which the TX UE may ascertain the distance between the relay UE and the receiving entity, may be signaled, e.g., to make the transmitting entity aware of the receiving entity's ability to provide HARQ feedback based on its distance from the relay UE.

Additional data assisting the transmitting entity to ensure that the receiving entity is capable to successfully receive transmissions may also be included in the feedback. This information helps the TX entity in deciding whether the existing link via the current relay is adequate for ensuring successful transmissions, and if not, what it needs to change. For example, the relay UE may be running low on battery, or may have a scheduled stop coming up. This means that the TX entity has to look for another way to form the link to the receiving entity. The additional information may also to inform the TX entity that the receiving entity may not be capable of receiving any more transmissions based on certain factors such as a farther distance, a low battery or a scheduled stop.

The feedback may also include an indication that some data for the TX UE is available at the receiving entity. In other words, the feedback may include an indication that the receiving entity intends to transmit data to the TX UE. For example, the indication may be a buffer status report, BSR, where the RX UE is telling the base station, which is the TX entity, that it needs resources for a transmission, or the indication may include a Scheduling request, SR, for resources to be used for transmitting the data from the RX UE to the TX entity.

The feedback may also include a signal from the receiving entity indicating to stop the HARQ/transmission process. For example, some kind of abort signal may be included, e.g. in case the UE needs to go into power saving or needs to save its resources for traffic of higher priority.

The feedback may also include a beam index of the best beam or of the top-m beams received at the receiving UE and transmitted by the relay UE.

In accordance with further embodiments, the overall feedback or first feedback forwarded from the relay node to the TX entity and including the indication about the successful/non-successful receipt of a transmission at the receiving entity, may be an aggregated feedback or may include an aggregated report. The aggregated feedback or report may include the feedback for a plurality of transmissions or packets or retransmissions, and the report may indicate, for example, that within a predefined time window some or all transmissions, like data packets or retransmissions, are received successfully or non-successfully at the receiving entity, or that a predefined number of transmissions, like data packets or retransmissions, are received successfully or non-successfully. In accordance with other embodiments, the aggregated feedback may indicate which of the data transmissions or packets or retransmissions are received successfully and/or which of the data transmissions or packets or retransmissions are received non-successfully or failed. Also, the aggregated feedback may indicate those data transmissions or packets or retransmissions which are received successfully with an exceeded delay budget or exceeding a jitter threshold Depending on the exceeded delay budget or jitter threshold, the TX entity may take actions preventing this for future transmissions or retransmissions for the used data flow. E.g. the TX entity may reconfigure the radio bearer, the TX entity may drop other services/data flows, or the TX entity may handover to a different cell.

Yet other embodiments may include an indication of a deteriorating link quality between the relay UE and the receiving entity, for example that the link quality is approaching or is below a configured or preconfigured threshold which may cause the TX UE to start a relay reselection process. Yet further embodiments may include an update indicating a new maximum QoS possible over the relay link between the relay UE and the receiving entity. For example, this makes the transmitting entity aware that it may now be possible to send transmissions needing a higher QoS when compared to the transmissions send so far.

In accordance with embodiments of the first aspect of the present invention, the transmission of the feedback may be carried out in the physical layer, in the medium access control (MAC), layer or in the radio link control, RLC, layer.

Feedback Transmission in the Physical, PHY, Layer

In accordance with first embodiments of a feedback transmission in the PHY layer, a new feedback link between the relay UE and the TX UE is provided so as to convey the overall HARQ feedback, as is illustrated in FIG. 7 or FIG. 8 described above. In accordance with other embodiments, the resources to be used for the overall feedback ③ on the first connection 406 between the TX UE 402 and the relay UE 400 may be indicated implicitly by the TX UE 402 to the relay UE 400 so the relay UE 400 is aware of the resources on the channel, like the PSFCH, to be used for reporting the overall feedback ③ from the RX UE 404. For example, the relay UE 400 transmits on the first connection 406 the feedback associated with the transmission relayed to the RX UE in the physical, PHY, layer and resource pools, RPs, may be configured to have or not have a feedback channel PSFCH. If the PSFCH is present, it may not be available in every time slot. It may be in every first, second or fourth time slot. Using a known formula, both the relay UE and the RX UE know that, once data is transmitted in a time slot t0, the feedback is sent by the RX UE back to the relay node in the next available PSFCH time slot, after a certain processing time at the RX UE. In accordance with embodiments, once the relay UE received the feedback from the RX UE, the relay node sends the feedback to the TX UE in the next available PSFCH time slot, after some time gap/processing time. The gap or PSSCH-to-Relay-PSFCH-time may be configured or predefined at the TX UE, so that it knows when to expect that feedback.

In case the transmitting entity is a RAN entity, like a base station, the relay UE reports the overall feedback ③ to the base station over the PUCCH or PUSCH, and the resources to be used by the relay UE when reporting the overall feedback ③ may be indicated implicitly by the TX UE 402 to the relay UE 400 using a configured or predefined PSSCH-to-Relay-PUCCH-time.

In accordance with other embodiments, the resources to be used for the overall feedback ③ on the first connection 406 between the TX UE 402 and the relay UE 400 may be indicated explicitly by the TX UE 402 to the relay UE 400 so the relay UE 400 is aware of the resources on the channel, like the PSFCH, to be used for reporting the overall feedback ③ from the RX UE 404. In other words, the TX UE explicitly indicates in the SCI that it expects the relay UE to forward the feedback from the RX UE in a given PSFCH time slot, or within a given duration of time, or in a given PSFCH resource.

In accordance with the embodiment depicted in FIG. 7, the transmitting entity 402 is a user device, UE, connected to the receiving entity, which is also a user device, via a sidelink relay node 400. The TX UE 402 and the relay node 400 are connected via the first sidelink 406, and the relay node 400 and the RX UE 404 are connected via a second sidelink connection 408. The feedback ⑤ for the transmission from the TX UE 402 to the relay UE 400 may be transmitted on first resources of the PSFCH, and the feedback ③ for the transmission from the relay UE 400 to the RX UE 404 may be transmitted on second resources of the PSFCH that are different from the first resources. It is possible that the TX UE 402 provides the PSFCH resources for the overall feedback ③ and the feedback ⑤ about the first part of the transmission received at the relay UE using the following means:

in the same SCI, using a different parameter to indicate the resources for ③ and ⑤, or
different SCIs using the same format, sent simultaneously or one after the other, or
different SCIs using different formats, sent simultaneously or one after the other.

In case the transmitting entity is a RAN entity, like a base station the relay UE reports the overall feedback ③ to the base station over the PUCCH or PUSCH, and the resources to be used by the relay UE when reporting the overall feedback ③ may be provided by the base station in a DCI of the transmission ① provided in the PDCCH. The gNB provides two sets of PUCCH resources, one for the relay UE to send the overall feedback ③ from the RX UE to the TX UE, and one for sending the feedback ⑤ about the first part of the transmission received at the relay UE. It is possible that the gNB provides the PUCCH resources for the overall feedback ③ and the feedback ⑤ about the first part of the transmission received at the relay UE using the following means:

in the same DCI, using a different parameter to indicate the resources for ③ and ⑤, or
different Das using the same format, sent simultaneously or one after the other, or
different Das using different formats, sent simultaneously or one after the other.

In accordance with other embodiments carrying out the feedback transmission over the physical layer, an existing link between the relay node and the transmitting entity may be reused, as described above with reference to FIG. 8. In other words, rather than transmitting a feedback about the transmission from the TX entity to the relay node, in accordance with such embodiments, the resources of this feedback link are used to convey the overall HARQ feedback ③ indicating the successful/non-successful reception of the transmission from the transmitting entity at the RX UE. In case the transmitting entity is a TX UE, it is assumed that the TX UE has assigned or allocated a set of PSFCH resources to be used by the relay UE to provide feedback to the UE about the status of a transmission, like a transmission of a packet, from the TX UE to the relay node. However, in accordance with the described embodiment, instead of using these resources for transmitting the status of the transmission from the TX UE to the relay node, they are used for reporting the status of the transmission from the relay node to the RX UE, i.e., the overall feedback or the feedback from the RX UE to the relay node. Thus, despite the fact that no feedback for the transmission to the relay node is received at the TX UE, still, the TX UE receives the overall feedback ③ for the transmission, so that, for example, in case of a failure at the remote UE, the TX UE may decide about a retransmission responsive to a corresponding status indicated in the feedback from the RX UE. In other words, on the resources in the PSFCH where the relay UE was supposed to send the feedback to the TX UE about the status of the transmission between the TX entity and the relay UE, the relay UE now reports the feedback status of the transmission between the relay UE and the receiving entity.

In accordance with other embodiments, the transmitting entity may be a RAN entity, like a gNB and, in such embodiments, the resources on the PUCCH or PUSCH initially allocated for the relay UE to provide the feedback for the status of the transmission from the gNB to the relay UE are used for reporting the feedback 3, the overall feedback, from the RX UE.

It is assumed that the transmitting entity may indicate the resources to be used by the relay UE to report the feedback 3, taking into account adequate processing time for the relay UE and the RX UE.

The resources, either on the PSFCH or on the PUCCH or PUSCH for the UE-to-UE relays and the UE-to-network relays, respectively, may also be used by the relay UE to report a HARQ failure to the TX UE, responsive to which the TX UE may trigger a retransmission or a relay reselection. For example, in case a transmission failed, the TX UE may retain the transmission, like data packet, in the MAC layer so that in case the TX UE is to perform a retransmission or is to connect to the RX UE via a different relay UE, the transmission may be performed without further processing delay. For example, the transmitting entity may trigger a relay reselection process responsive to a certain event, like one or more of:

a number, a ratio or a percentage of feedbacks indicting a non-successful reception of the transmission at the receiving entity, like a HARQ failure or HARQ-NACK, approaching or exceeding a configured or preconfigured threshold, wherein the threshold may be less than a configured or preconfigured maximum number of retransmissions for the transmission, a degradation of the link quality of the relay link between the relay UE and the receiving entity, e.g. beyond a configured or preconfigured link quality threshold, a change of a beam index, a communication distance is approaching or exceeding the minimum communication range requirement between either the UE and the receiving entity, or the UE and the transmitting entity, change of location e.g. indicated by a change of Zone ID, a battery level of the relay UE is approaching or exceeding a configured or preconfigured threshold; for example, the battery level of the relay UE may be send to TX entity, and when the TX entity sees the level to approach or go below a threshold, it may trigger the relay reselection.

In accordance with embodiments, the TX UE 402 may include a timer so as to specify a certain time period within which the TX UE expects to receive the overall feedback ③ from the relay UE. In case the TX UE does not receive the feedback for a given transmission within the time specified by the timer, the TX UE may retransmit the transmission or packet. For example, responsive to a lapse of the time, the transmitting entity may assume that the receiving entity was unsuccessful in receiving the transmission and trigger the retransmission of the transmission, e.g., in accordance with a configured or preconfigured retransmission scheme.

In the above mentioned embodiments, in case of a failed transmission, the overall HARQ feedback may indicate which of the links, either link 406 or link 408 was faulty, for example by including an additional one bit or two bit indicator into the feedback indicating whether the link 406 between the TX entity and the RN UE was the link that failed, and/or whether it was the link 408 between the RN UE and the RX UE.

Transmission of the Feedback in the MAC Layer

Instead of using the physical layer feedback from the relay UE to the TX entity as described above, in accordance with further embodiments, the relay UE 400 (see FIG. 5) may use a MAC control element, MAC CE, to inform the TX entity 402 about a status of a transmission from the relay to the RX UE.

In accordance with the MAC layer embodiments, the MAC layer of the TX entity, either a TX entity connected to the relay node over the sidelink or over the Uu interface, may distinguish the feedback by the relay UE on the physical layer for the status of the transmission of the transmitting entity to the relay node from a MAC layer feedback reported by the relay UE to the transmitting entity. Thus, in accordance with embodiments, a transmission or a packet transmitted via one or more relays is considered to be fully acknowledged when the feedback in the MAC layer, the L2 feedback, is received by the transmitting entity, reporting the overall feedback at the RX UE, while the physical layer or L1 feedback received at the transmitting entity only indicates the status of the transmission from the TX entity to the relay node but not the overall feedback which, as mentioned, is reported by the L2 feedback.

In case the L2 feedback, the feedback received over the MAC layer, is negative or indicates a failed transmission at the RX UE, in accordance with embodiments, a maximum number of failures or NACKs may be defined which the TX entity may receive from the relay UE. After reaching the predefined or maximum number of failures, the TX UE may trigger a relay reselection procedure since the link conditions between the TX entity and the relay UE or the relay UE and the RX UE may have deteriorated. Similarly, in case the PHY layer feedback received by the relay UE from the RX UE is negative or indicates a failed transmission, in accordance with embodiments, a maximum number of failures or NACKs may be defined which the relay UE may receive from the RX UE. After reaching the predefined or maximum number of failures, the relay UE may trigger a relay reselection procedure by providing an appropriate signaling to the TX UE because the relay UE identified that the link conditions between the relay UE and the RX UE may have deteriorated. The maximum number of failures may be less than the maximum number of retransmissions configured in the TX UE for a certain packet, so that, rather than waiting until this maximum number of retransmissions is reached, the relay UE may already trigger the relay reselection procedure at the transmitting entity earlier, namely after the predefined number of failures is reached indicating a deteriorating link quality between the relay node and the RX UE.

Feedback Transmission Over the RLC Layer

In accordance with yet further embodiments, the overall feedback may be transmitted over the RLC layer. The RLC layer may generate a L2 RLC acknowledgement to confirm receipt of a transmission or a packet or a PDU, when the respective entities operate in acknowledge mode, AM.

Figure 9A:
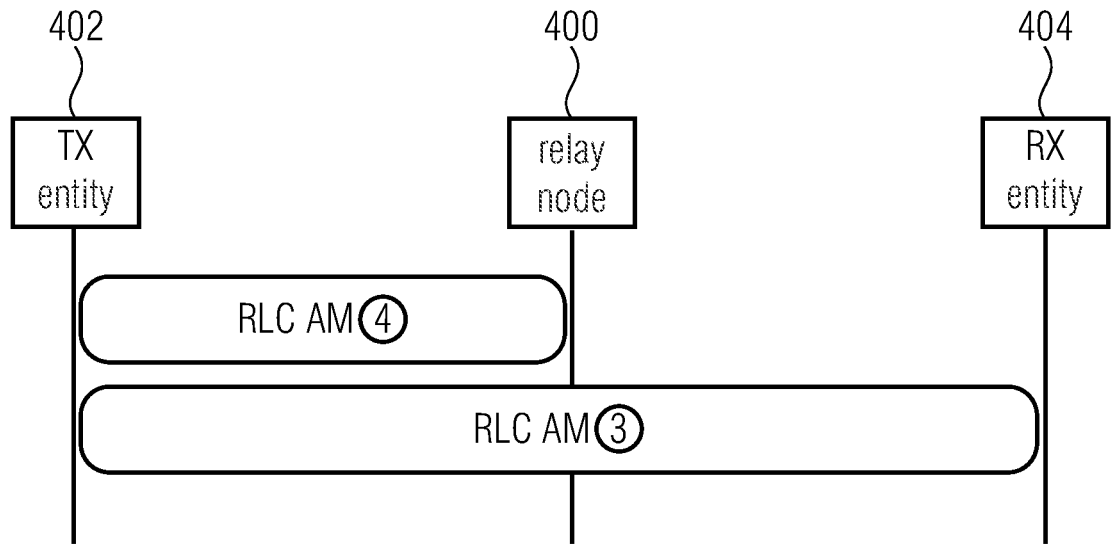
FIGS. 9A-9B illustrate embodiments for a RLC feedback configuration providing in accordance with the first aspect of the present invention, wherein FIG. 9A describes an embodiment introducing an overall RLC acknowledgement.
Figure 9B:
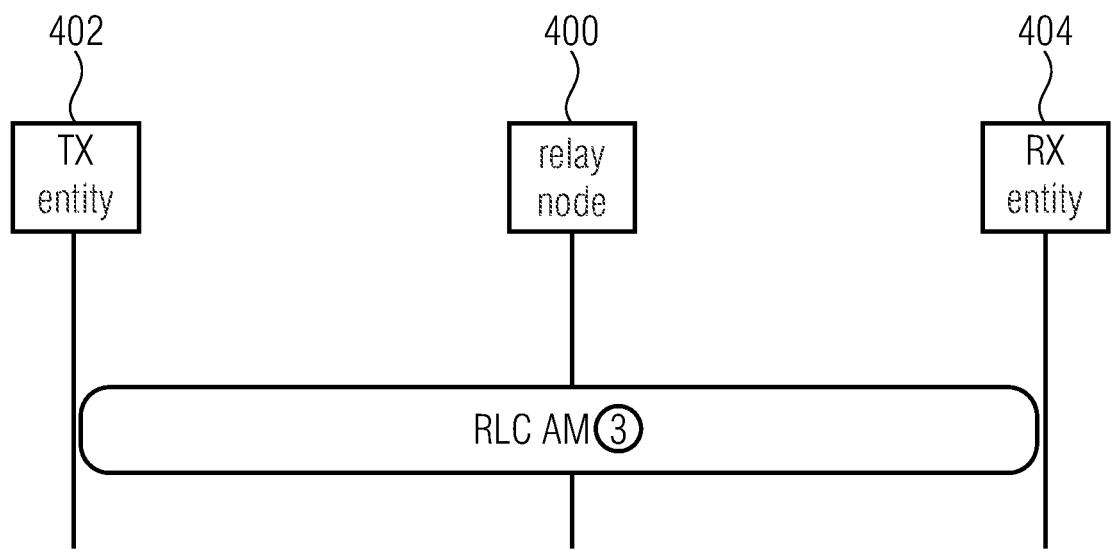

FIG. 9 illustrates embodiments for a RLC feedback configuration. FIG. 9A describes an embodiment introducing an overall RLC acknowledgement, and FIG. 9B illustrates an end-to-end feedback.

In case an overall RLC acknowledgement ③, as depicted in FIG. 9A, the TX entity 402 operates in the acknowledge mode AM. The TX entity 402 transmits the transmission to the relay node 400. When the relay node 400 received the transmission from the TX entity, it sends a first RLC ACK ④ to confirm successful receipt of the transmission at the relay node. The relay node 400 forwards the transmission to the RX entity 404. The RX entity 404, responsive to a successful reception of the transmission, sends a second RLC ACK for the transmission or packet again, thereby providing for the overall feedback ③, in a similar way as described above with reference to FIG. 7.

In case of an end-to-end feedback ③, as depicted in FIG. 9B, the first RLC ACK ④ from the relay UE 400 to the TX 402 is replaced by the RLC ACK ③ from the RX entity 404 in the RLC AM, similar as described above with reference to FIG. 8.

Operation of a Wireless Communication System or Network in Accordance with Embodiments of the First Aspect In the following, embodiments are described illustrating the operation of the overall wireless communication system or network including the above described relay UE and/or transmitting entity in accordance with embodiments of the first aspect of the present application, wherein the relay UE and/or the transmitting entity may operate in Mode 1 or in Mode 2. Initially, the operation of UE-to-UE relays is described, followed by a description of the operation of UE-to-network relays.

In those embodiments described below in which a base station provides resources for the relay UE, a DCI may be used to define dynamic grants, like explicit resources meant for the transmission of a particular packet by the relay UE, or to define configured grants type 2 at the relay UE, like resources that are configured using RRC signaling and may be used from the time the relay UE receives the DCI for activating the grant. The relay UE is able to use any configured grants type 1, if provided by the base station, when operating in Mode 1. In case the base station also schedules resources for the transmitting entity, the DCI may define for the transmitting entity dynamic or configured grants as well.

1. UE-to-UE Relays

In the following, embodiments of a wireless communication system and its operation are described including as a transmitting entity a TX UE connected to the relay UE via a sidelink communication, which operate in Mode 1 or in Mode 2. As far as the remote or RX UE is concerned, for all of the subsequently described embodiments, the RX UE may be in Mode 1 or in Mode 2.

(a) TX UE and Relay UE are Both in Mode 1

Figure 10:
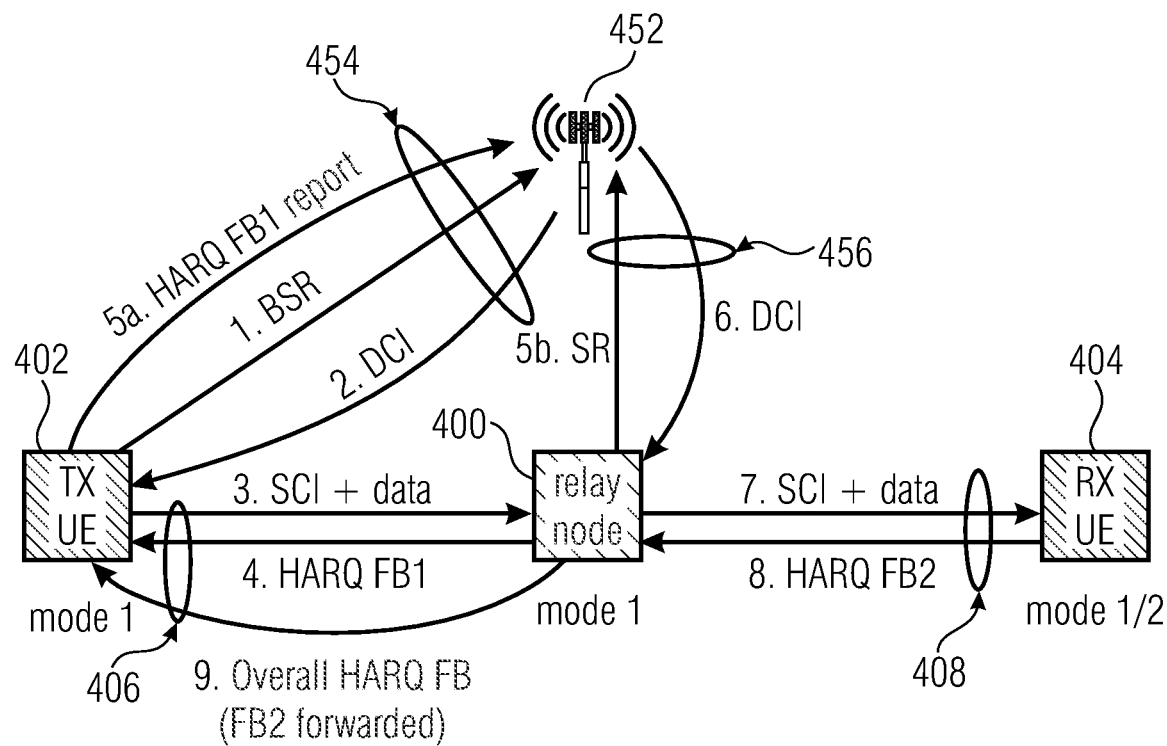
FIG. 10 illustrates a first embodiment of a wireless communication network including a relay UE and a TX UE in accordance with embodiments of the first aspect of the present invention, both operating in Mode 1, wherein resources for the transmission from the TX UE to the relay and the resources for relaying the transmission are scheduled by a gNB.

FIG. 10 illustrates an embodiment of a wireless communication network including a relay node or relay UE 400 and a TX UE 402, both operating in Mode 1, i.e., the resources for a transmission from the TX UE 402 to the RX UE 404 are scheduled by a RAN entity 452, like a base station or gNB, of the wireless communication network. The TX UE 402 is connected to the relay UE 400 via a first sidelink connection 406, and the relay UE 400 is connected to the RX UE, which may be in Mode 1 or in Mode 2, via a second sidelink connection 408. Since the TX UE 402 and the relay UE 400 operate in Mode 1, they are also connected via respective Uu connections 454 and 456 to the gNB 452 for uplink/downlink transmissions between the gNB and the TX UE 402 and the relay UE 404, respectively.

The functionality for providing the overall feedback for a transmission from the TX UE 402 to the RX UE 404 is as follows:

1. The TX UE 402 sends a status report (SR) or buffer status report, BSR, in an uplink channel to the gNB 452 requesting for resources for a transmission to the relay UE 400.
2. The gNB 452 sends a DCI in an downlink channel to the TX UE 402 including the resources to be used by the TX UE 402 for the transmissions from the TX UE 402 to the relay UE 400 using resources indicated in the DCI received in (2).
3. The TX UE 402 sends over the first sidelink connection 406 the SCI and the data of the transmission to the relay node 400.
4. The relay node 400 sends over the first sidelink connection 406 to the TX UE 402 a HARQ feedback, FB1, indicating the status of the transmission from the TX UE 402 to the relay UE 400.
5a. The TX UE 402 reports the feedback FB1 in an uplink channel to the gNB 452 node so that the gNB 452 is aware of the status of the transmission that used resources granted by the gNB 452. If the report stated that the transmission was unsuccessful, the gNB 452 may provide further resources for retransmission, without forcing the TX UE 402 to send another BSR or SR. If the report stated that the transmission was successful, the gNB 452 may allocate the same HARQ ID with New Data Indicator (NDI) toggled for another TB to be transmitted.
5b. The relay UE 400 sends a scheduling request, SR, or BSR in an uplink channel to the gNB 452 requesting for resources for relaying the transmission the relay UE 400 received from the TX UE 402.
6. The gNB 452 sends in an downlink channel a DCI to the relay UE 400 including the resources to be used by the relay UE or an activation for a type 2 configured grant for relaying the transmission from the TX UE to the RX UE 404 over the sidelink connection 408.
7. The relay UE 400 sends a SCI and the data of the transmission over the sidelink connection 408 to the RX UE 404 using resources indicated in the DCI received in (6).
8. The RX UE 404 sends a HARQ feedback about the status of the transmission at the RX UE to the relay UE 400 over the sidelink connection 408.
9. The relay UE 400 reports over the sidelink connection 406 the feedback received from the RX UE 404 to the TX UE 402, as described in the embodiments above.

Figure 11:
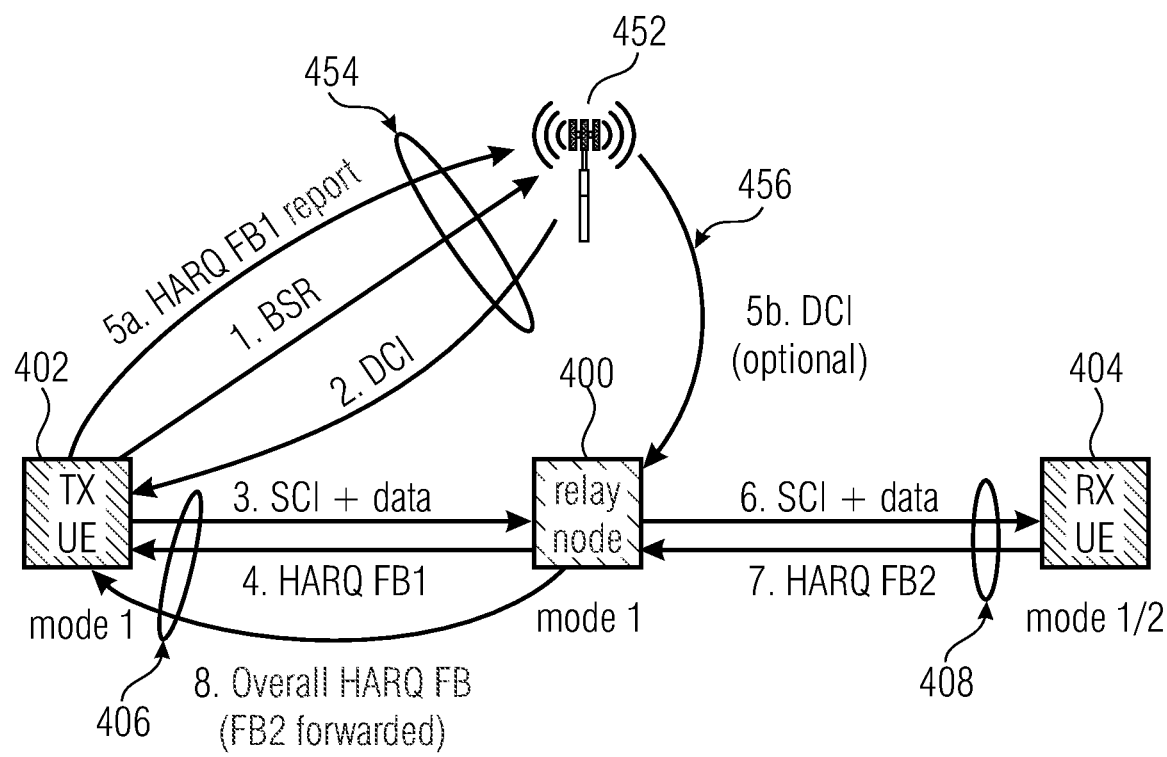
FIG. 11 illustrates a second embodiment of a wireless communication network including a relay UE and a TX UE in accordance with embodiments of the first aspect of the present invention, both operating in Model, wherein resources for the transmission from the TX UE to the relay are scheduled by a gNB and the relay UE is pre-configured with resources to be used for relaying the transmission.

FIG. 11 shows another embodiment of a wireless communication system using a TX UE and a relay UE both operating in Mode 1. In the embodiment of FIG. 10, as described above, the relay UE 400 requested from the gNB 452 the resources for relaying the transmission it received from the TX UE to the RX UE. In the embodiment described with reference to FIG. 11, it is assumed that the relay UE 402 is already configured with resources for a transmission, for example, by configured grants.

The functionality for providing the overall feedback for a transmission from the TX UE 402 to the RX UE 404 is as follows:

1. The TX UE 402 sends a SR or BSR in an uplink channel to the gNB 452 requesting for resources for a transmission to the relay UE 400.
The request also includes an indication that the transmission is to be relayed to the RX UE 404 so that, when the TX UE 402 sends the BSR or SR to the gNB requesting for resources, it is also indicated that the requested resources are for a transmission which is to be relayed by the RN UE 400 to the RX UE 402. The relay UE 400 is operating in Mode 1, and it is assumed that the relay UE 400 is already configured with resources for a transmission by the gNB, for example by means of configured grants so that responsive to receiving the indication from the TX UE that the resources are for a transmission to be relayed, the gNB 452 is already aware of the resources that the relay UE 402 may use to transmit the transmission to the RX UE 404.
2. The gNB 452 sends a DCI in an downlink channel to the TX UE 402 including the resources to be used by the TX UE 402 for the transmissions from the TX UE 402 to the relay UE 400.
3. The TX UE 402 sends over the first sidelink connection 406 the SCI and the data of the transmission to the relay node 400 using resources indicated in the DCI received in (2).
4. The relay node 400 sends over the first sidelink connection 406 to the TX UE 402 a HARQ feedback, FB1, indicating the status of the transmission from the TX UE 402 to the relay UE 400.
5a. The TX UE 402 reports the feedback FB1 in an uplink channel to the gNB 452 node so that the gNB 452 is aware of the status of the transmission that used resources granted by the gNB 452. If the report stated that the transmission was unsuccessful, the gNB 452 may provide further resources for retransmission, without forcing the TX UE 402 to send another BSR or SR. If the report stated that the transmission was successful, the gNB 452 may allocate the same HARQ ID with New Data Indicator (NDI) toggled for another TB to be transmitted.
5b. Since the gNB 452 is aware that the relay UE 400 needs resources for the transmission to be relayed to the RX UE 404, and since the relay UE 400 is already configured with such resources, like configured grants, the gNB 452 is aware whether the relay UE has sufficient resources from the already provided configured grants so that, optionally, in case it is determined that there are not sufficient resources from the configured grants to provide for a reliable transmission from the relay UE 400 to the RX UE, the gNB 452 may send a further DCI in an downlink channel for providing additional resources to be used by the relay UE for relaying the transmission from the TX UE to the RX UE 404.

6. The relay UE 400 sends a SCI and the data of the transmission over the sidelink connection 408 to the RX UE 404 using resources with which the relay UE is configured or preconfigured and, if received in (5b), as indicated in the DCI.

7. The RX UE 404 sends a HARQ feedback about the status of the transmission at the RX UE to the relay UE 400 over the sidelink connection 408.

8. The relay UE 400 reports over the sidelink connection 406 the feedback received from the RX UE 404 to the TX UE 402, as described in the embodiments above.

(b) TX UE Operating in Mode 1 and Relay UE Operating in Mode 2

Figure 12:
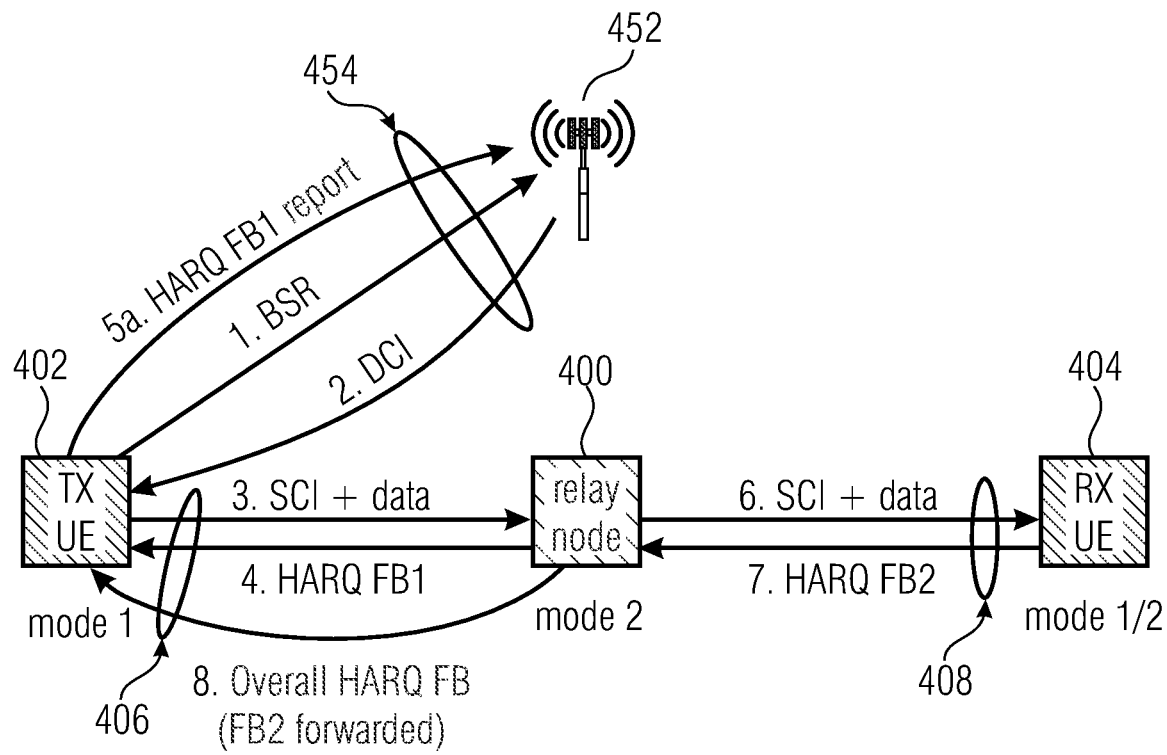
FIG. 12 illustrates a first embodiment of a wireless communication network including a relay UE operating in Mode 2 and a TX UE operating in Mode 1 in accordance with embodiments of the first aspect of the present invention, wherein resources for the transmission from the TX UE to the relay are scheduled by a gNB and resources to be used for relaying the transmission are sensed by the relay UE.

FIG. 12 illustrates an embodiment of a wireless communication system including a relay UE 400 operating in Mode 2 and a TX UE 402 operating in Mode 1, with the RX UE 404 operating in Mode 1 or in Mode 2. Thus, other than in FIG. 10 and in FIG. 11, in FIG. 12 there is only one Uu interface between the gNB 452 and the TX UE 402, namely the connection 454. Since relay UE 400 is not supported with regard to the resource allocation by the gNB 452, no Uu interface is depicted.

The functionality for providing the overall feedback for a transmission from the TX UE 402 to the RX UE 404 is as follows:

1. The TX UE 402 sends a buffer status report, BSR, or SR in an uplink channel to the gNB 452 requesting for resources for a transmission to the relay UE 400.

2. The gNB 452 sends a DCI in an downlink channel to the TX UE 402 including the resources to be used by the TX UE 402 for the transmissions from the TX UE 402 to the relay UE 400.

3. The TX UE 402 sends over the first sidelink connection 406 the SCI and the data of the transmission to the relay node 400 using resources indicated in the DCI received in (2).

4. The relay node 400 sends over the first sidelink connection 406 to the TX UE 402 a HARQ feedback, FB1, indicating the status of the transmission from the TX UE 402 to the relay UE 400.

5. The TX UE 402 reports the feedback FB1 in an uplink channel to the gNB 452 node so that the gNB 452 is aware of the status of the transmission that used resources granted by the gNB 452. If the report stated that the transmission was unsuccessful, the gNB 452 may provide further resources for retransmission, without forcing the TX UE 402 to send another BSR or SR. If the report stated that the transmission was successful, the gNB 452 may allocate the same HARQ ID with New Data Indicator (NDI) toggled for another TB to be transmitted.

6. The relay UE 400 identifies and selects resources for a transmission to the RX UE 404 by sensing and uses these resources for sending a SCI and the data of the transmission over the sidelink connection 408 to the RX UE 404.

7. The RX UE 404 sends a HARQ feedback about the status of the transmission at the RX UE to the relay UE 400 over the sidelink connection 408.

8. The relay UE 400 reports over the sidelink connection 406 the feedback received from the RX UE 404 to the TX UE 402, as described in the embodiments above.

(c) TX UE Operating in Mode 2 and Relay UE Operating in Mode 1

Figure 13:
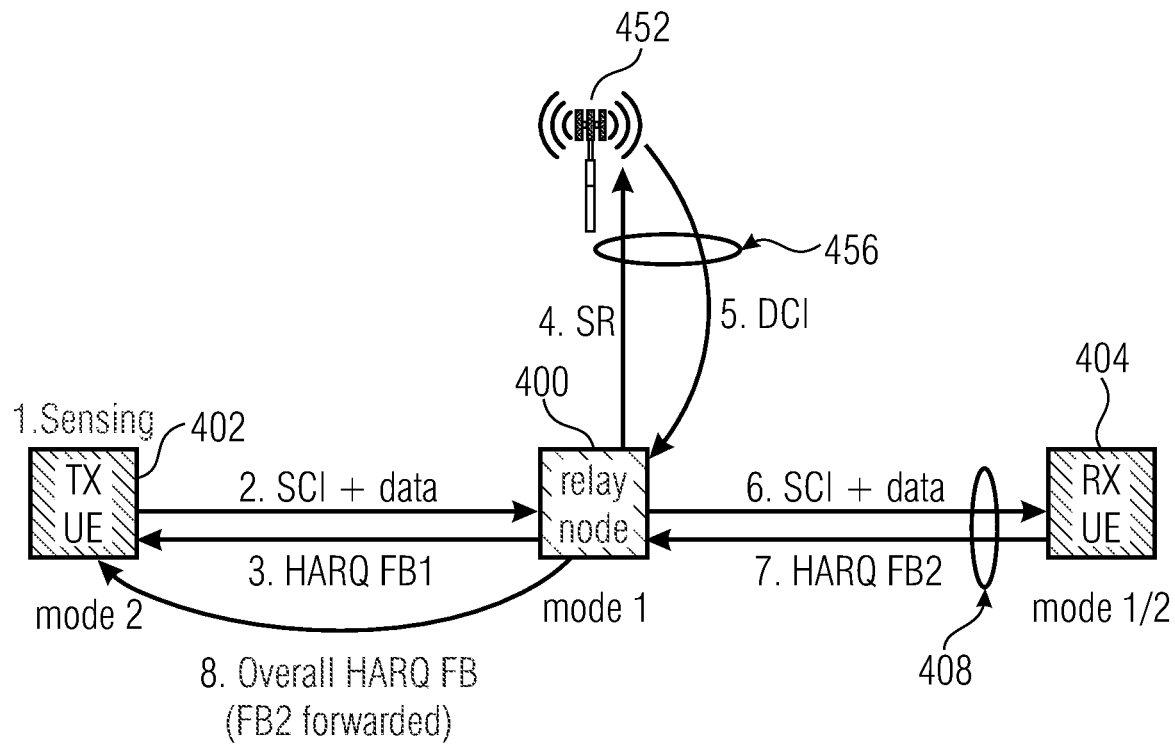
FIG. 13 illustrates a first embodiment of a wireless communication network including a relay UE operating in Mode 1 and a TX UE operating in Mode 2 in accordance with embodiments of the first aspect of the present invention, wherein resources for the transmission from the TX UE to the relay are sensed by the TX UE and the resources for relaying the transmission are scheduled by a gNB.

FIG. 13 illustrates an embodiment of a wireless communication system including a relay UE 400 operating in Mode 1 and a TX UE 402 operating in Mode 2, with the RX UE 404 operating in Mode 1 or in Mode 2. Thus, the TX UE 402 is not supported by the gNB 452 with regard to the scheduling of resources. The gNB 452 supports the relay UE 400 with regard to the scheduling of resources so that in FIG. 13 only the Uu connection 456 is illustrated.

The functionality for providing the overall feedback for a transmission from the TX UE 402 to the RX UE 404 is as follows:

1. The TX UE 402 identifies and selects resources for a transmission to the relay UE 400 by sensing.

2. The TX UE 402 sends over the first sidelink connection 406 the SCI and the data of the transmission to the relay node 400 using the identified and selected resources.

3. The relay node 400 sends over the first sidelink connection 406 to the TX UE 402 a HARQ feedback, FB1, indicating the status of the transmission from the TX UE 402 to the relay UE 400.

4. The relay UE 400 sends a scheduling request, SR, or a BSR, in an uplink channel to the gNB 452 requesting for resources for relaying the transmission the relay UE 400 received from the TX UE 402.

5. The gNB 452 sends in an downlink channel a DCI to the relay UE 400 including the resources to be used by the relay UE for relaying the transmission from the TX UE to the RX UE 404 over the sidelink connection 408.

6. The relay UE 400 sends a SCI and the data of the transmission over the sidelink connection 408 to the RX UE 404 using resources indicated in the DCI received in (5).

7. The RX UE 404 sends a HARQ feedback about the status of the transmission at the RX UE to the relay UE 400 over the sidelink connection 408.

8. The relay UE 400 reports over the sidelink connection 406 the feedback received from the RX UE 404 to the TX UE 402, as described in the embodiments above.

Figure 14:
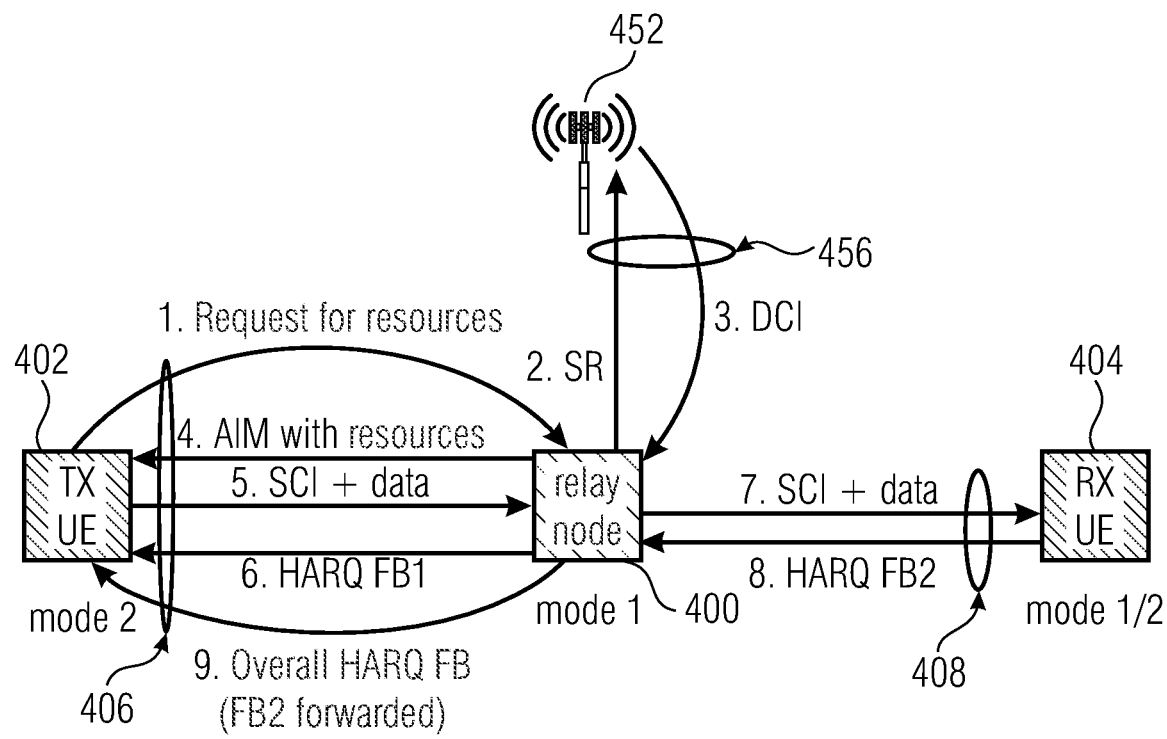
FIG. 14 illustrates a second embodiment of a wireless communication network including a relay UE operating in Mode 1 and a TX UE operating in Mode 2 in accordance with embodiments of the first aspect of the present invention, wherein the TX UE, rather than sensing resources for the transmission to the relay UE, sends a request for such resources to the relay UE.

FIG. 14 illustrates a further embodiment of a wireless communication system including a TX UE operating in Mode 2 and a relay UE operating in Mode 1 in accordance with which the TX UE 402, rather than sensing resources for the transmission to the relay UE, sends a request for such resources to the relay UE.

The functionality for providing the overall feedback for a transmission from the TX UE 402 to the RX UE 404 is as follows:

1. The TX UE 402 sends over the sidelink connection 406 a request to the relay UE 400 causing the relay UE to provide resources that are, assigned by the gNB 452 or assisted by the relay UE 400.

This may be employed, for example, when the TX UE needs resources for a high reliability transmission so that resources may be assigned by the gNB. Thus, instead of relying only on the resources determined by sensing, the TX UE requests the relay UE for resources. This is akin to the TX UE requesting for an AIM, assistance information message.

2. The relay UE 400 sends a scheduling request, SR, or a BSR, in an uplink channel to the gNB 452 requesting for resources for relaying the transmission the relay UE 400 receives from the TX UE 402, and for resources to be used by the TX UE for the transmission to the relay UE. Thus, the relay UE 400 requests from the gNB resources for the TX UE to transmit to the relay UE and resource for the relay UE to transmit to the RX UE.
3. The gNB 452 sends in an downlink channel a DCI to the relay UE 400 including the resources to be used by the TX UE for sending the transmission from the TX UE 402 to the relay UE 400 over the sidelink connection 406, and the resources to be used by the relay UE for relaying the transmission from the TX UE to the RX UE 404 over the sidelink connection 408.

The DCI may be a single DCI with both the information together or may be two separate Das separately sending the resources for the TX UE and the relay UE either together in time or after a short, pre-defined interval.

4. The relay UE 400 sends over the sidelink connection 406 an assistance information message, AIM, to the TX UE including the resources to be used by the TX UE 402 for the transmission to the relay UE.
5. The TX UE 402 sends over the first sidelink connection 406 the SCI and the data of the transmission to the relay node 400 using the resources received in the AIM or, in accordance with other embodiments, by combining resources indicated in the AIM with resources obtained by sensing.
6. The relay node 400 sends over the first sidelink connection 406 to the TX UE 402 a HARQ feedback, FB1, indicating the status of the transmission from the TX UE 402 to the relay UE 400 using resources indicated in the DCI received in (3).
7. The relay UE 400 sends a SCI and the data of the transmission over the sidelink connection 408 to the RX UE 404.
8. The RX UE 404 sends a HARQ feedback about the status of the transmission at the RX UE to the relay UE 400 over the sidelink connection 408.
9. The relay UE 400 reports over the sidelink connection 406 the feedback received from the RX UE 404 to the TX UE 402, as described in the embodiments above.

It is possible for the relay UE 400 to send a feedback report over the Uu connection 456 to the gNB 452 so that the gNB is aware of the status of the transmission that used resources granted by the gNB 452. If the report stated that the transmission was unsuccessful, the gNB 452 may provide further resources for retransmission, based on the initial request (SR or BSR), without forcing the relay UE 400 to send another BSR or SR. If the report stated that the transmission was successful, the gNB 452 may allocate the same HARQ ID with New Data Indicator (NDI) toggled for another TB to be transmitted.

2. UE-to-Network Relays

In the following, embodiments of the first aspect of the present invention are described which relate to UE-to-network relays. Thus, in accordance with the following embodiments, the transmitting entity is no longer a TX UE connected to the relay UE via the sidelink but is a RAN entity, like a gNB, connected to the relay UE over the Uu interface.

(a) gNB Operates as Transmitter and Relay UE Operates in Mode 1

Figure 15:
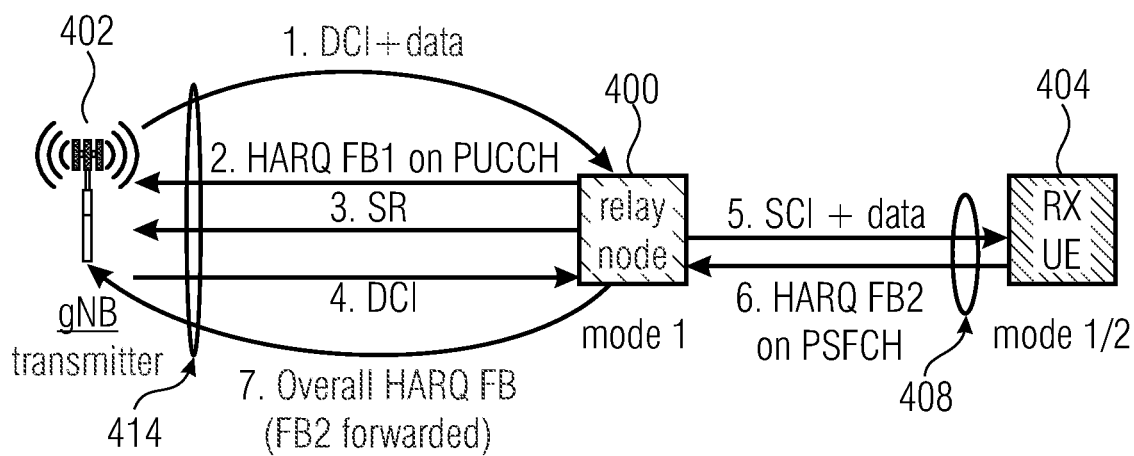
FIG. 15 illustrates a first embodiment of a wireless communication network including a relay UE operating in Mode 1 and a TX entity being a gNB in accordance with embodiments of the first aspect of the present invention, wherein resources for the respective links between the gNB and the relay UE and between the relay UE and the RX UE are provided in separate control messages.

FIG. 15 illustrates an embodiment of a wireless communication system or network including as a transmitting entity 402 a RAN entity, like a base station or gNB connected to the relay UE 400 via a Uu interface 414, while the relay UE 400 is connected to the RX UE 400 over the sidelink connection 408. The relay UE operates in Mode 1, while the RX UE 404 may operate in Mode 1 or in Mode 2.

The functionality for providing the overall feedback for a transmission from the gNB 402 to the RX UE 404 is as follows:

1. The gNB 402 transmits to the relay UE over the Uu interface 414 the control, like the DCI, and the data of the transmission.
2. The relay node 400 sends over the Uu interface 414 to the gNB 402 a HARQ feedback, FB1, indicating the status of the transmission from the gNB 402 to the relay UE 400.
3. The relay UE 400 sends a scheduling request, SR, in an uplink channel of the Uu interface 414 to the gNB 402 requesting for resources for relaying the transmission the relay UE 400 received from the TX UE 402.
4. The gNB 452 sends in an downlink channel of the Uu interface 414 a DCI to the relay UE 400 including the resources to be used by the relay UE for relaying the transmission from the gNB to the RX UE 404 over the sidelink connection 408.
5. The relay UE 400 sends a SCI and the data of the transmission over the sidelink connection 408 to the RX UE 404 using resources indicated in the DCI received in (4).
6. The RX UE 404 sends a HARQ feedback about the status of the transmission at the RX UE to the relay UE 400 over the sidelink connection 408.
7. The relay UE 400 reports over the Uu interface 414 the feedback received from the RX UE 404 to the gNB 402, as described in the embodiments above.

Figure 16:
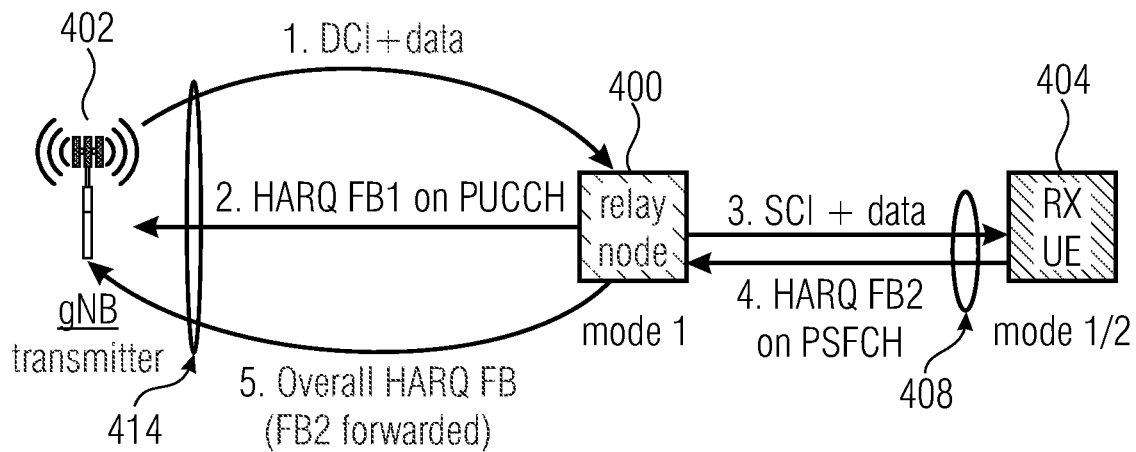
FIG. 16 illustrates a second embodiment of a wireless communication network including a relay UE operating in Mode 1 and a TX entity being a gNB in accordance with embodiments of the first aspect of the present invention, wherein resources for the respective links between the gNB and the relay UE and between the relay UE and the RX UE are provided in a common control message.

In accordance with other embodiments, when providing the DCI (1) and the data from the gNB to the relay UE, also the resources for relaying the transmission to the RX UE may be included, thereby avoiding the additional scheduling request (3) from the relay UE to the gNB as well as the additional DCI (4) illustrated in FIG. 15. This is because the gNB is aware that the transmission is relayed and not directly transmitted to the RX UE. Another optimization is where the relay UE sends a request for resources to the gNB using the HARQ feedback, FB1, (2) from the relay UE to the gNB, thereby avoiding the additional scheduling request (3) from the relay UE to the gNB alone. FIG. 16 illustrates an embodiment of a wireless communication system in which the initial message from the gNB to the relay UE also includes the resources to be used for relaying.

The functionality for providing the overall feedback for a transmission from the gNB 402 to the RX UE 404 is as follows:

1. The gNB 402 transmits to the relay UE over the Uu interface 414 the control, like the DCI, and the data of the transmission. The DCI also includes the resources to be used by the relay UE 400 for relaying the transmission to the RX UE 404.

The DCI may be a single DCI with both the information together or may be two separate Das separately sending the resources for the TX UE and the relay UE either together in time or after a short, pre-defined interval.

2. The relay node 400 sends over the Uu interface 414 to the gNB 402 a HARQ feedback, FB1, indicating the status of the transmission from the gNB 402 to the relay UE 400.

3. The relay UE 400 sends a SCI and the data of the transmission over the sidelink connection 408 to the RX UE 404 using resources indicated in the DCI received in (1).
4. The RX UE 404 sends a HARQ feedback about the status of the transmission at the RX UE to the relay UE 400 over the sidelink connection 408.
5. The relay UE 400 reports over the Uu interface 414 the feedback received from the RX UE 404 to the gNB 402, as described in the embodiments above.

In (1), since the gNB 402 is aware that the transmission or packet is to be relayed by the relay UE to the RX UE, instead of expecting a scheduling request from the relay UE, the gNB actively sends the resources to be used by the relay UE for a transmission to the RX UE in the DCI, apart from sending the resources where the gNB transmits the data to the relay UE.

(b) gNB Operates as Transmitter and Relay UE Operates in Mode 2

Figure 17:
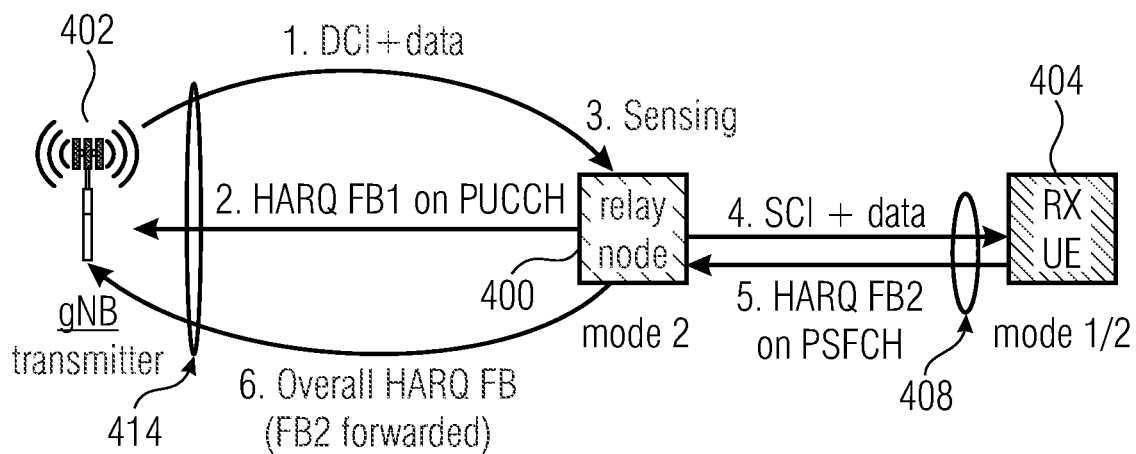
FIG. 17 illustrates an embodiment of a wireless communication network including a relay UE operating in Mode 2 and a TX entity being a gNB in accordance with embodiments of the first aspect of the present invention.

FIG. 17 illustrates an embodiment of a wireless communication system in which the transmitting entity is a gNB and the relay UE 400 operates in Mode 2, while the RX UE operates in Mode 1 or in Mode 2.

The functionality for providing the overall feedback for a transmission from the gNB 402 to the RX UE 404 is as follows:

1. The gNB 402 transmits to the relay UE over the Uu interface 414 the control, like the DCI, and the data of the transmission.
2. The relay node 400 sends over the Uu interface 414 to the gNB 402 a HARQ feedback, FB1, indicating the status of the transmission from the gNB 402 to the relay UE 400.
3. The relay UE identifies and selects resources by sensing to be used for relaying the transmission to the RX UE 404.
4. The relay UE 400 sends a SCI and the data of the transmission over the sidelink connection 408 to the RX UE 404 using the identified and selected resources.
5. The RX UE 404 sends a HARQ feedback about the status of the transmission at the RX UE to the relay UE 400 over the sidelink connection 408.
6. The relay UE 400 reports over the Uu interface 414 the feedback received from the RX UE 404 to the gNB 402, as described in the embodiments above.

(c) TX UE Operates in Mode 2, Relay UE Operates in Mode 1 and RX Entity is gNB

Figure 18:
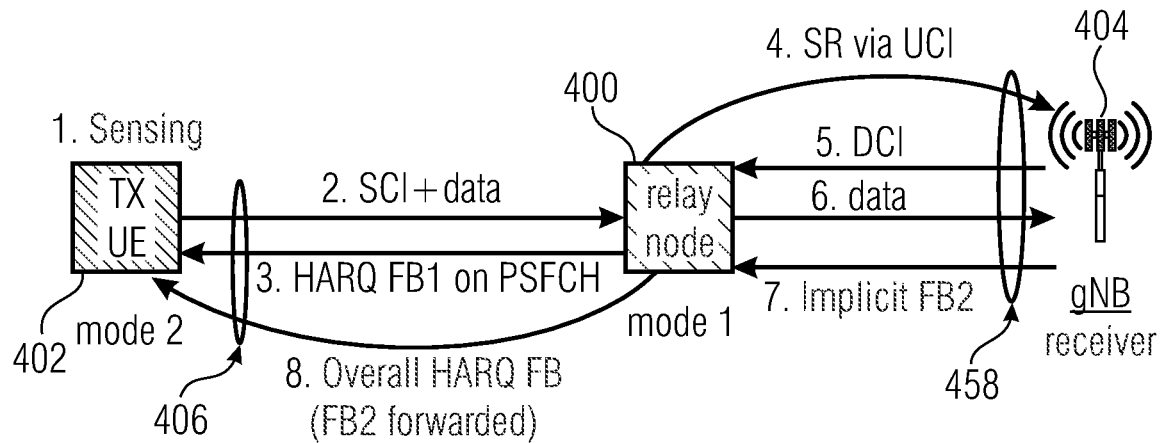
FIG. 18 illustrates a first embodiment of a wireless communication network including a relay UE operating in Mode 1 and an RX entity being a gNB in accordance with embodiments of the first aspect of the present invention, wherein resources for the link between the gNB and the relay UE are provided by a control message from the gNB, and resources for the transmission from the TX UE to the relay UE are obtained by the TX UE by sensing.

FIG. 18 illustrates an embodiment of a wireless communication system in which the transmitting entity 402 is a user device connected to the relay UE 400 over a sidelink connection 406, while the receiving entity is a gNB 404 connected to the relay node via the Uu interface 458.

The functionality for providing the overall feedback for a transmission from the gNB 404 to the TX UE 402 is as follows:

1. The TX UE 402 identifies and selects resources for a transmission to the relay UE 400 by sensing.
2. The TX UE 402 sends over the first sidelink connection 406 the SCI and the data of the transmission to the relay node 400 using the identified and selected resources.
3. The relay node 400 sends over the first sidelink connection 406 to the TX UE 402 a HARQ feedback, FB1, indicating the status of the transmission from the TX UE 402 to the relay UE 400.
4. The relay UE 400 sends a scheduling request, SR, in an uplink channel over the Uu interface 458 to the gNB 404 requesting for resources for relaying the transmission the relay UE 400 received from the TX UE 402.
5. The gNB 452 sends in an downlink channel over the Uu interface 458 a DCI to the relay UE 400 including the resources to be used by the relay UE for relaying the transmission from the TX UE to the gNB 404 over the Uu connection 458.
6. The relay UE 400 sends the data of the transmission over the Uu connection 458 to the gNB UE 404 using resources indicated in the DCI received in (5).
7. The gNB UE 404 sends a feedback about the status of the transmission at the gNB to the relay UE 400 over the Uu connection 458.

In accordance with embodiments the feedback may be a HARQ feedback.

In accordance with other embodiments, the concept of Downlink Frame Indicator, DFI, as used in NR Unlicensed (NR-U), is reused by the gNB transmitting a DFI to the relay UE and the DFI containing a feedback to more than one transmission. In case of the DFI being bundled with feedback for multiple transmissions, each transmission has a timer attached to ensure that a relay node receives the DFI before the timer runs down. If the relay UE does not receive the DFI for a transmission within the timer, the transmission is considered unsuccessful.

8. The relay UE 400 reports over the sidelink connection 406 the feedback received from the gNB 404 to the TX UE 402, as described in the embodiments above.

Figure 19:
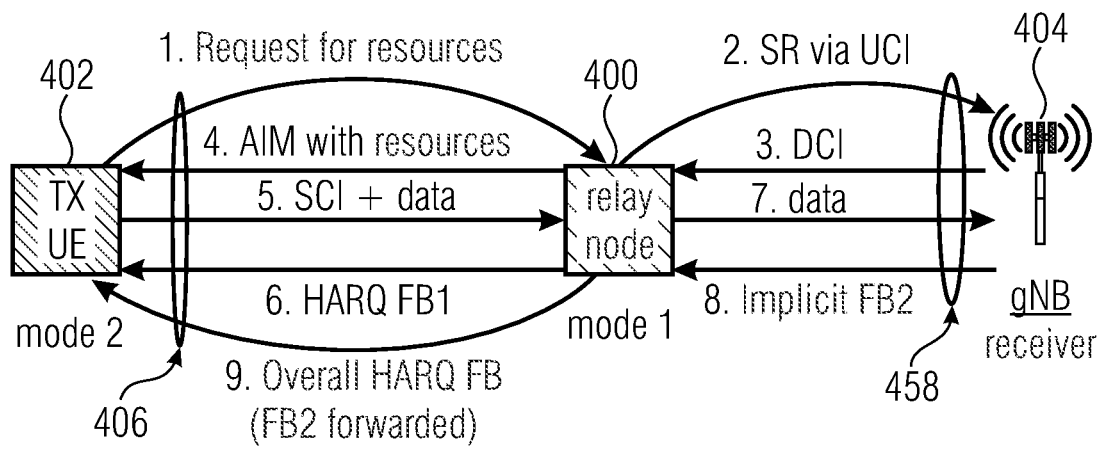
FIG. 19 illustrates a second embodiment of a wireless communication network including a relay UE operating in Mode 1 and an RX entity being a gNB in accordance with embodiments of the first aspect of the present invention, wherein resources for the link between the gNB and the relay UE are provided by a control message from the gNB, and resources for the transmission from the TX UE to the relay UE are obtained by the TX UE from the gNB via the relay UE.

FIG. 19 illustrates a further embodiment of a wireless communication system in which the transmitting entity 402 is a user device connected to the relay UE 400 over a sidelink connection 406, while the receiving entity is a gNB 404 connected to the relay node via the Uu interface 458. Rather than sensing resources for the transmission to the relay UE, the TX UE 402 sends a request for such resources to the relay UE.

The functionality for providing the overall feedback for a transmission from the gNB 404 to the TX UE 402 is as follows:

1. The TX UE 402 sends over the sidelink connection 406 a request to the relay UE 400 causing the relay UE to provide resources that are, assigned by the gNB 404 or assisted by the relay UE 400.

This may be employed, for example, when the TX UE needs resources for a high reliability transmission so that resources may be assigned by the gNB. Thus, instead of relying only on the resources determined by sensing, the TX UE requests the relay UE for resources. This is akin to the TX UE requesting for an AIM, assistance information message.

2. The relay UE 400 sends a scheduling request, SR, or a BSR, in an uplink channel over the Uu interface 458 to the gNB 404 requesting for resources for relaying the transmission the relay UE 400 is to receive from the TX UE 402, and for resources to be used by the TX UE for the transmission to the relay UE.
3. The gNB 404 sends in an downlink channel of the Uu connection 458 a DCI to the relay UE 400 including the resources to be used by the TX UE for sending the transmission from the TX UE 402 to the relay UE 400 over the sidelink connection 406, and the resources to be used by the relay UE for relaying the transmission from the TX UE to the gNB 404 over the Uu connection 458.

The DCI may be a single DCI with both the information together or may be two separate Das separately sending the resources for the TX UE and the relay UE either together in time or after a short, pre-defined interval.
4. The relay UE 400 sends over the sidelink connection 406 an assistance information message, AIM, to the TX UE including the resources to be used by the TX UE 402 for the transmission to the relay UE.
5. The TX UE 402 sends over the first sidelink connection 406 the SCI and the data of the transmission to the relay node 400 using the resources received in the AIM or, in accordance with other embodiments, by combining resources indicated in the AIM with resources obtained by sensing.
6. The relay node 400 sends over the first sidelink connection 406 to the TX UE 402 a HARQ feedback, FB1, indicating the status of the transmission from the TX UE 402 to the relay UE 400.
7. The relay UE 402 sends the data of the transmission over the Uu connection 458 to the gNB 404 using resources indicated in the DCI received in (3).
8. The gNB 404 sends a feedback about the status of the transmission at the RX UE to the relay UE 400 over the Uu connection 458.

In accordance with embodiments the feedback may be a HARQ feedback.

In accordance with other embodiments, the concept of DFI, as used in NR-U, is reused by the gNB transmitting a DFI to the relay UE and the DFI containing a feedback to more than one transmission. In case of the DFI being bundled with feedback for multiple transmissions, each transmission has a timer attached to ensure that a relay node receives the DFI before the timer runs down. If the relay UE does not receive the DFI for a transmission within the timer, the transmission is considered unsuccessful.

9. The relay UE 400 reports over the sidelink connection 406 the feedback received from the RX UE 404 to the TX UE 402, as described in the embodiments above.

With regard to the embodiments described with reference to FIG. 10 to FIG. 19 it is noted that the sending of a HARQ feedback from the relay UE 400 to the TX entity, which may be the TX UE or the gNB, is optional as, in accordance with the above described embodiments of the first aspect, instead of sending the two feedbacks FB1 and FB2 to the TX UE, only the feedback from the RX UE may be transmitted from the relay UE 400 to the TX UE or gNB. It is also possible for the relay UE 400 to not receive feedback from the RX entity and even in its absence, in accordance with the above described embodiments of the first aspect, the relay UE 400 may provide feedback to the TX entity. This is when the relay UE has attempted to retransmit to the RX entity either for a configured or pre-defined number of retransmissions, or for a configured or pre-defined time duration, but failed to receive a successful acknowledgement. In this case, the relay UE reports an unsuccessful feedback to the TX entity.

Second Aspect

Embodiments of the second aspect of the present invention address the differentiation of a transmission, like control and data messages, at the relay node, RN, into transmissions to be relayed, also referred to as first transmissions, and into transmissions intended for the relay node, also referred to as second transmissions.

Relay UE

According to a second aspect the present invention provides a user device, UE, for a wireless communication network,
wherein the UE is to act as a relay UE so as to provide functionality to support connectivity between a transmitting entity and one or more receiving entities of the wireless communication network,
wherein the UE is to differentiate a transmission, which is received from the transmitting entity, between a first transmission to be relayed to a receiving entity and a second transmission that is intended for the UE, and
wherein the UE is to differentiate the received transmission by one or more of the following:
control information associated with the transmission,
resources on which the transmission and/or the associated control information is received.

In accordance with embodiments, the control information associated with the transmission comprises one or more of the following:
a direct interface control message, like a sidelink control information, SCI, associated with the transmission, the SCI indicating whether the transmission is a first transmission or a second transmission,
a network interface control message, like a downlink control information, DCI, associated with the transmission, the DCI indicating whether the transmission is a first transmission or a second transmission,
a Medium Access Control, MAC, header associated with the transmission, the MAC header indicating whether the transmission is a first transmission or a second transmission.

In accordance with embodiments, the resources on which the transmission and/or the associated control information is received comprise one or more of the following:
a relay sidelink control channel, wherein control information associated with the transmission and received on resources of the relay sidelink control channel indicate that the associated transmission is a first transmission,
a relay bandwidth part, R-BWP, wherein receiving the transmission and/or control information associated with the transmission on resources of the R-BWP indicates that the transmission is a first transmission,
a relay sidelink resource pool, wherein receiving the transmission and/or control information associated with the transmission on resources of a relay sidelink resource pool indicates that the transmission is a first transmission.

In accordance with embodiments, the UE is to receive the transmission from the transmitting entity over a direct interface, like a sidelink, or over an access network interface, like a 3GPP or non-3GPP interface.

In accordance with embodiments,
the transmitting entity comprises a user device, UE, or a relay UE, and the receiving entity comprises a user device, UE, or a relay UE, or
the transmitting entity comprises a user device, UE, or a relay UE, and the receiving entity comprises a network entity, like a radio access network, RAN, entity, or
the transmitting entity comprises a network entity, like a RAN entity, and the receiving entity comprises a user device, UE, or a relay UE.

SCI

In accordance with embodiments,
the UE is to differentiate the received transmission using control information associated with the transmission, the control information comprising a $1^{st}$ stage and/or a $2^{nd}$ stage sidelink control information, SCI, associated with the transmission, and
the sidelink control information, SCI, associated with the transmission comprises:

a 1$^{st}$ stage SCI is provided including one or more additional parameters indicating whether the transmission is a first transmission or a second transmission, and the UE, responsive to receiving the 1$^{st}$ stage SCI, is to determine, using the one or more additional parameters, the transmission to be a first transmission or a second transmission, and, in case of a first transmission, to relay the transmission to the receiving entity, and/or a 2$^{nd}$ stage SCI is provided including one or more parameters modified for indicating whether the transmission is a first transmission or a second transmission, and the UE, responsive to receiving the 2$^{nd}$ stage SCI, is to determine, using the one or more parameters, the transmission to be a first transmission or a second transmission, and, in case of a first transmission, to relay the transmission to the receiving entity, or a predefined 2$^{nd}$ stage SCI is provided catering to transmissions to be relayed, and the UE, responsive to receiving the predefined 2$^{nd}$ stage SCI, is to determine the transmission to be a first transmission and to relay the transmission to the receiving entity.

In accordance with embodiments, the SCI includes:

destination information indicating only the UE, like a destination or layer 1, L1, ID of the UE, or destination information indicating only the receiving entity, like a destination or L1 ID of the receiving entity, or first destination information indicating the UE, like a destination or L1 ID of the UE, and second destination information indicating the receiving entity, like a destination or L1 ID of the receiving entity, or combined destination information indicating both the UE and the receiving entity.

wherein, responsive to receiving destination information indicating only the UE, the UE is to determine the transmission to be a second transmission, and wherein, responsive to receiving destination information indicating the receiving entity only or responsive to receiving first destination information indicating the UE and second destination information indicating the receiving entity or responsive to receiving the combined destination information, the UE is to determine the transmission to be a first transmission.

In accordance with embodiments, the SCI includes an indication, like a time indicator, by when the receiving entity is to receive the transmission.

In accordance with embodiments, in case the timer exceeds a threshold or the UE determines that a time for the transmission to the receiving entity and for receiving an acknowledgment, ACK, from the receiving entity exceeds the threshold, the UE is to:

drop the transmission or packet, or drop the transmission or packet and send a non-acknowledgment, NACK, to the transmitting entity.

In accordance with embodiments, responsive to determining from the SCI the transmission to be a first transmission, the UE is to refrain from decoding the transmission and/or forwarding the transmission to a higher layer, and load the transmission into a buffer together with the destination or L1 ID of the receiving entity for a transmission to the receiving entity.

In accordance with embodiments, the SCI includes information indicating the transmitting entity, like a layer 1, L1, ID of the transmitting entity UE, wherein the UE is to determine, using the information indicating the transmitting entity, whether the transmitting entity is in a list of configured or preconfigured transmitting entities, wherein, in case the transmitting entity is from the list, the UE is to determine the transmission to be a first transmission, and wherein, in case the transmitting entity is not from the list, the UE is to determine the transmission to be a second transmission.

In accordance with embodiments, the SCI includes a predefined destination information, like predefined destination or layer 1, L1, ID, the predefined destination information indicating that the transmission associated with the SCI is to be relayed, and responsive to receiving the predefined destination information, the UE is to map the predefined destination information to the actual destination information of the receiving entity, like a destination or layer 1, L1, ID of the receiving entity, and to relay the transmission to the receiving entity.

In accordance with embodiments, the predefined destination information is one or more of:

a virtual destination ID, a destination ID from a configured or preconfigured list or pool of destination IDs.

In accordance with embodiments, the UE is to provide the predefined destination information to the transmitting entity to be used by the transmitting entity for transmissions to be relayed to the receiving entity, or the UE is to receive the predefined destination information from the receiving entity and to forward the received predefined destination information to the transmitting entity to be used by the transmitting entity for transmissions to be relayed to the receiving entity.

In accordance with embodiments, the SCI includes a certain HARQ process ID or HARQ process number, which is mapped to a certain destination ID of a receiving entity, and destination information indicating only the UE, like a destination or L1 ID of the UE, and responsive to the certain HARQ process ID or HARQ process number, the UE is to determine the transmission to be a first transmission and to relay the transmission to the receiving entity to which the certain HARQ process ID is mapped.

MAC Header

In accordance with embodiments, in case the UE is to differentiate the received transmission using the Medium Access Control, MAC, header associated with the transmission, the MAC header includes an indication that informs the UE that the transmission is a first transmission and that the UE is not the intended receiver.

In accordance with embodiments, the user device comprises a MAC layer that includes a logical channel, like a logical relay channel, LRCH, and wherein, responsive to receiving a MAC header including an indication that the transmission is a first transmission and is not intended for the UE, the UE is to place the transmission into a buffer or a queue of the LRCH for a transmission to the receiving entity.

In accordance with embodiments, the MAC header includes destination information of the receiving entity, like a destination or layer 2, L2, ID of the receiving entity, and responsive to the destination information of the receiving entity in the MAC header, the UE is to determine the transmission to be a first transmission.

In accordance with embodiments, the SCI further includes destination information indicating the UE, like a destination or L1, ID of the UE.

In accordance with embodiments,
the MAC header includes a predefined destination information, like predefined destination or layer 2, L2, ID, the predefined destination information indicating that the transmission associated with the MAC header is to be relayed, and
responsive to receiving the predefined destination information, the UE is to map the predefined destination information to the actual destination information of the receiving entity, like a destination or layer 2, L2, ID of the receiving entity, and to relay the transmission to the receiving entity.

In accordance with embodiments, the predefined destination information is one or more of:
a virtual destination ID,
a destination ID from a configured or preconfigured list or pool of destination IDs.

In accordance with embodiments,
the UE is to provide the predefined destination information to the transmitting entity to be used by the transmitting entity for transmissions to be relayed to the receiving entity, or
the UE is to receive the predefined destination information from the receiving entity and to forward the received predefined destination information to the transmitting entity to be used by the transmitting entity for transmissions to be relayed to the receiving entity.

In accordance with embodiments, the control information includes a parameter that is decremented or incremented upon transmitting the message by the UE and wherein the UE does not relay the message once a configured or preconfigured value is reached.

In accordance with embodiments, a failure indication is sent to one or more of:
the transmitting entity, and/or
the network, and/or
the previous relay UE from which the packet was received.

Dedicated Relay Sidelink Control Channel

In accordance with embodiments,
the wireless communication network includes a relay sidelink control channel, and
responsive to receiving a sidelink control information, SCI, associated with a transmission in the relay sidelink control channel, the UE is to determine the transmission to be a first transmission.

In accordance with embodiments, the relay sidelink control channel is a sub-channel in a sidelink resource pool, like the NR V2X resource pool.

In accordance with embodiments, the relay sidelink control channel is defined in a sidelink control channel, like the PSCCH, by defining one or more of:
a number of resource blocks, RBs, within the PSCCH to be used for control messages meant only for relaying,
a periodicity where all RBs in the PSCCH are dedicated for control messages meant only for relaying at specified intervals of time, or
a periodicity where a selected number of RBs across frequency in the PSCCH are dedicated for control messages meant only for relaying at specified intervals of time.

In accordance with embodiments, responsive to receiving a sidelink control information, SCI, associated with a transmission in the relay sidelink control channel, UE is to refrain from decoding the transmission and forwarding the transmission to a higher layer, and load the transmission into a buffer together with the destination ID of the receiving entity for a transmission to the receiving entity.

Dedicated Bandwidth Part

In accordance with embodiments,
the wireless communication network includes a relay bandwidth part, R-BWP, to be used exclusively for relay-related transmission and reception of control and/or data, and
responsive to receiving a transmission and/or control information associated with the transmission in the R-BWP, the UE is to determine the transmission to be a first transmission.

In accordance with embodiments, the R-BWP is used for sending a feedback for a relayed transmission.

Dedicated Relay Sidelink Resource Pool

In accordance with embodiments,
the wireless communication network includes a relay sidelink resource pool, R-RP, to be used exclusively for relay-related transmission and reception of control and/or data, and
responsive to receiving a transmission and/or control information associated with the transmission in the R-RP, the UE is to determine the transmission to be a first transmission.

In accordance with embodiments, the R-RP is used for sending a feedback for a relayed transmission.

In accordance with embodiments, the relay resource pool, R-RP, is defined within a BWP and comprises one or more resource pools, like one or more transmit or receive pools, one or more transmit relay resource pools, TX R-RPs, one or more receive relay resource pools, RX R-RPs, or one or more R-RPs where both TX and RX occur.

In accordance with embodiments, the R-RP comprises a first R-RP configured for UEs operating in Mode 1 and second R-RP configured for UEs operating in Mode 2.

In accordance with embodiments, the R-RP is configured for UEs operating in Mode 1 and for UEs operating in Mode 2, wherein the UEs is expected to provide periodic congestion reports to the transmitting entity, so that the transmitting entity is aware of the available resources within the R-RP.

In accordance with embodiments, the relay resource pool, R-RP, is employed for the relay-related transmission and/or reception of control and/or data in case a link quality of a link between the transmitting entity and the receiving entity and/or between the relay entity and the receiving entity is below a predefined link quality threshold.

In accordance with embodiments, the UE is to receive one or more resource pool configurations, e.g., in one or more system information blocks, SIBs or other control signaling within control channels, e.g. PDCCH or PDSCH, the one or more resource pool configurations including a R-RP configuration, the R-RP configuration including:
an indication that a base station supports relaying,
the link quality threshold below which a transmitting entity is to switch to a relay-based transmission,
the resources of the R-RP.

In accordance with embodiments, the R-RP configuration further includes a periodicity of feedback channel resources, like the Physical Sidelink Feedback Channel, PSFCH, resources, in terms of a number of time slots, wherein, in case the periodicity is set to a zero value, no feedback channel resources are defined in the R-RP.

In accordance with embodiments, the UE is to use the feedback channel for sending to the transmitting entity a feedback for a transmission received from the transmitting entity as follows:

in case the transmission from the transmitting entity to the UE fails, the UE is to send a NACK to the transmitting entity requesting for a retransmission, and/or in case the transmission from the transmitting entity to the UE is successful, the UE is to send an ACK only after the UE received a successful feedback from the receiving entity so that the UE may provide the transmitting entity with an overall HARQ feedback of the transmission from the transmitting entity to the receiving entity, or, send a $1^{st}$ ACK after the UE received the transmission from the transmitting entity and a $2^{nd}$ ACK after the UE received a successful feedback from the receiving entity so that the UE may provide the transmitting entity with an overall HARQ feedback of the transmission from the transmitting entity to the receiving entity.

In accordance with embodiments, in the case of a transmission to be send as broadcast, or in case a transmission is not directed to the UE, or in case of a transmission to be send as unicast or groupcast with feedback disabled, the UE is to disable a feedback transmission.

In accordance with embodiments, the relay sidelink control channel and/or the R-BWP and/or the R-RP comprises a spectrum or frequency range different from the spectrum or frequency range in which a second transmission is transmitted and/or received.

In accordance with embodiments, responsive to determining the transmission to be a first transmission, the UE is to refrain from decoding the transmission and forwarding the transmission to a higher layer, and load the transmission into a buffer together with the destination ID of the receiving entity for a transmission to the receiving entity, or decode the transmission for higher layer optimization, and to transmit this packet to the intended RX UE using the normal transmit pool, and load the optimized transmission into a buffer together with the destination ID of the receiving entity for a transmission to the receiving entity.

In accordance with embodiments, responsive to receiving a control information associated with a transmission, in case the destination ID parameter indicating the UE is left blank, is set to a null value or is set to a default value, and the destination ID parameter indicating the receiving entity is specified, or, in the case of a combined destination information indicating both the UE and the receiving entity, where the destination ID parameter indicating the UE is left blank, is set to a null value or is set to a default value, and the destination ID parameter indicating the receiving entity is specified, the UE is to receive the transmission in a broadcast manner, and is to send the transmission to the intended receiving entity or entities in a unicast or groupcast or broadcast manner.

In accordance with embodiments, responsive to receiving a control information, associated with a transmission, in case the destination ID parameter indicating the UE is specified, and the destination ID parameter indicating the receiving entity is specified, or in the case of a combined destination information indicating both the UE and the receiving entity, where the destination ID parameter indicating the UE is specified, and the destination ID parameter indicating the receiving entity is specified, the UE is to receive the transmission in a groupcast or unicast manner, and is to send the transmission to the intended receiving entity or entities in a unicast or groupcast or broadcast manner.

In accordance with embodiments, the user device comprises one or more of the following: a mobile terminal, or a stationary terminal, or a cellular IoT-UE, or a vehicular UE, or a leader, GL, UE, or an IoT or narrowband IoT, NB-IoT, device, or wearable device, like a smartwatch, or a fitness tracker, or smart glasses, or a ground based vehicle, or an aerial vehicle, or a drone, or a moving base station, or road side unit, RSU, or a building, or any other item or device provided with network connectivity enabling the item/device to communicate using the wireless communication network, e.g., a sensor or actuator, or any other item or device provided with network connectivity enabling the item/device to communicate using a sidelink the wireless communication network, e.g., a sensor or actuator, or any sidelink capable network entity.

Transmitting Entity

According to the second aspect the present invention provides a transmitting entity for a wireless communication network, wherein the transmitting entity is connectable to a relay UE so as to provide functionality to support connectivity between the transmitting entity and one or more receiving entities of the wireless communication network, and wherein the transmitting entity is to indicate a transmission to a relay UE as a first transmission, which is to be relayed to the receiving entity, by on one or more of the following:

associating the transmission with specific control information, sending the transmission and/or the associated control information on specific resources.

In accordance with embodiments, associating the transmission with specific control information comprises one or more of the following:

associating with the transmission a direct interface control message, like a sidelink control information, SCI, which indicates whether the transmission is a first transmission or a second transmission that is intended for the relay UE, associating with the transmission a network interface control message, like a downlink control information, DCI, which indicates whether the transmission is a first transmission or a second transmission that is intended for the relay UE, associating with the transmission a Medium Access Control, MAC, the MAC header indicating whether the transmission is a first transmission or a second transmission.

In accordance with embodiments, sending the transmission and/or the associated control information on specific resources comprises one or more of the following:

sending a direct interface control message, like a sidelink control information, SCI, associated with the transmission in a relay sidelink control channel, using resources of a relay bandwidth part, R-BWP, for sending the transmission and/or the control information associated with the transmission, using resources of a relay sidelink resource pool for sending the transmission and/or the control information associated with the transmission.

In accordance with embodiments, the transmitting entity is to send the transmission over a direct interface, like a sidelink, or over a access network interface, like a 3GPP or non-3GPP interface to the relay UE.

In accordance with embodiments,
the transmitting entity comprises a user device, UE, or a relay UE, and the receiving entity comprises a user device, UE, or a relay UE, or
the transmitting entity comprises a user device, UE, or a relay UE, and the receiving entity comprises a network entity, like a radio access network, RAN, entity, or
the transmitting entity comprises a network entity, like a RAN entity, and the receiving entity comprises a user device, UE, or a relay UE.

SCI

In accordance with embodiments, the transmitting entity is to provide
a $1^{st}$ stage SCI including one or more additional parameters indicating whether the transmission is a first transmission or a second transmission, or
a 2nd stage SCI including one or more parameters modified for indicating whether the transmission is a first transmission or a second transmission, or
a predefined $2^{nd}$ stage SCI catering to transmissions to be relayed.

MAC Header

In accordance with embodiments, the transmitting entity is to associate with the transmission a Medium Access Control, MAC, header including an indication that informs the relay UE that the transmission is a first transmission and that the UE is not the intended receiver.

Dedicated Relay Sidelink Control Channel

In accordance with embodiments,
the wireless communication network includes a relay sidelink control channel, and
the transmitting entity is to send a sidelink control information, SCI, associated with a transmission in the relay sidelink control channel.

Dedicated Bandwidth Part

In accordance with embodiments,
the wireless communication network includes a relay bandwidth part, R-BWP, to be used exclusively for relay-related transmission and reception of control and/or data and/or feedback, and
the transmitting entity is to send a transmission and/or control information and/or feedback information associated with the transmission in the R-BWP.

Dedicated Relay Sidelink Resource Pool

In accordance with embodiments,
the wireless communication network includes a relay sidelink resource pool, R-RP, to be used exclusively for relay-related transmission and reception of control and/or data and/or feedback, and
the transmitting entity is to send a transmission and/or control information and/or feedback associated with the transmission in the R-RP.

In accordance with embodiments, the transmitting entity is to use the R-RP dependent on one or more of:
a link quality between the transmitting entity and the relay UE,
a congestion status of a normal sidelink resource pool,
a distance between the transmitting entity and the receiving entity.

In accordance with embodiments,
in case the transmission is to be broadcasted and an intention of the transmission is coverage extension, the transmitting entity is to send the transmission to any relay UE, or
in case the transmission is a groupcast or unicast transmission, the transmitting entity is to send the transmission to any relay UE on the R-RP, that is further expected to transmit to the intended remote UE, or
in case the transmission is a groupcast or unicast transmission, the transmitting entity is to send the transmission to a specific relay UE on the R-RP that is further expected to transmit to the intended remote UE.

In accordance with embodiments, the relay UE is selected based on whether it supports one or more of the following criteria:
a transmit power is above a configured or pre-configured power threshold, e.g. high power, or
a battery status is above a configured or pre-configured threshold, or
specific services are provided, e.g. Public Protection and Disaster Relief (PPDR) services or vehicular safety services.

In accordance with embodiments, the transmitting entity is to indicate in a sidelink control information, SCI, associated with the transmission the destination ID parameter of the relay UE, wherein
in case the destination ID parameter is left blank, is set to a null value or is set to a default value, no specific relay UE is selected so that any relay UE receiving the transmission is expected to relay the transmission to the receiving entity defined by a final destination ID parameter in the SCI, or
in case the destination ID parameter is specified, only the relay UE whose ID is specified in the destination ID is expected to relay the transmission to the receiving entity defined by a final destination ID parameter in the SCI.

In accordance with embodiments, the transmitting entity comprises one or more of the following: a macro cell base station, or a small cell base station, or a central unit of a base station, or an IAB node, or a distributed unit of a base station, or a road side unit (RSU), or a UE, or a group leader (GL), or a relay or a remote radio head, or an AMF, or an MME, or an SMF, or a core network entity, or mobile edge computing (MEC) entity, or a network slice as in the NR or 5G core context, or any transmission/reception point, TRP, enabling an item or a device to communicate using the wireless communication network, the item or device being provided with network connectivity to communicate using the wireless communication network.

Network

According to the second aspect the present invention provides a wireless communication network, comprising:
one or more transmitting entities,
one or more receiving entities, and
one or more relay user devices, relay UE, the relay UE to provide functionality to support connectivity between the transmitting entity and the receiving entity,
wherein the transmitting entity comprises one or more transmitting entities according to the present invention, and/or the relay UE comprises one or user devices, UE, according to the present invention.

Methods

According to the second aspect the present invention provides a method for operating a user device, UE, for a wireless communication network, wherein the UE is to act as a relay UE so as to provide functionality to support connectivity between a transmitting entity and one or more receiving entities of the wireless communication network, the method comprising:

differentiating, by the UE, a transmission, which is received from the transmitting entity, between a first transmission to be relayed to a receiving entity and a second transmission that is intended for the UE, wherein the received transmission is differentiated by one or more of the following:

control information associated with the transmission, resources on which the transmission and/or the associated control information is received.

According to the second aspect the present invention provides a method for operating a transmitting entity for a wireless communication network, the transmitting entity being connected to a relay UE so as to provide functionality to support connectivity between the transmitting entity and one or more receiving entities of the wireless communication network, the method comprising:

indicating, by the transmitting entity, a transmission to a relay UE as a first transmission, which is to be relayed to the receiving entity, by on one or more of the following:

associating the transmission with specific control information, sending the transmission and/or the associated control information on specific resources.

Computer Program Product

Embodiments of the second aspect of the present invention provide a computer program product comprising instructions which, when the program is executed by a computer, causes the computer to carry out one or more methods in accordance with the present invention.

Figure 20A:
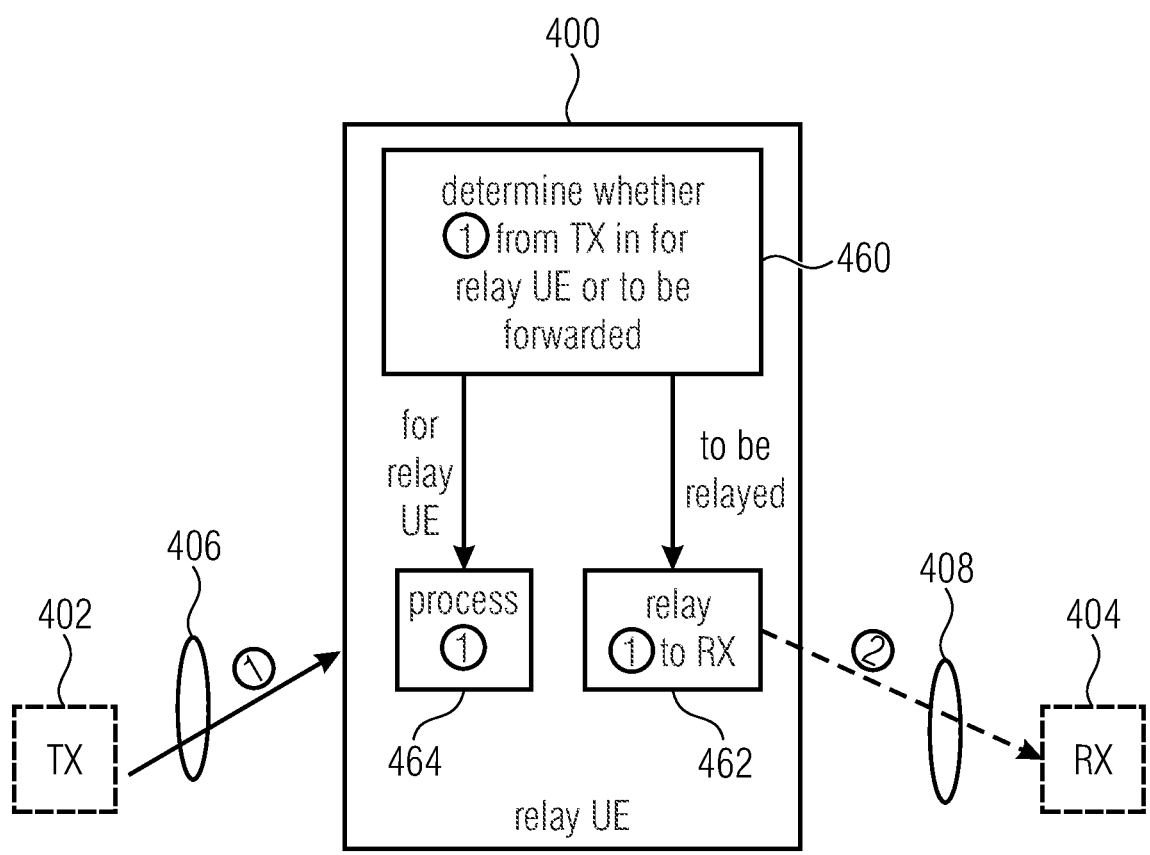
FIG. 20A illustrates an embodiment of a relay UE in accordance with the second aspect of the present invention that differentiates between traffic to be relayed and traffic intended for the relay UE.

FIG. 20A illustrates an embodiment of a relay UE in accordance with the second aspect of the present invention that differentiates traffic between traffic to be relayed and traffic intended for the relay UE. The UE 400 may act as a relay UE so as to provide functionality to support connectivity between a transmitting entity 402 and one or more receiving entities 404, where the transmitting entity and the receiving entities are like a UE or a network entity of a wireless communication system or network, like the system or network described above with reference to FIG. 1. The remote UE may also be referred to a receiving entity. The relay UE 400 and the transmitting entity 402 are connected over a first link or connection 406, and the relay UE may receive over the first link 406 a transmission ① from the transmitting entity 402. The relay UE 400, as is indicated at 460, differentiates the transmission ① between a first transmission to be relayed to the receiving entity 404 and a second transmission that is intended for the relay UE 400. In accordance with embodiments, the relay UE 400 may relay the first transmission over a second link or connection 408 by which the relay UE 400 is connected to the receiving entity 404, towards the receiving entity 404, as is schematically indicated at 462 in FIG. 20A. The second transmission may be processed within the relay UE 400, as is schematically indicated at 464 in FIG. 20A. The relay UE 400 differentiates the transmission received from the transmitting entity 402 by one or more of the following:

control information associated with the transmission ①, resources on which the transmission ① and/or the associated control information is received. For example, the resources may be defined in one or more of time, frequency, code and space.

In accordance with embodiments, the relay UE 400 differentiates the transmission received from the transmitting entity 402 by one or more of the following:

A direct interface control message, like a sidelink control information, SCI, associated with the transmission ① received from the transmitting entity 402 over the first link 406, and the SCI indicating whether the transmission is a first transmission or a second transmission.

A network interface control message, like a downlink control information, DCI, associated with the transmission ① received from the transmitting entity 402 over the first link 406, and the DCI indicating whether the transmission is a first transmission or a second transmission.

A medium access control, MAC, header associated with the transmission ① received from the transmitting entity 402 over the first link 406, and the MAC header indicating whether the transmission is a first transmission 462 or a second transmission 464.

In accordance with embodiments, the resources on which the transmission and/or the associated control information is received comprise one or more of the following:

A relay sidelink control channel. Control information associated with the transmission ① from the transmitting entity 402 and received on resources of the relay sidelink control channel of the first link 406 between the transmitting entity 402 and the relay UE 400 indicate that an associated transmission, like transmission ① that may be transmitted over the physical sidelink shared channel, PSSCH, is a first transmission 462 that is to be relayed to the receiving entity. In other words, the SCI does not need additional information or fields indicating the nature of the transmission, rather, by sending the SCI in the relay sidelink control channel the relay UE 400 recognizes that associated transmission is the first transmission 462.

A relay bandwidth part, R-BWP, configured or pre-configured by the wireless communication system implementing the relayed transmission from the transmitting entity 402 to the receiving entity 404. Data and/or control information of the transmission may be received at the relay UE 400 on resources of the R-BWP. The relay UE 400 recognizes a transmission that is transmitted using the R-BWP to be a first transmission 462 to be relayed. Also, in case control information is received on the R-BWP, with the actual transmission being either received also on resources of the R-BWP or on resources of another pool defined in another BWP, the relay UE recognizes the transmission ① to be a first transmission 462.

A relay sidelink resource pool configured or pre-configured by the wireless communication system implementing the relayed transmission from the transmitting entity 402 to the receiving entity 404. Data and/or control information of the transmission may be received at the relay UE 400 on resources of the relay sidelink resource pool. The relay UE 400 recognizes a transmission that is transmitted using the relay sidelink resource pool to be a first transmission 462 to be relayed. Also, in case control information is received on the relay sidelink resource pool, with the actual transmission being either received also on resources of the relay sidelink resource pool or on resources of another pool, the relay UE recognizes the transmission ① to be a first transmission 462.

The first transmission 462 may be relayed over the second link 408 between the relay UE 400 and the receiving entity 404, as is indicated in FIG. 20A by the transmission ②.

Figure 20B:
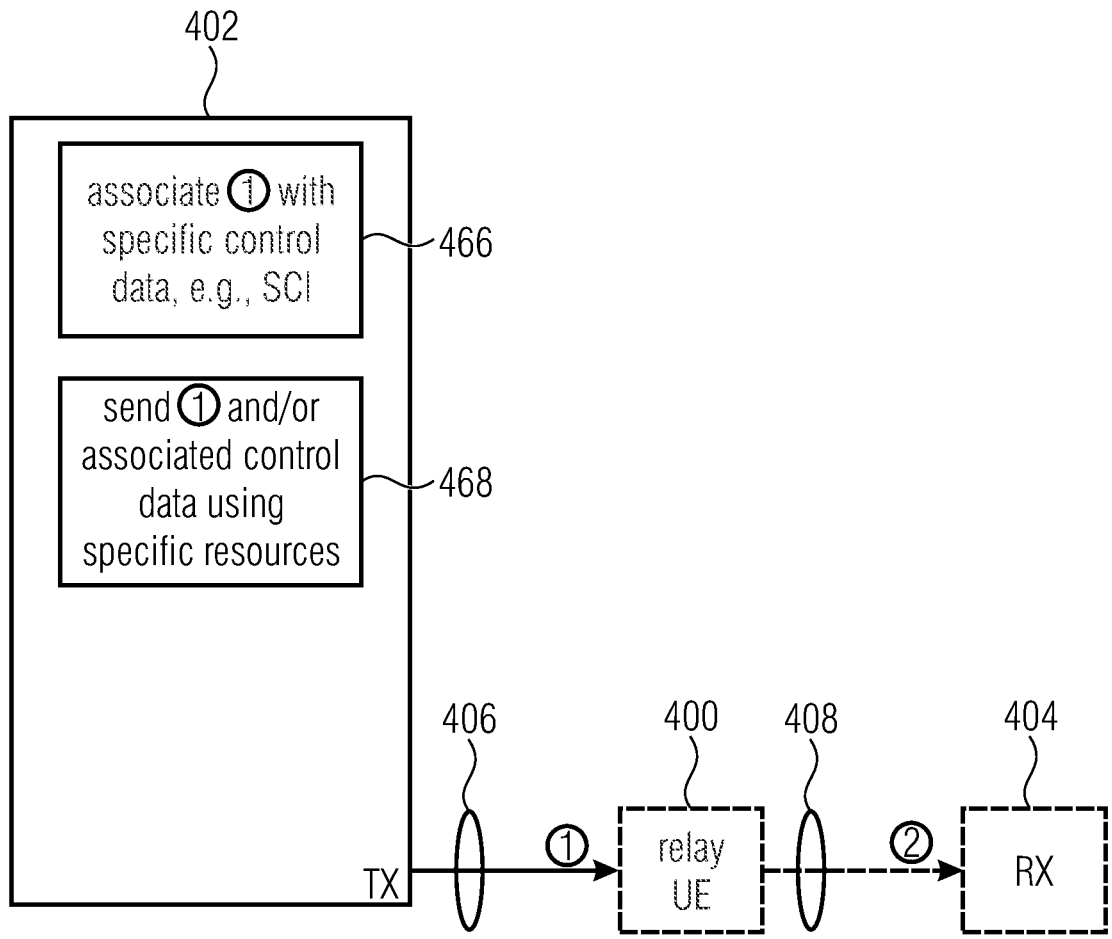
FIG. 20B illustrates an embodiment of a transmitting entity in accordance with the second aspect of the present invention that provides for a differentiation of traffic directed to a relay UE between traffic to be relayed and traffic intended for a relay UE.

Further embodiments of the second aspect of the present invention provide a transmitting entity associated with a transmission to be relayed to a receiving entity via a relay UE with specific information, or transmitting the transmission or associated control data on specific resources so as to allow a relay UE to recognize the transmission as a transmission to be relayed to the receiving entity. FIG. 20B illustrates an embodiment of a transmitting entity 402 of a wireless communication system or network, like the one described above with reference to FIG. 1. The transmitting entity 402 may be connected to a relay UE 400 over a first link 406 so that a transmission ① to a receiving entity 404 may be relayed by the relay UE 400 as a relay transmission ② over a second link 408 by which the relay UE 400 and the receiving entity 404 are connected with each other. The transmitting entity 402 indicates the transmission ① to the relay UE 400 to be a first transmission that is to be relayed to the receiving entity by associating the first transmission ① with specific control data, as indicated at 466, or by sending the data and/or the associated control data of transmission ① on specific resources as indicated at 468.

In accordance with other embodiments, the transmitting UE may associate a transmission ① with a sidelink control information, SCI, to be transmitted together with the transmission ① over the first link 406, which indicates whether the transmission is a first transmission to be relayed or a second transmission that is intended for the relay UE 400. In accordance with further embodiments, the transmitting UE may associate a transmission ① with a downlink control information, DCI, to be transmitted together with the transmission ① over the first link 406, which indicates whether the transmission is a first transmission to be relayed or a second transmission that is intended for the relay UE 400. In accordance with other embodiments, the transmitting entity may associate the transmission with a medium access control, MAC, header which indicates whether the transmission is a first transmission or a second transmission.

In accordance with other embodiments, when sending the data and/or the associated control data of transmission ① on specific resources, the transmitting entity 402 may send a sidelink control information, SCI, associated with the transmission ① in a relay sidelink control channel, thereby allowing the relay UE 400 to recognize the transmission ① as a first transmission to be relayed. In such an embodiment, no additional information explicitly indicating the nature of the transmission to be a first transmission or a second transmission may be needed. The SCI format used, for example a new second stage SCI format for relaying, may indicate to the relay UE 400 whether the transmission ① is a first transmission or a second transmission. In accordance with further embodiments, the transmitting UE 402 may use resources of a relay bandwidth part, R-BWP, for sending the transmission and/or the control information associated with the transmission, thereby allowing the relay UE 400 to recognize the transmission ① to be a first transmission to be relayed due to the fact that the transmission itself and/or the control information associated therewith is transmitted using the R-BWP. In accordance with yet further embodiments, the transmitting UE 402 may use resources of a relay sidelink resource pool for sending the transmission and/or the control information associated with the transmission, thereby allowing the relay UE 400 to recognize the transmission ① to be a first transmission to be relayed due to the fact that the transmission itself and/or the control information associated therewith is transmitted using the relay sidelink resource pool.

In accordance with embodiments, the transmitting entity 402 is a user device, UE, or a further relay UE, and the receiving entity 404 is a UE or is a further a relay UE. In this case, the first and second connections 406, 408 are direct interfaces, like a sidelink or PC5 connection or interface.

In accordance with other embodiments, the transmitting entity 402 is a UE, or a further relay UE, and the receiving entity 404 is a network entity, e.g., a radio access network, RAN, entity, like a gNB. In this case, the first connection 406 is a direct interface, like a sidelink connection, and the second connection 408 is an access network interface, like a 3GPP interface, a non-3GPP interface, a downlink, DL, interface, e.g. a Uu interface, or a WiFi interface.

In accordance with yet other embodiments, the transmitting entity 402 is a network entity, e.g., a radio access network, RAN, entity, like a gNB, and the receiving entity 404 is a UE or a further relay UE. In this case, the first connection 406 is an access network interface, like a 3GPP interface, a non-3GPP interface, a downlink, DL, interface, e.g. a Uu interface, or a WiFi interface, and the second connection 408 is a direct interface, like a sidelink connection.

The above mentioned embodiments of the second aspect of the present invention for differentiating the traffic received at a relay UE are now described in more detail.

Differentiation Based on the SCI

In accordance with embodiments, the relay UE 400 differentiates a transmission based on an SCI associated with the transmission. One or more additional parameters may be added to an existing SCI format, like a first stage SCI, or one or more additional parameters of an existing SCI format, like a second stage SCI, may be modified for indicating whether the transmission is a first transmission or a second transmission, and the UE, responsive to receiving the SCI, determines, using the one or more additional or modified parameters, the transmission to be a first transmission or to be a second transmission, and, in case of a first transmission, relays the transmission to the receiving entity. In accordance with further embodiments, a new or predefined SCI format, like a new or predefined second stage SCI may be implemented catering to relay transmissions. The relay UE 200, when receiving the new or predefined SCI recognizes that the associated transmission or packet is not intended for the relay UE 400 but is to be relayed onwards instead, for example to the receiving entity 404.

In accordance with embodiments, the SCI may include destination information indicating only the relay UE 400, for example a destination or layer 1, L1, ID of the relay UE. When receiving a SCI including only the destination information for the relay UE, the relay UE 400 determines the associated transmission to be a second transmission, i.e., a transmission 464 intended for the relay UE 400. In accordance with other embodiments, the additional parameters or the predefined second stage SCI may include a destination information indicating only the receiving entity, like a destination or L1 ID of the receiving entity 404, and the relay UE 400, responsive to receiving such information, determines that the transmission associated with the SCI is a first transmission 462 to be relayed to the receiving entity 404. In accordance with yet other embodiments, first destination information for the relay UE 400 and second destination information for the receiving entity 404, like respective L1 IDs, may be included, and the relay UE 400, responsive to receiving both IDs recognizes the associated transmission to be a first transmission 462 to be forwarded to the receiving entity. For example, the SCI may contain two or more destination ID fields—an intermediary destination ID indicating one or more relay UEs, and a final destination ID indicating the receiving entity. In accordance with further embodiments, combined destination information indicating both the UE and the receiving entity may be included, and the relay UE 400, responsive to receiving the combined ID recognizes the associated transmission to be a first transmission 462 to be forwarded to the receiving entity. For example, in case the transmitting entity knows the destination ID of the relay UE and the intended receiving entity, it may use the least significant bits of the two destination IDs, combine them and send the combined ID in the new or predefined SCI meant only for relaying. A combined ID, like the combined destination ID may be generated by the transmitting entity using the relay UE's destination ID and the receiving entity's destination ID, by one of the following:
- a formula is used to generate a combined destination UE ID, using the destination ID of the relay UE and the receiving entity,
- a configured or pre-configured lookup table is used that contains destination UE IDs that are mapped to a combination of relay's UE destination ID and receiving entity's destination ID,
- the least significant bit, LSB, of the relay UE's destination ID and the receiving entity's destination ID are combined.

The combined destination ID may be decoded by the relay UE to infer the relay UE's destination ID and the receiving entity's destination ID, using one or more of the following:
- a formula,
- a reverse lookup table,
- the LSBs of the relay UE's destination ID and the receiving entity's destination ID.

In accordance with embodiments, the SCI includes an indication, like a time indicator, by when the receiving entity is to receive the transmission. In case the timer exceeds a threshold or the UE determines that a time for the transmission to the receiving entity and for receiving an acknowledgment, ACK, from the receiving entity exceeds the threshold, the UE may drop the transmission or packet, or drop the transmission or packet and send a non-acknowledgment, NACK, to the transmitting entity.

An advantage of the above described embodiments may be that higher layers are not aware of the packet or transmission differentiation. For example, the physical, PHY, layer receives the transmission or the packet, and the relay UE may only decode the control information to determine whether the relay UE is the intended receiver for the corresponding transmission or data, thereby saving the relay UE from decoding the transmission or data packet and forwarding it to higher layers in case the relay UE determines that it is not the intended receiver for the transmission. In such a case, the relay UE may load the transmission or data into a buffer, together with the final destination ID as indicated in the received control information, as a new destination ID for a transmission to the receiving entity. While the above described embodiments may be similar to an amplify-and-forward solution, thereby achieving the desired coverage extension, an advantage over the simple amplify-and-forward solution is that piracy concerns are considered because the relay UE does not decode the relayed transmission or packet. In accordance with other embodiment, rather than only providing for an amplify and forward approach, the relay UE 400 may decode and forward the transmission, advantageously without processing the transmission or message content by higher layers.

In the embodiments described above including only the destination ID of the receiving entity, i.e., in the embodiments in which the destination ID of the relay UE is not included in the SCI, a further advantage may be that the relay UE may pick up any transmission or packet which is addressed to a UE, which is known at the relay UE and to which the relay UE may forward the transmission over a sidelink connection. In accordance with such embodiments, the transmitting entity 402 may simply use an ID of the receiving entity 404 that is included into the SCI and that the relay 400 forwards the transmission or message accordingly. For example, this may be used in case a separate relaying resource pool or relaying BWP or relaying control channel is provided, or the transmission or a message to be relayed is otherwise marked or labeled, indicating to the relay UE that the transmission or message is a first transmission to be relayed to the specified receiving entity 404. The relay 400 may then simply take the transmission or message from the pool and relay the transmission to the receiving entity.

In accordance with further embodiments, the SCI may include information indicating the transmitting entity 402, for example a L1 ID of the transmitting entity. In accordance with such embodiments, a list of transmitting entities may exist, for example a certain number of transmitting entities within the wireless communication network, and the relay UE is aware of the list and may determine, using the information indicating the transmitting entity in the control information, whether the transmitting entity is listed. In case the relay UE 400 determines the transmitting entity 402 to be in the list, the transmission is recognized by the relay UE as a first transmission 462 to be relayed to the receiving entity. On the other hand, in case the transmitting entity 402 is not in the list, the relay UE 400 considers the transmission associated with the SCI to be a second transmission that is intended for the relay UE and may be processed at the relay UE 400. For example, the configured list may contain a list of trusted devices, which are authenticated, e.g. via the core network, 5GC, or via a configured or preconfigured list stored on the relay UE 400. In accordance with other embodiments, the list may indicate transmitting entities, like UEs, that belong to a certain group of UEs, device types, UE categories, or UEs sending the data using a specific cast type.

In accordance with yet further embodiments of the second aspect of the present invention, the additional information may include a predefined destination information, like a predefined destination or layer 1, L1, ID which indicates that the transmission associated with the SCI is to be relayed. The predefined destination information may be provided by the relay UE or a receiving entity, and the transmitting entity may receive such predefined destination information which it uses in case a certain transmission is not intended for the relay UE but is to be forwarded to a receiving entity. In other words, the relay UE is aware of the receiving entities that are within the coverage of the relay UE, and provides the transmitting entity with the list or pool of the L1 UE IDs of such receiving entities. This list of UE IDs may contain explicit receiving entity IDs, as well as virtual UE IDs, which are UE IDs that map to the actual receiving entity ID. The transmitting entity then includes one of these UE IDs in the SCI, and the relay UE ascertains that the transmission is relayed to the indicated receiving entity. Dependent on the receiving entity, for which a transmission is intended, the transmitting entity may select a certain or specific destination information that is included in the SCI, and when received at the relay UE, the relay UE 400 maps the destination information received in the SCI to the actual destination information of the receiving entity for relaying the transmission associated with the SCI to the receiving entity. In other words, in accordance with such embodiments, a new destination ID is introduced which is used to reach the receiving entity through the relay. The transmitting entity uses this ID to address the receiving entity through the relay which, as mentioned above, maps the received new ID to the actual receiving entity ID for forwarding the transmission or message. In accordance with embodiments, the predefined destination information is one or more of:

a virtual destination ID, a destination ID from a configured or pre-defined list or pool of destination IDs.

In the case where the relay UE receives virtual destination IDs, the relay node may contain a mapping of virtual destination ID to one or more receiving entity destination IDs, e.g. in case the destination ID has changed. For example, this may be the case if a V2X UE wanted to send data to all RSUs. In this case, it may send the data to a virtual destination ID configured for RSUs, and the relay UE may forward the data to the "real" RSU ID or even to more than one RSU. Based on the virtual destination ID, the relay node may also change the cast type of the data to be transmitted, and map traffic received as unicast on a specific virtual destination ID to a groupcast or broadcast message.

In the case where the relay UE receives a destination ID belonging to a pool of destination IDs, the relay UE may have a subset or a pool of receiving entity destination IDs assigned from the network, corresponding to receiving entities that are managed by the relay UE. For example, the n LSBs of the destination IDs for the receiving entities may be assigned by the relay UE. Additionally a predefined value of the LSBs may be the relay ID itself. This may be seen in the sample pool of destination IDs, where the LSB of the relay UE is set to 000, the LSB of the receiving entity A is set to 001 and the LSB of the receiving entity B is set to 010.

| | |
|---|---|
| Relay UE: | XXXXXXXX 000 |
| Used for receiving entity A | XXXXXXXX 001 |
| Used for receiving entity B: | XXXXXXXX 010 |

Figure 21:
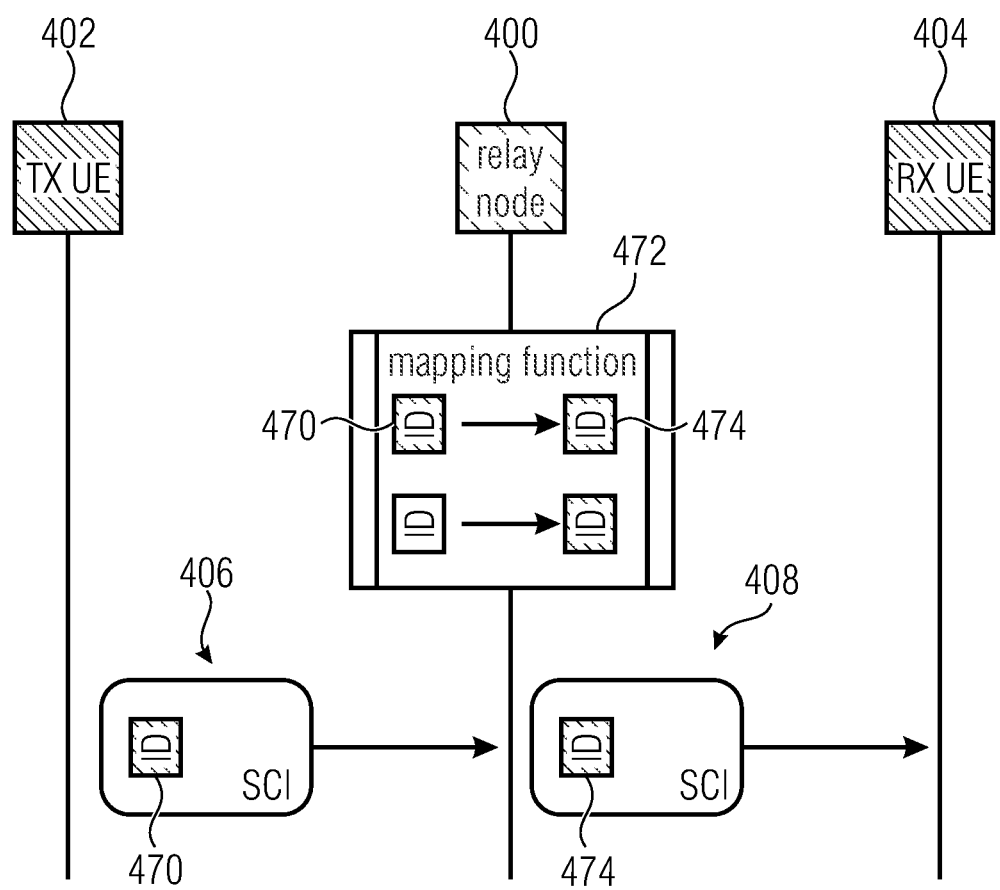
FIG. 21 illustrates an embodiment in accordance with the second aspect of the present invention employing a predefined or new destination ID that is mapped at the relay node.

FIG. 21 illustrates an embodiment employing the predefined or new destination ID that is mapped at the relay node. A transmitting entity 402 transmits a SCI over the first connection 406 to the relay UE 400, and the SCI includes the above mentioned new identification or destination information 470 signaling to the relay UE 400 that the transmission associated with the SCI on the first connection 406 is to be relayed to the receiving entity 404. The relay UE 400, as is indicated at 472, performs a mapping function for mapping the new ID 470 received in the SCI on first connection 406 to the actual RX ID 474 so as to allow relaying the transmission associated with the SCI on the first connection 406 over the second connection 408 to the receiving entity 404 using the actual RX ID 474. As is shown in FIG. 21, the relay UE 400 may include a mapping for various new IDs to actual RX IDs.

Figure 22:
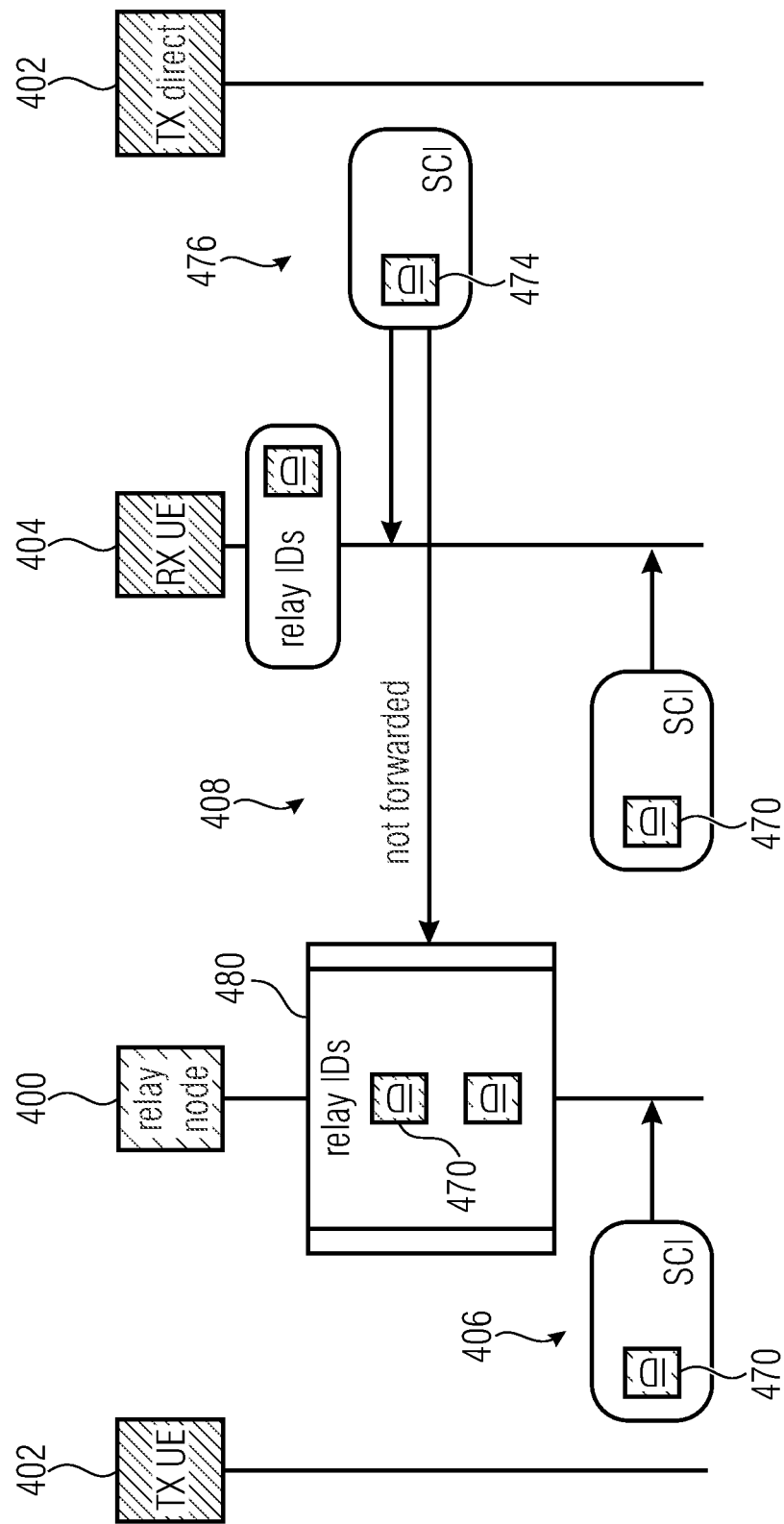
FIG. 22 illustrates an embodiment of a receiving entity in accordance with the second aspect of the present invention using a specific or new relay ID to be used by a transmitting entity in case a transmission to the receiving entity is to be transmitted via a relay node.

In accordance with other embodiments, rather than performing a mapping as described above, the receiving entity 404 may provide a certain or new destination ID to be used by a transmitting entity in case a direct transmission is not possible or not desired so that the transmission is to be relayed using the relay node. FIG. 22 illustrates an embodiment of a receiving entity using a specific or new relay ID to be used by a transmitting entity in case a transmission to the receiving entity is to be transmitted via a relay node. When considering a direct transmission from a transmitting entity 402 to the receiving entity 404, the actual or real RX ID 474 is included in the SCI over a direct sidelink connection 476 between the transmitting entity 402 and the receiving entity 404. As is further indicated, the actual RX ID 474 is not forwarded to the relay UE 400, rather, the receiving entity 404 includes the new or predefined relay ID 470 for one or more receiving entities. The relay IDs 470 may be stored at the relay UE as is indicated at 480. In case a transmission from the transmitting entity 402 is an indirect or relay transmission, rather than using the actual RX ID 474, the transmitting entity 402 employs the new relay ID 470 and, when receiving the ID 470, the relay node 400 recognizes it to be a relay ID stored at 480 and indicating the receiving entity 404. The relay UE 400 forwards the transmission associated with the ID 470 to the receiving entity over the second connection 408. An advantage of this embodiment is that the new ID 470 is introduced by the receiving entity and that the relay UE is aware of the new ID so that there is no need to change the ID at the relay node as in the embodiment described with reference to FIG. 21, rather the ID received at the relay node, and identified to be associated to the receiving entity 404, is used for forwarding the transmission from the transmission entity 402.

In accordance with yet further embodiments, the SCI may include a certain HARQ process ID, also referred to as HARQ process number. For example, the transmitting entity and the relay UE may negotiate a set of HARQ process IDs to be mapped to a certain destination ID associated to a certain receiving entity. In case the relay UE receives a transmission for one of the negotiated HARQ process IDs or HARQ process numbers, for example by setting a field in the SCI to the HARQ process ID and by sending a destination ID in the SCI of the relay UE, the relay UE recognizes the transmission associated with the SCI to be a first transmission to be relayed. The relay UE forwards the transmission to the associated destination ID of the receiving entity, that is mapped to the HARQ process ID or HARQ process number.

Differentiating the Traffic Based on a MAC Header

In accordance with embodiments, rather than introducing a new physical layer signaling for the differentiation of a transmission as being a first or a second transmission at the relay UE, the transmission may be indicated to be a first transmission or a second transmission in the MAC header that informs the relay UE that the transmission or data packet is to be relayed, i.e., that the relay UE is not the intended receiver, or that the transmission is intended for the relay UE. In accordance with embodiments, a dedicated logical relay channel, LRCH, may be provided that is used by the relay UE for relaying a transmission. For example, when receiving a MAC header including the indication that the transmission is a first transmission, i.e., the transmission is not intended for the relay UE, the UE may place the transmission into a buffer or queue of the LRCH for a transmission to the receiving entity. In accordance with such embodiments, the transmission or packet is treated as a new transmission from the relay UE to the receiving entity from a perspective of the physical layer.

Figure 23:
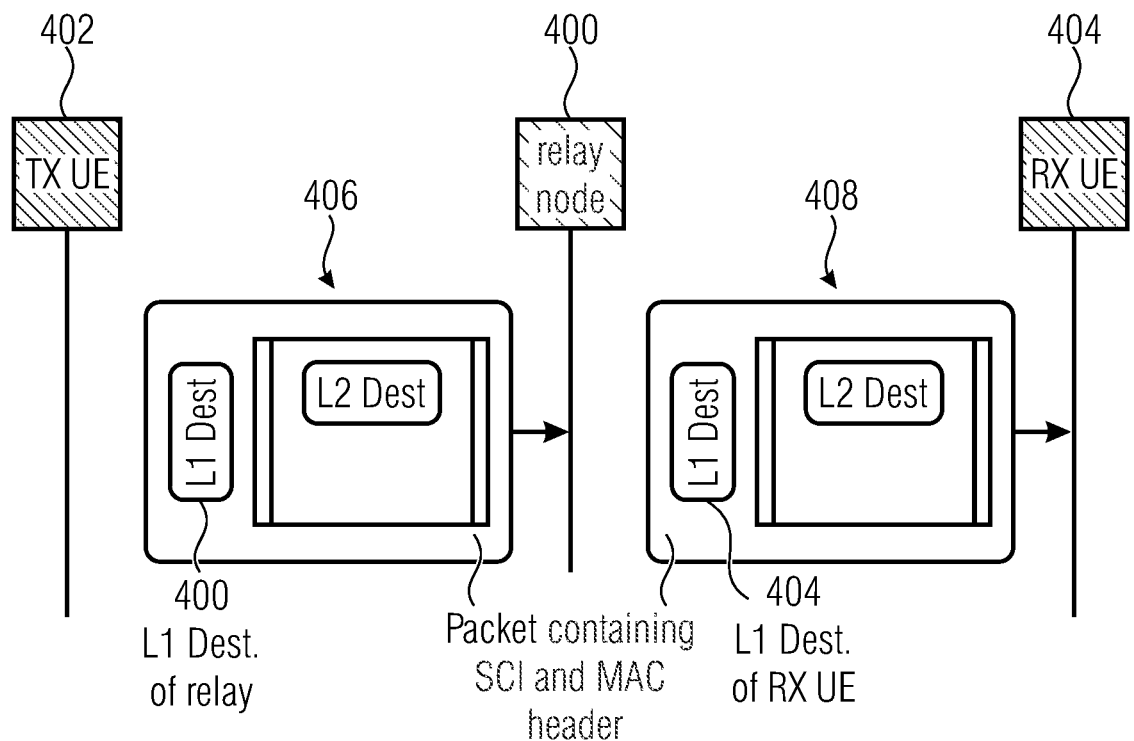
FIG. 23 illustrates an embodiment in accordance with the second aspect of the present invention employing a MAC header including the L1 destination ID of the relay UE and the L2 destination ID of the receiving entity for traffic differentiation.

In accordance with other embodiments employing the MAC header for the traffic differentiation, the layer 2, L2, identification of the destination or receiving entity may be used. In case the MAC header includes the layer 2 destination ID of the receiving entity, the relay UE is aware that the transmission associated with the MAC header is to be relayed to the given address or a destination. In accordance with further embodiments, the SCI received by the relay UE includes the destination information indicating only the relay UE 400, for example a destination or layer 1, L1, ID of the relay UE. FIG. 23 illustrates an embodiment employing an SCI including the L1 destination ID of the relay UE and a MAC header including the L2 destination ID of the receiving entity. A transmitting entity 402 transmits a packet with the SCI including the L1 destination of the relay UE 400 so that the relay UE 400 is aware on the physical layer that the transmission received from the transmitting UE is directed to the relay UE. At the same time, the MAC header 1 includes the L2 destination so that the relay UE 400 is aware that the transmission is to be forwarded to the receiving entity 404. The relay UE 400 transmits the packet to the RX UE 404 with the SCI including the L1 destination ID of the RX UE as well as with the MAC header 2 including the L2 destination ID of the RX UE.

In accordance with further embodiments, a new or predefined L2 ID may be used for the receiving entity in case a transmission from the transmitting entity 402 to the receiving entity is to be via a relay node. In such embodiments, the relay node 400 may perform a mapping of the L2 ID to the real L2 ID of the receiving entity in a way as described above with reference to FIG. 21.

In accordance with further embodiments, when signaling the differentiation of a transmission to be a first or a second transmission at the relay UE using the physical layer or the MAC layer, the control information includes a parameter that is decremented or incremented upon transmitting the message by the UE and the UE does not relay the message once a configured or pre-configured value is reached, like a time to live (decrement) or a maximum number of relay hops (increment). When the UE does not relay the message, a failure indication may be send to one or more of the transmitting entity, and/or the network, and/or the previous relay UE from which the packet was received.

Traffic Differentiation Based on a Dedicated Relay Control Channel

In accordance with embodiments of the second aspect of the present invention, a further physical layer solution for the relay UE to differentiate traffic between a first transmission and a second transmission is to use a separate control channel, referred to as the dedicated relay control channel. In accordance with embodiments, when the transmitting entity or the receiving entity are a UE or a relay UE, the control channel may be referred to as a relay PSCCH or R-PSCCH, relay physical sidelink control channel. At the relay UE, any transmission for which associated control information is received or transmitted in the R-PSCCH is recognized by the relay UE to be a first transmission that is to be relayed to a receiving entity. In accordance with embodiments, when the transmitting entity or the receiving entity are a network entity, the control channel may be referred to as a relay physical downlink control channel, R-PDCCH. Within the relay control channel R-PSCCH or R-PDCCH, the control information is transmitted within a relay Control Resource, R-CORESET, or a relay search space, R-SearchSpace.

In accordance with embodiments, the dedicated relay control channel may be implemented as an additional channel in a sidelink resource pool, like the NR V2X resource pool.

In accordance with other embodiments, when the transmitting entity or the receiving entity are a UE or a relay UE, an existing PSCCH may be reused for defining the dedicated relay control channel, for example, by defining a number of resource blocks, RBs, within the PSCCH to be used for control messages meant only for relaying, while the rest of the resource blocks within the PSCCH are used for normal transmissions. For example, an independent search space configuration, R-SearchSpace within a CORESET or R-CORESET, that is defined within the resources of the PSCCH, may be configured or preconfigured to be used only for relaying. In accordance with other embodiments, a certain periodicity across frequency may be defined in the PSCCH and at each periodicity all RBs in the PSCCH are used for relay control messages only. In other words, at those intervals of time specified by the periodicity, all of the RBs in the control channel are only used for control messages associated with relaying transmissions. At all other times or time slots all RBs of the PSCCH are used for normal transmissions only. In accordance with yet further embodiments, the periodicity may not be applied for all RBs in the PSSCH, but only a selected number of RBs may be provided for control messages associated only with relaying at intervals of time or time slots defined by the periodicity while all the remaining RBs are used for normal transmissions.

Thus, in accordance with embodiments using a dedicated relay control channel, data that is transmitted within a defined data channel, like the PSSCH, and that is associated with control data transmitted on the R-PSCCH is recognized by the relay UE as a transmission or data to be relayed to a receiving entity. In accordance with embodiments, the relay UE, responsive to obtaining the control data on the dedicated control channel, may refrain from decoding the transmission or the data packet. The relay UE may load the transmission or data into its buffer instead and transmit it to the desired receiving entity. In accordance with embodiments, the control message transmitted in the dedicated relay control channel may be a SCI as described in the embodiments above concerning the differentiation of the traffic based on the SCI. An advantage of using the dedicated relay control channel is that the relay UE is saved from decoding the transmission or packet and taking it to higher layers, thereby ensuring privacy and avoiding any potential privacy issues.

Figures 24A, 24B, 24C:
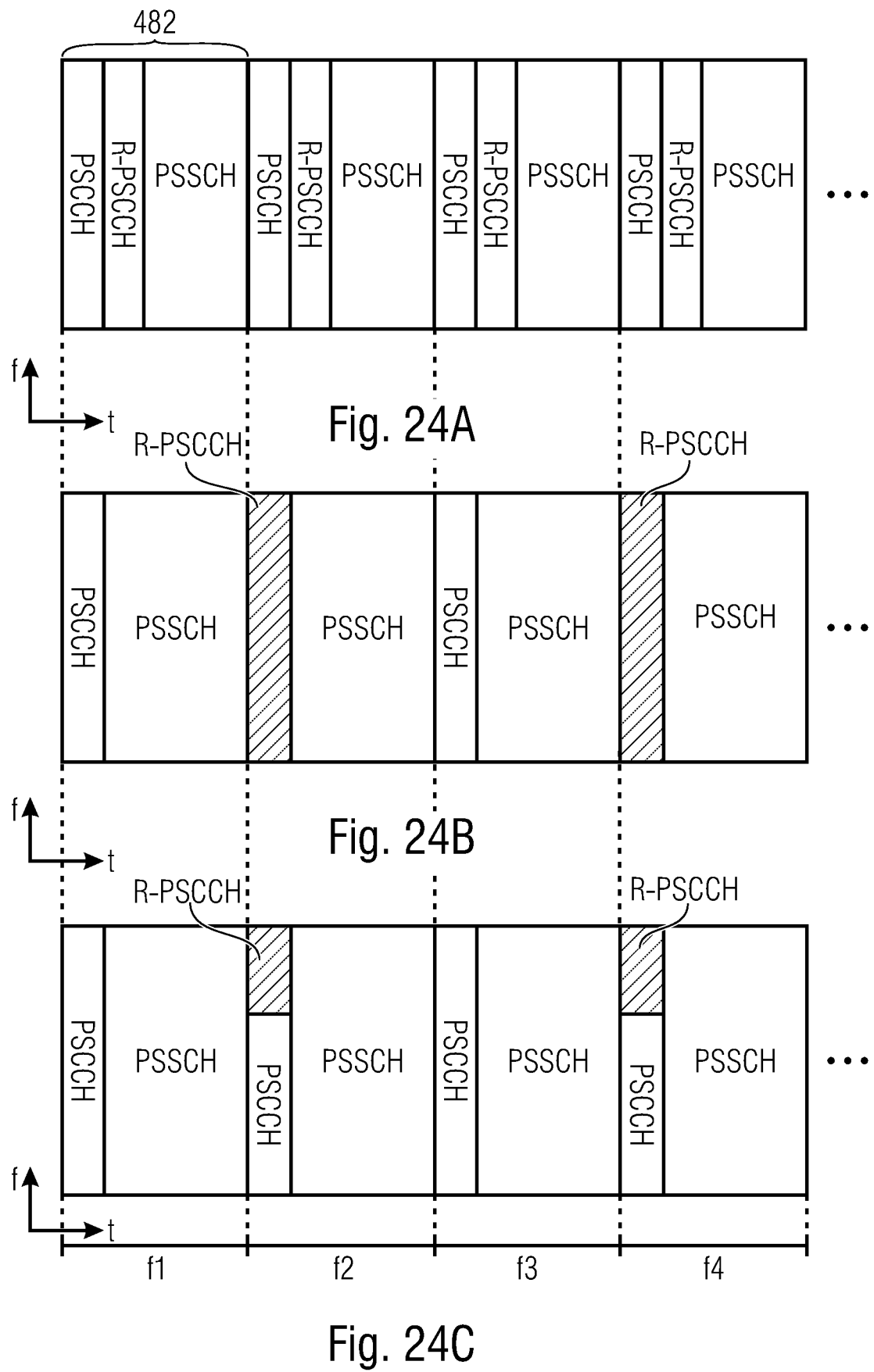
FIG. 24A-24C illustrate embodiments in accordance with the second aspect of the present invention implementing a dedicated relay control channel.

FIG. 24 illustrates embodiments for implementing the dedicated relay control channel as described above. FIG. 24A illustrates an embodiment implementing the relay control channel as an additional sub-channel in a sidelink resource pool, like an NR V2X resource pool. FIG. 24A illustrates a number of sidelink time slots or sub frames f1 to f4. Each frame includes resources 482 selected from the sidelink resource pool to be used for a sidelink transmission. Each sub frame may include a physical sidelink control channel, PSCCH and a physical sidelink shared channel PSSCH for transmitting the actual data associated with control information in the PSCCH. In accordance with embodiments, the relay control channel may be defined in one or more of the frames f1 to f4 as an additional sub-channel, as indicated in FIG. 24A by the additional channel R-PSCCH.

FIG. 24B illustrates an embodiment in which the PSCCH is used as an R-PSCCH with a certain periodicity. In the embodiment of FIG. 24B, the periodicity is assumed to be two frames so that in the first and third frames, all resource blocks of the PSCCH are used for normal control transmissions, while in the second and fourth frames, all resource blocks of the PSCCH are used for relay related transmissions only.

FIG. 24C illustrates an embodiment in accordance with which only a part of the resource blocks of the PSCCH are used for relay related control information only with a certain periodicity. Similar as in FIG. 24B, a periodicity of two frames is assumed so that in frames f1 and f3 all resource blocks of the PSCCH are used for normal control transmissions while in frames f2 and f4 a part of the resource blocks of the PSCCH are used for relay related control information only.

It is noted that the above mentioned periodicity of two is just an example and that any other periodicity may be selected. Also, the embodiments of FIG. 24B and FIG. 24C may be combined so that, for example, in FIG. 24B, in frame f4, only a part of the resource blocks is used for the relay related control information while in frame f2 all of the resource blocks of the PSCCH are used for the relay related control information.

Differentiation of the Traffic by a Dedicated Bandwidth Part

In accordance with embodiments of the second aspect of the present invention, a further physical layer solution for the relay UE to differentiate traffic between a first transmission and a second transmission is to use a separate bandwidth part, referred to as the dedicated relay bandwidth part, R-BWP, that is used exclusively for relay-related transmission and reception of control and/or data. Responsive to receiving a transmission and/or control information associated with the transmission in the R-BWP, the UE determines the transmission to be a first transmission. In accordance with embodiments, the R-BWP may also be used for sending a feedback for a relayed transmission.

The R-BWP may contain resource pools, RPs, and the RPs may contain the control and data channels. Conventionally, there is only one active BWP in which all the configured RPs are defined and where all Uu and sidelink communications take place. In accordance with the second aspect of the present invention, a separate BWP meant only for relays is introduced.

Differentiation of the Traffic by a Dedicated Relay Resource Pool

In accordance with further embodiments, a separate resource pool is employed that is to be used exclusively for the relay related transmission and/or reception of the control information and/or the associated data. Thus, whenever a relay UE receives a transmission, i.e., control information and/or the associated data, on resources of the dedicated resource pool, the relay UE recognizes the transmission to be a first transmission that needs to be relayed to the receiving entity. In accordance with embodiments, the R-RP may also be used for sending a feedback for a relayed transmission.

In accordance with embodiments, the relay resource pool, R-RP, may be defined within a bandwidth part, BWP, for example, as a transmit pool, along with the other resource pools defined for Release 16, like the RX pool, the TX pool for Mode 1 transmissions, the TX pool for Mode 2 transmissions and the TX exceptional pool for handover scenarios. For example, the additional relay resource pool, sl-TxPoolRelays-r17, may be defined using the SL-BWP-pool config information element as illustrated in FIG. 25 at 484. In accordance with embodiments, the R-RP includes a first R-RP configured for UEs operating in Mode 1 and second R-RP configured for UEs operating in Mode 2. This allows a network entity, like a gNB, acting as transmitting entity to control the resource allocation aspects of the Mode 1 R-RP. In accordance with other embodiments, the R-RP is configured for UEs operating in Mode 1 and for UEs operating in Mode 2, and the relay UEs, when operating in Mode 1, are expected to provide periodic congestion reports to the network entity, like a gNB, so that the gNB is aware of the available resources within the R-RP. For example, when a common R-RP may be used, the gNB provides resource allocation support like in a normal RP to the relay UE, but needs congestion reports for being informed about the resources being used by Mode 2 UEs. In accordance with further embodiments, the R-RP is defined within the BWP and includes one or more resource pools, like one or more transmit or receive pools, one or more transmit relay resource pools, TX R-RPs, one or more receive relay resource pools, RX R-RPs, or one or more R-RPs where both TX and RX occur.

In case a transmitting entity intends to perform a transmission or to transmit a packet that needs to be relayed to a receiving entity via a relay UE, the transmitting entity may perform the transmission using resources of the R-RP, for example the control and/or data packets may be transmitted in the R-RP. The relay UE receives the transmission on the R-RP, and may further transmit this to the receiving entity using a normal resource pool. In the case of multi-hop relaying, the relay UE transmits on the R-RP to the further relay UE.

In accordance with further embodiments, the definition of the R-RP may include a link quality threshold. The link quality threshold indicates a quality of a link between the transmitting entity and the receiving entity, and relaying is to be employed only once the quality on the link between the transmitting entity and the receiving entity is below the threshold and only then the transmitting entity may use the R-RP for transmissions which, when received by the relay UE, are relayed to the receiving entity. In the case of multi-hop relaying, the link quality threshold may indicate a quality of a link between the relay UE and the receiving entity, and the relay UE transmits in the R-RP only once the quality on the link between the relay UE and the receiving entity is below the threshold and only then the relay UE may use the R-RP for transmissions which, when received by the further relay UE, are relayed to the receiving entity. In other words, when the link quality goes bad, the direct communication is switched to a relay based communication. For example, in case of Mode 1, when a normal transmitting entity has a direct Uu link with a gNB, and when the link quality deteriorates below the predefined threshold, the transmitting entity decides to use a relay UE, also referred to as a UE-to-network relay system. When the transmitting entity decides to do so, it transmits using resources in the R-RP, and the relay UE receives and then forward the transmission to the gNB via normal Uu. In the case of Mode 2, when a UE has a direct PC5 link with another UE, and when the link quality deteriorates below the pre-defined threshold, the UE decides to use a relay UE, also referred to as a UE-to-UE relay system. When it decides to do so, the UE transmits on resources of the R-RP, the relay UE receives on the R-RP and then forward the transmission to the other UE using a normal RP, like in normal SL communications. Besides defining the additional relay resource pool that, in accordance with embodiments, may be used once the link quality between the transmitting entity and the receiving entity is below the threshold, the remaining characteristics of the resource pool that define a resource pool, such as the number of sub channels, bitmap indications and numerology, remain the same with the control, data and feedback channels being retained.

In accordance with embodiments, the resource pool configurations may be provided using system information blocks, SIBs, or via RRC configurations, transmitted by a RAN entity, like a base station, and all UEs in the vicinity of the base station may be aware of at least the following three main aspects, namely that the base station supports relaying, the threshold below which a transmitting entity may use the relay resource pool, i.e., may switch to relay-based transmissions, and the resources making up the R-RP. In accordance with other embodiments, the resource pool configurations may be provided using control signaling within one or more control channels, e.g., the PBCH, PDCCH or PDSCH.

In accordance with embodiments, the transmitting entity may use relaying or direct communication with the receiving entity dependent on one or more of:
- a link quality between the transmitting entity and the receiving entity,
- a congestion status of the normal sidelink resource pool, e.g., when the congestion status of the normal sidelink resource pool is above a certain threshold, the transmitting entity may choose to transmit on the R-RP, or
- a distance between the transmitting entity and the receiving entity, measured as actual distance or via zone IDs, e.g., when the distance is beyond the minimum communication range, the transmitting entity may choose to transmit on the R-RP.

In accordance with embodiments, when the transmitting entity is transmitting on the R-RP, it may or may not select a destination relay UE in particular. For example, in case the packet is to be broadcasted and the intention of the transmission is coverage extension, any relay node or relay UE in the network that receives the transmission on the R-RP may relay the transmission. In accordance with other embodiments, in case the transmission is a group cast or unicast transmission, the transmitting entity may send the transmission to any relay UE on the R-RP, that are expected to transmit to the intended receiving entity. In this case, the transmitting entity does not have the burden to select a relay UE, rather any relay UE that receives this transmission that reaches the receiving entity may carry out the relay operation for the transmitting entity. This means there is no change to the current working of SL, except for the fact that the transmitting entity has to transmit in the R-RP. In accordance with other embodiments, in case the transmission is a group cast or unicast transmission, the transmitting entity may send the transmission to one or more certain relay UEs on the R-RP that are expected to transmit to the intended receiving entity. The transmitting entity may select the one or more certain relay UEs based on one or more of their ability to transmit with power above a configured or pre-configured power threshold, e.g. in high power to cover larger areas, or their battery status being above a configured or pre-configured threshold, or whether they support a certain service, such as Public Protection and Disaster Relief (PPDR) services or vehicular safety services.

The just described embodiments are advantageous because the transmitting entity does not need to select a particular relay UE. In case the transmitting entity needs to select a specific relay UE, it may do so based on known criteria, like a location of the relay UE, a moving speed of the relay UE, supported services of the relay UE, a configuration of the relay UE (e.g. supported bandwidth, transmit power, antenna configuration), a security level of a relay UE (e.g. the transmitting entity only uses relay UE if it is certified for a certain trusted service or service flow). In accordance with embodiments, the information whether a particular relay UE is selected or not is conveyed implicitly by the destination ID parameter in the SCI. For example, in case the destination ID parameter in the SCI is not specified, for example in case it is left blank, set to a null value or set to a default value, this indicates to the relay UE that the transmitting entity has not selected any specific relay UE. Hence, the relay UE that receives the transmission is expected to decode the transmission and relay it to the intended receiving entity that is defined by the final destination ID in the SCI. On the other hand, in case the destination ID is explicitly specified in the SCI, only the relay UE whose ID is specified is expected to decode the packet and relay it onwards to the receiving entity specified by the final destination ID parameter in the SCI.

In accordance with the above described embodiments using the relay resource pool, the relay UE is aware that all transmissions it receives in the relay resource pool are meant to be forwarded or relayed to another UE, and the details to which of the UEs the transmission is to be forwarded may be provided in a SCI, for example using a SCI as described in the above embodiments referring to the traffic differentiation based on a received SCI.

In accordance with further embodiments, when using the R-RP, also a feedback channel may be defined. For example, the R-RP configuration may further include a periodicity of feedback channel resources, like the Physical Sidelink Feedback Channel, PSFCH, resources, in terms of a number of time slots. In case no feedback channel is provided, the periodicity may be set to a zero value. A transmitting entity that intends to transmit a unicast or groupcast transmission with feedback enabled may use a R-RP with PSFCH enabled, while a transmitting entity that transmits a unicast or groupcast transmission with feedback disabled, or a broadcast transmission, may use a R-RP with PSFCH disabled. Resources in the PSFCH may be used for a given transmission in the PSSCH, and in order to maintain this association, in accordance with embodiments, the relay UE may use the PSFCH as follows:
- In case the transmission from the transmitting entity to the relay UE failed, the relay UE may send a NACK to the transmitting entity requesting a retransmission.
- In case the transmission from the transmitting entity to the relay UE was successful,
  - send an ACK only after the UE received a successful feedback from the receiving entity so that the relay UE may provide the transmitting entity with an overall HARQ feedback of the transmission from the transmitting entity to the receiving entity, for example in a way as described above with reference to the first aspect of the present invention. In other words, any of the above embodiments describing the overall feedback provided in accordance with the first aspect of the present invention may also be employed in the embodiment using a dedicated relay resource pool, or
  - send a $1^{st}$ ACK after the UE received the transmission from the transmitting entity and a $2^{nd}$ ACK after the UE received a successful feedback from the receiving entity so that the UE may provide the transmitting entity with an overall HARQ feedback of the transmission from the transmitting entity to the receiving entity, for example in a way as described above with reference to the first aspect of the present invention.

In accordance with further embodiments, the feedback option may be disabled, for example in case a transmission is a broadcast transmission or a packet is to be broadcasted. In this case, the relay UE is not selected by the transmitting entity, and the feedback option is disabled as otherwise the transmitting entity may receive multiple feedbacks from different relay UEs for the same packet. Since multiple relay UEs may be broadcasting the transmission, the transmitting entity may receive multiple feedbacks for the same transmission, which is not needed since the objective of broadcast transmissions is to reach as many UEs as possible, for coverage extension. Sending feedback by each relay entity may unnecessarily take up feedback resources, e.g. frequency resources, or processing resources at the relay UE and the transmitting entity.

In accordance with further embodiments employing the dedicated relay resource pool, the relay UE, other than described above, may decode the transmission or the packet, for example, for performing a higher layer optimization. The relay UE may choose to decode the packet if the receiving entity's destination ID is contained in the MAC header. It may also change the cast type of a transmission, for example, when the transmission from the transmitting entity to the relay UE was a broadcast transmission, and the transmission from the relay UE to the receiving entity has to be a unicast or groupcast transmission. The relay UE then transmits the packet to the intended receiving entity, not on the relay resource pool but on a normal transmit pool, thereby enabling the receiving entity to recognize the transmission to be intended for the receiving entity and not to be relayed. However, in case of a multi-hop relay system, the first relay transmits the transmission to the other relay UEs using the R-RP so that they are aware that the transmission is to be further relayed.

In the embodiments described above which employ a dedicated relay sidelink control channel, a R-BWP or a R-RP, the dedicated relay sidelink control channel, the R-BWP and/or the R-RP may be in a spectrum or frequency range different from the spectrum or frequency range in which a second transmission is transmitted and/or received. Defining a relay only control channel, a R-RP or a R-BWP decouples resources used for macrocells spanned by gNBs, and resources used for relaying, and thus reduce interference between both type of cells. This enables the relay UE to search and receive relay related transmissions only in the defined frequency range. It does not have to search the whole set of frequencies in the SL control, the R-RP or the R-BWP for a mixture of relay and non-relay related control information. If the relay UE wants to save power, it may decide not to receive in this frequency, effectively switching off as a relay UE. Furthermore, since the relay node or relay UE is in general closer to the remote UE, i.e. the pathloss is less, a higher carrier frequency may be chosen for the relay link. This may increase the possibility of frequency reuse, which may also release resources in other cells, e.g. macrocells.

In accordance with further embodiments of the second aspect of the present invention, when the relay UE receives control information associated with a transmission,
in case the destination ID parameter indicating the UE is left blank, is set to a null value or is set to a default value, and the destination ID parameter indicating the receiving entity is specified, or,
in the case of a combined destination information indicating both the UE and the receiving entity, where the destination ID parameter indicating the UE is left blank, is set to a null value or is set to a default value, and the destination ID parameter indicating the receiving entity is specified,
the UE is to receive the transmission in a broadcast manner, and is to send the transmission to the intended receiving entity or entities in a unicast or groupcast manner.

In other words, when the relay UE receives in the control information only the RX UE's destination ID, but no relay specific destination ID, the UE receives in a broadcast manner, but transmits in a unicast or groupcast manner, due to the specific RX UE ID or specific group ID.

In accordance with yet further embodiments of the second aspect of the present invention, when the relay UE receives control information, associated with a transmission,
in case the destination ID parameter indicating the UE is specified, and the destination ID parameter indicating the receiving entity is specified, or,
in the case of a combined destination information indicating both the UE and the receiving entity, where the destination ID parameter indicating the UE is specified, and the destination ID parameter indicating the receiving entity is specified,
the UE is to receive the transmission in a groupcast or unicast manner, and is to send the transmission to the intended receiving entity or entities in a unicast or groupcast manner.

In other words, when the relay UE receives in the control information the RX UE's destination ID as well as relay specific destination ID, the UE receives in a unicast or groupcast manner (depending on the relay destination ID being a specific relay UE ID or specific relay group ID), but transmits in a unicast or groupcast manner, due to the specific RX UE ID or specific group ID.

General

Although the respective aspects and embodiments of the inventive approach have been described separately, it is noted that each of the aspects/embodiments may be implemented independent from the other, or some or all of the aspects/embodiments may be combined. Moreover, the subsequently described embodiments may be used for each of the aspects/embodiments described so far.

Multi-Hop Relays

In the embodiments described above, the end-to-end communication between the transmitting entity and the receiving entity is via a single relay that forwards the feedback from the receiving entity and/or that differentiates the traffic as described above. However, the present invention is not limited to such embodiments, rather, in accordance with further embodiments, the end-to-end communication between the transmitting entity and the receiving entity may be via a plurality of relays, also referred to as a set of relay UEs or as a chain of relay UEs.

Figure 26:
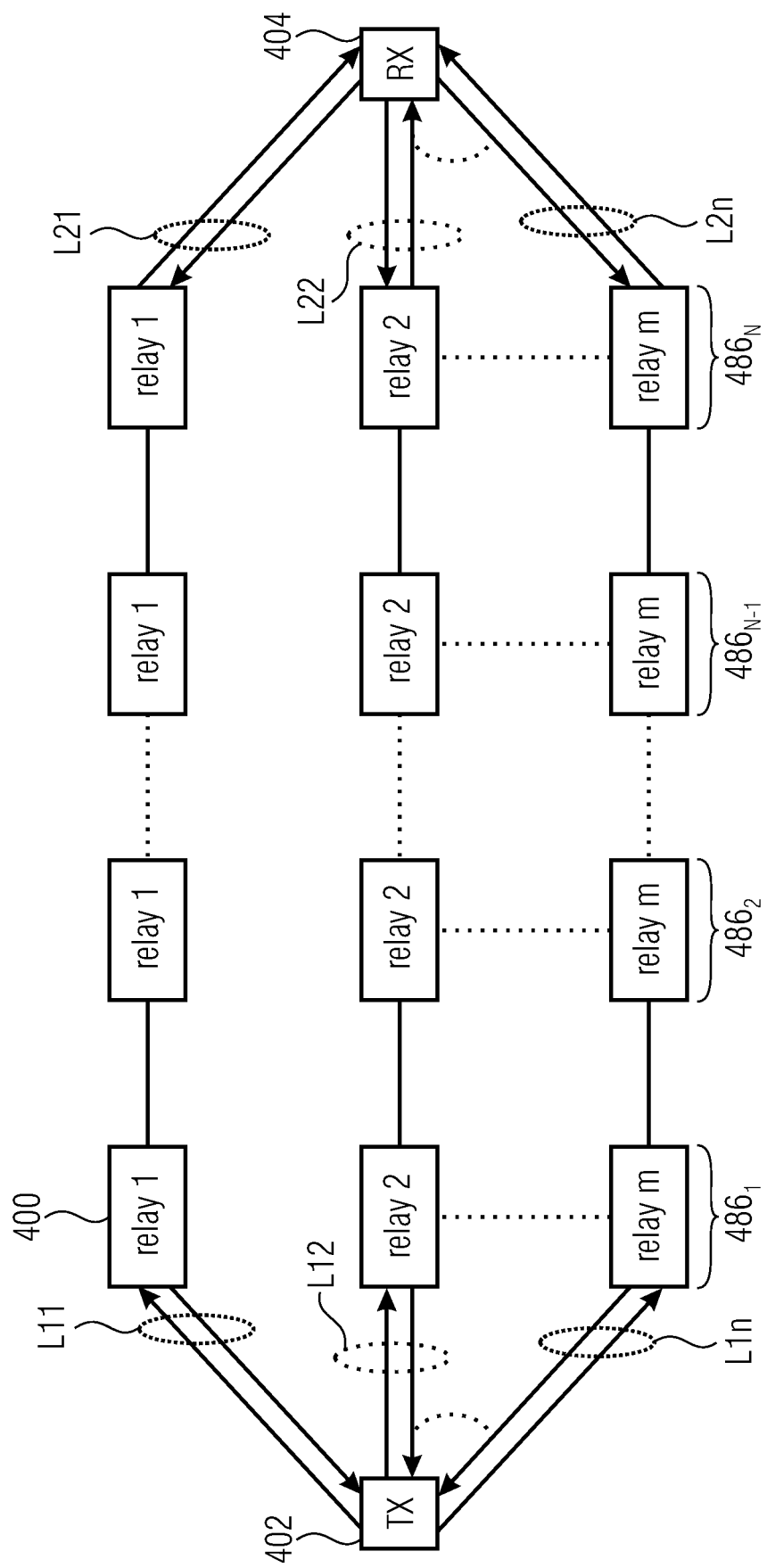
FIG. 26 illustrates an embodiment of the present invention using N relays for a communication between a transmitting entity and a receiving entity.
Figure 27:
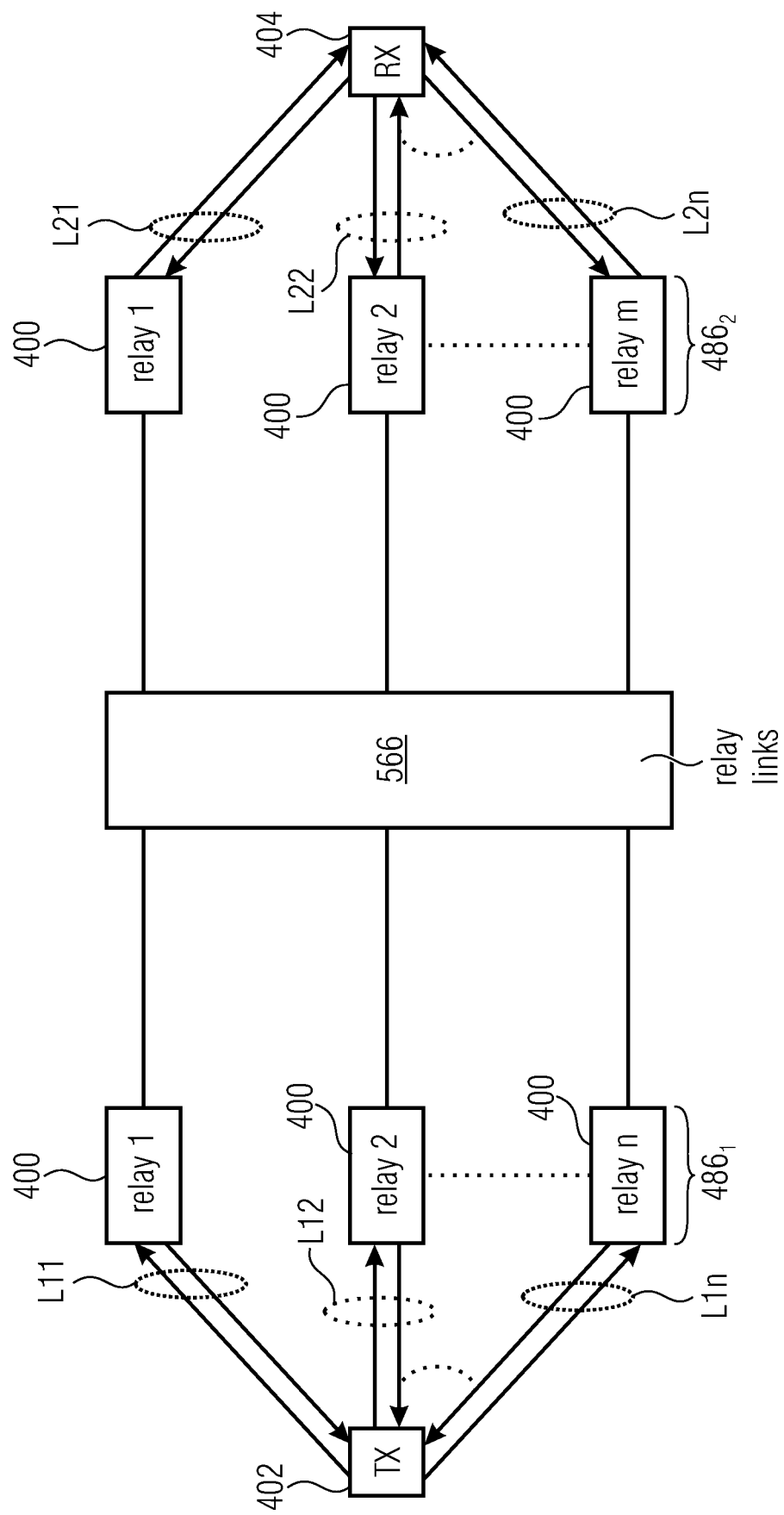
FIG. 27 illustrates an embodiment of the present invention employing N=2 relay layers for the end-to-end communication between a transmitting entity and a receiving entity.

FIG. 26 illustrates an embodiment in accordance with which the communication between the transmitting entity 402 and the receiving entity 404 is using N relays 400, N≥2. Each relay layer includes a plurality of relay devices 1 to m, like relay UEs. The respective relay layers $486_1$ to $486_N$ may include the same number of relay UEs or some or all of the relay layers $486_1$ to $486_N$ may include different numbers of relay UEs. The receiving entity 404 may connect to the relays of the first relay layer $486_1$, and the transmitting entity 402 and may connect to the relays of the relay layer $486_N$. FIG. 27 illustrates an embodiment employing N=2 relay layers for the end-to-end communication between the transmitting entity 402 and the receiving entity 404. The first relay layer $486_1$ may include n UE relays 400. The transmitting entity 402 may be connectable to a second relay layer $486_2$, and the second relay layer $486_2$ may include m UE relays 400. In accordance with embodiments, the respective relay layers $486_1$, $486_2$ may have the same number of relays, n=m. In accordance with other embodiments, the number of relays in the respective relay layers $486_1$, $486_2$ may be different, i.e., n≠m. The respective relays in the different relay layers $486_1$, $486_2$ may connect with each other, as is indicated, schematically, at 566. Some or all of the relays in the first relay layer $486_1$ may connect with some or all of the relays in the second relay layer $486_2$. The respective relays in the layers forward the feedback from the receiving entity 404 and/or that differentiate the traffic as described above in detail with reference to the first and second aspects of the present invention.

Embodiments of the present invention have been described in detail above, and the respective embodiments and aspects may be implemented individually or two or more of the embodiments or aspects may be implemented in combination. In other words, any of the above described embodiments of the first aspect concerning the provision of the overall feedback from the receiving entity to the transmitting entity via the one or more relays may be combined with any of the above described embodiments of the second aspect concerning the differentiation of the traffic at the one or more relays.

General

In accordance with embodiments, the wireless communication system may include a terrestrial network, or a non-terrestrial network, or networks or segments of networks using as a receiver an airborne vehicle or a spaceborne vehicle, or a combination thereof.

In accordance with embodiments of the present invention, a user device comprises one or more of the following: a power-limited UE, or a hand-held UE, like a UE used by a pedestrian, and referred to as a Vulnerable Road User, VRU, or a Pedestrian UE, P-UE, or an on-body or hand-held UE used by public safety personnel and first responders, and referred to as Public safety UE, PS-UE, or an IoT UE, e.g., a sensor, an actuator or a UE provided in a campus network to carry out repetitive tasks and needing input from a gateway node at periodic intervals, a mobile terminal, or a stationary terminal, or a cellular IoT-UE, or a vehicular UE, or a vehicular group leader (GL) UE, or a sidelink relay, or an IoT or narrowband IoT, NB-IoT, device, or wearable device, like a smartwatch, or a fitness tracker, or smart glasses, or a ground based vehicle, or an aerial vehicle, or a drone, or a moving base station, or road side unit (RSU), or a building, or any other item or device provided with network connectivity enabling the item/device to communicate using the wireless communication network, e.g., a sensor or actuator, or any other item or device provided with network connectivity enabling the item/device to communicate using a sidelink the wireless communication network, e.g., a sensor or actuator, or any sidelink capable network entity.

In accordance with embodiments of the present invention, a network entity comprises one or more of the following: a macro cell base station, or a small cell base station, or a central unit of a base station, or a distributed unit of a base station, or a road side unit (RSU), or a remote radio head, or an AMF, or an MME, or an SMF, or a core network entity, or mobile edge computing (MEC) entity, or a network slice as in the NR or 5G core context, or any transmission/reception point, TRP, enabling an item or a device to communicate using the wireless communication network, the item or device being provided with network connectivity to communicate using the wireless communication network.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 28 illustrates an example of a computer system 500. The units or modules as well as the steps of the methods performed by these units may execute on one or more computer systems 500. The computer system 500 includes one or more processors 502, like a special purpose or a general-purpose digital signal processor. The processor 502 is connected to a communication infrastructure 504, like a bus or a network. The computer system 500 includes a main memory 506, e.g., a random-access memory, RAM, and a secondary memory 508, e.g., a hard disk drive and/or a removable storage drive. The secondary memory 508 may allow computer programs or other instructions to be loaded into the computer system 500. The computer system 500 may further include a communications interface 510 to allow software and data to be transferred between computer system 500 and external devices. The communication may be in the from electronic, electromagnetic, optical, or other signals capable of being handled by a communications interface. The communication may use a wire or a cable, fiber optics, a phone line, a cellular phone link, an RF link and other communications channels 512.

The terms "computer program medium" and "computer readable medium" are used to generally refer to tangible storage media such as removable storage units or a hard disk installed in a hard disk drive. These computer program products are means for providing software to the computer system 500. The computer programs, also referred to as computer control logic, are stored in main memory 506 and/or secondary memory 508. Computer programs may also be received via the communications interface 510. The computer program, when executed, enables the computer system 500 to implement the present invention. In particular, the computer program, when executed, enables processor 502 to implement the processes of the present invention, such as any of the methods described herein. Accordingly, such a computer program may represent a controller of the computer system 500. Where the disclosure is implemented using software, the software may be stored in a computer program product and loaded into computer system 500 using a removable storage drive, an interface, like communications interface 510.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate or are capable of cooperating with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier or a digital storage medium, or a computer-readable medium comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device, for example a field programmable gate array, may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A user device, UE, for a wireless communication network,
wherein the UE is to act as a layer 2, L2, relay UE so as to provide functionality to support connectivity between a transmitting entity and one or more receiving entities of the wireless communication network,
wherein the UE is to differentiate a transmission, which is received from the transmitting entity, between a first transmission to be relayed to a receiving entity and a second transmission that is intended for the UE, and
wherein the UE is to differentiate the received transmission by L2 control information associated with the transmission.

2. The user device, UE, of claim 1, wherein the L2 control information associated with the transmission indicates whether the transmission is the first transmission or the second transmission.

3. The user device, UE, of claim 1, wherein resources on which the transmission and/or the L2 control information is received comprise:
a relay sidelink control channel, wherein the L2 control information associated with the transmission and received on resources of the relay sidelink control channel indicate that the transmission is the first transmission,
a relay bandwidth part, R-BWP, wherein receiving the transmission and/or the L2 control information associated with the transmission on resources of the R-BWP indicates that the transmission is the first transmission, or
a relay sidelink resource pool, wherein receiving the transmission and/or the L2 control information associated with the transmission on resources of a relay sidelink resource pool indicates that the transmission is the first transmission.

4. The user device, UE, of claim 1, wherein the UE is to receive the transmission from the transmitting entity over a direct interface, like a sidelink, or over an access network interface, like a 3GPP or non-3GPP interface.

5. The user device, UE, of claim 1, wherein
the transmitting entity comprises a transmitting UE or a relay UE of the transmitting UE, and the receiving entity comprises a receiving UE or a relay UE of the receiving UE,
the transmitting entity comprises the transmitting UE or the relay UE of the transmitting UE, and the receiving entity comprises a network entity, like a radio access network, RAN, entity, or
the transmitting entity comprises the network entity, like the RAN entity, and the receiving entity comprises the receiving UE or the relay UE of the receiving UE.

6. The user device, UE, of claim 1, wherein, in case the UE is to differentiate the received transmission using the L2 control information, the L2 control information comprises an indication that informs the UE that the transmission is the first transmission and that the UE is not an intended receiver.

7. The user device, UE, of claim 6, comprising a logical relay channel, LRCH, and
wherein, responsive to receiving the L2 control information comprising an indication that the transmission is the first transmission and is not intended for the UE, the UE is to place the transmission into a buffer or a queue of the LRCH for a transmission to the receiving entity.

8. The user device, UE, of claim 6, wherein the L2 control information comprises destination information of the receiving entity, like the destination or the layer 2, L2, ID of the receiving entity, and
wherein, responsive to the destination information of the receiving entity, the UE is to determine the transmission to be the first transmission.

9. The user device, UE, of claim 6, wherein the L2 control information comprises a predefined destination information, like predefined destination or the layer 2, L2, ID, the predefined destination information indicating that the transmission associated with the L2 control information is to be relayed, and
responsive to receiving the predefined destination information, the UE is to map the predefined destination information to an actual destination information of the receiving entity, like the destination or the layer 2, L2, ID of the receiving entity, and to relay the transmission to the receiving entity.

10. The user device, UE, of claim 9, wherein the predefined destination information is:
a virtual destination ID or
a destination ID from a configured or preconfigured list or pool of destination IDs.

11. The user device, UE, of claim 9, wherein the UE is to provide the predefined destination information to the transmitting entity to be used by the transmitting entity for transmissions to be relayed to the receiving entity, or
wherein the UE is to receive the predefined destination information from the receiving entity and to forward the received predefined destination information to the transmitting entity to be used by the transmitting entity for transmissions to be relayed to the receiving entity.

12. The user device, UE, of claim 1, wherein the L2 control information comprises a parameter that is decremented or incremented upon transmitting a message by the UE and wherein the UE does not relay the message once a configured or pre-configured value is reached.

13. The user device, UE of claim 12, wherein a failure indication is sent to one or more of: the transmitting entity, the network or a previous relay UE from which a packet was received.

14. A transmitting entity for a wireless communication network,
wherein the transmitting entity is connectable to a layer 2, L2, relay UE so as to provide functionality to support connectivity between the transmitting entity and one or more receiving entities of the wireless communication network, and
wherein the transmitting entity is to indicate a transmission to a relay UE as a first transmission, which is to be relayed to the receiving entity, by L2 control information associated with the transmission.

15. The transmitting entity of claim 14, wherein the transmitting entity is to send the transmission over a direct interface, like a sidelink, or over an access network interface, like a 3GPP or non-3GPP interface to the relay UE.

16. The transmitting entity of claim 14, wherein
the transmitting entity comprises a transmitting UE, or a relay UE of the transmitting UE, and the receiving entity comprises a receiving UE or a relay UE of the receiving UE,
the transmitting entity comprises the transmitting UE or the relay UE of the transmitting UE, and the receiving entity comprises a network entity, like a radio access network, RAN, entity, or
the transmitting entity comprises the network entity, like the RAN entity, and the receiving entity comprises the receiving UE or the relay UE of the receiving UE.

17. The transmitting entity of claim 14, wherein the L2 control information comprises an indication that informs the relay UE that the transmission is the first transmission and that the UE is not an intended receiver.

18. A method for operating a user device, UE, for a wireless communication network, wherein the UE is to act as a layer 2, L2, relay UE so as to provide functionality to support connectivity between a transmitting entity and one or more receiving entities of the wireless communication network, the method comprising:
differentiating, by the UE, a transmission, which is received from the transmitting entity, between a first transmission to be relayed to a receiving entity and a second transmission that is intended for the UE,
wherein the received transmission is differentiated by L2 control information associated with the transmission.

* * * * *